(12) United States Patent
Arahira

(10) Patent No.: US 7,409,157 B2
(45) Date of Patent: Aug. 5, 2008

(54) OPTICAL SWITCH

(75) Inventor: Shin Arahira, Tokyo (JP)

(73) Assignee: Oki Electric Industry Co., Tokyo (JP)

( * ) Notice: Subject to any disclaimer, the term of this patent is extended or adjusted under 35 U.S.C. 154(b) by 378 days.

(21) Appl. No.: 11/185,022

(22) Filed: Jul. 20, 2005

(65) Prior Publication Data
US 2006/0045536 A1  Mar. 2, 2006

(30) Foreign Application Priority Data
Sep. 2, 2004  (JP) .......................... 2004-256094

(51) Int. Cl.
H04J 14/00 (2006.01)
H04J 14/06 (2006.01)
H04J 14/02 (2006.01)
H04B 10/00 (2006.01)

(52) U.S. Cl. .............. 398/45; 398/48; 398/65; 398/82; 398/152; 398/154

(58) Field of Classification Search ............. 398/45, 398/48, 55, 65, 80–82, 142, 146, 147, 152, 398/154, 158
See application file for complete search history.

(56) References Cited

U.S. PATENT DOCUMENTS

| 5,493,433 | A | * | 2/1996 | Prucnal et al. ............ 398/98 |
| 5,848,205 | A | | 12/1998 | Bigo et al. |
| 5,857,040 | A | * | 1/1999 | Bigo et al. .............. 385/15 |
| 5,999,293 | A | * | 12/1999 | Manning ................ 398/52 |
| 6,445,848 | B1 | * | 9/2002 | Islam et al. ............. 385/24 |
| 6,856,716 | B2 | * | 2/2005 | Mukai .................. 385/15 |
| 7,031,047 | B2 | * | 4/2006 | Parolari et al. .......... 359/326 |

FOREIGN PATENT DOCUMENTS

JP  9-222620 A  8/1997

OTHER PUBLICATIONS

Takahide Sakamoto and Kazuro Kikuchi, Nonlinear Optical Loop Mirror With an Optical Bias Controller for Achieving Full-Swing Operation of Gate Switching, IEEE Photonics Techonology Letters, Feb. 2004, pp. 545-547, vol. 16, No. 2, Research Center for Advanced Science and Techology, Univeristy of Tokyo, Tokyo, Japan.
K. Uchiyama, H. Takara, S. Kawanishi, T. Morioka, and M. Saruwatari, Ultrafast Polarisation-Independent All-Optical Switching Using a Polarisation Diversity Scheme In The Nonlinear Optical Loop Mirror, Electronics Letters, Sep. 1992, pp. 1864-1866, vol. 28, No. 20.

(Continued)

Primary Examiner—Dalzid Singh
(74) Attorney, Agent, or Firm—Rabin & Berdo, P.C.

(57) ABSTRACT

The present invention provides an optical switch in which a switching operation is not affected even when the polarization state of a control light varies. The optical switch includes a loop-form optical waveguide loop circuit formed from an optical nonlinear medium, a control light input arrangement for inputting the control light into the optical waveguide loop circuit and serving as a phase control arrangement, a wavelength demultiplexing/multiplexing circuit, and a phase bias circuit.

22 Claims, 14 Drawing Sheets

OTHER PUBLICATIONS

"All-Optical Regeneration" J.C. Simon et al., ECOC'98, pp. 467-469, Sep. 1998.

"Ultrafast polarisation-independent all-optical switching using a polarisation diversity scheme in the nonlinear optical loop mirror", K. Uchiyama, H. Takara, S. Kawanishi, T. Morioka, and M. Saruwatari, Electronics Letters, vol. 28, No. 20, pp. 1864-1866, Sep. 1992.

"Polarization-maintaining WDM Fiber Coupler", Y. Ouchi, et al., Fujikura Techniques No. 102, Apr. 2002.

"Polarization Maintaining Fiber", S. Arai et al., Furukawa Electric Information No. 109, Jan. 2002, pp. 5-10.

\* cited by examiner

OPTICAL SWITCH

BACKGROUND OF THE INVENTION

1. Field of the Invention

The present invention relates to an optical switch used in long-distance, large capacity optical fiber communication and the like for switching a controlled light using a control light.

2. Description of Related Art

To realize large capacity optical fiber communication using limited communication line resources effectively, means for increasing the number of channels capable of transmission and reception and means for increasing the communication speed must be provided.

In optical fiber communication, communication is performed by propagating binary digital optical pulse signals, obtained by modulating an optical pulse array in which optical pulses are arranged in series, along an optical fiber serving as a transmission line at regular fixed time intervals. The term "regular fixed time intervals" denotes time intervals corresponding to the inverse of a frequency that corresponds to the bit rate.

Multiplex communication methods such as time division multiplexing (TDM) are under investigation as such means for increasing the number of channels. TDM is a communication method in which a plurality of channels (tributary channels) is time-multiplexed and transmitted as a time division multiplex signal, and the time division multiplex signal is divided into the individual channels (tributary channels) on the reception side by a gate signal generated from a clock signal, whereby the information in the individual channels is extracted and received individually.

To increase the communication speed of the TDM described above and so on, it is desirable that all of the multiplexing/demultiplexing means be realized by optical means. In other words, it is desirable to realize an optical switch which is capable of executing a switching operation using only optical control signals rather than electrical means.

The optical Kerr effect that occurs in optical fiber is a nonlinear optical effect in which the refractive index of an optical fiber is altered when light of high intensity propagates through the optical fiber. The reaction rate of the optical Kerr effect is several femto-seconds (fs). In other words, if an optical switch is constituted using the optical Kerr effect, an optical switch that is capable of performing a switching operation at several hundred Gbit/s or more can be realized. By comparison, a conventional switch, in which an optical pulse signal is first converted into an electric pulse signal serving as an electrical signal, whereupon the electric pulse signal is switched by an electronic device and then returned to an optical pulse, is capable of switching an optical pulse signal at a maximum bit rate of approximately 40 Gbit/s.

As an optical pulse signal transmitted over an optical fiber propagates along the optical fiber transmission line, loss (so-called propagation loss) is generated in the energy of the signal. This propagation loss increases steadily as the transmission distance increases. Moreover, the chromatic dispersion of an optical fiber causes reductions in the signal to noise ratio (S/N) of the optical pulse signal and waveform distortion of the optical pulse signal, i.e. so-called waveform degradation of the optical pulse signal. Hereafter, an optical pulse signal suffering energy loss or waveform degradation will also be referred to as an optical pulse signal with deteriorated quality.

Hence, in order to lengthen the transmission distance in an optical communication device, an optical repeater is required to regenerate an optical pulse signal with deteriorated quality by performing recognition and regeneration processing on the optical pulse signal. In an optical repeater, first a regeneration step is performed to extract, from an optical pulse signal suffering from waveform degradation due to being propagated over a long-distance optical fiber transmission line, an optical clock signal having a frequency that corresponds to the bit rate of the optical pulse signal. This step is known as re-timing. Next, a step is performed to re-shape and re-generate the optical pulse signal on the basis of the optical clock signal.

A function which is capable of executing all of these three functions (re-timing, re-shaping, and re-generating) directly in an optical state, rather than by first converting the optical pulse signal into an electrical signal, is known as 3R regeneration, and a regenerator having this function is sometimes referred to as a 3R optical repeater. More specifically, a 3R optical repeater comprises a function for regenerating an optical pulse signal having an identical waveform and an identical intensity to an optical pulse signal at the time of transmission from a transmission terminal by means of optical signal processing, rather than converting the optical pulse signal into an electrical signal, and then relaying the optical pulse signal. Hereafter, a 3R optical repeater will also be referred to as an optical signal regenerating device.

With a 3R optical repeater, an optical pulse signal is regenerated by extracting an optical clock from the optical pulse signal and performing AND processing (also known as "gating") on the optical pulse signal and optical clock using an optical gate circuit. More specifically, distortion of the optical pulse waveform of the optical pulse signal is corrected using an effect whereby, from among the optical pulses respectively constituting the optical pulse signal and optical clock, only the energy component of optical pulses superposed within the optical gate simultaneously is output from the optical gate. In this manner, the optical pulse signal is regenerated.

Hence, a 3R optical repeater performs similar signal processing to a conventional device, in which signal regeneration is performed by converting an optical pulse signal into an electric pulse signal, at a high speed and using optical signal processing technology employing only optical elements.

A conventional example of a 3R optical repeater is constituted using a nonlinear optical loop mirror (NOLM) (see "ALL-OPTICAL REGENERATION" J. C. Simon et al., ECOC'98, pp. 467-469, September 1998, for example). A NOLM comprises an optical demultiplexer/multiplexer, an optical coupler, and an optical fiber loop. An outline of the basic operations of a NOLM will now be provided.

The optical intensity of a signal light subject to switching is divided into two equal parts by the optical demultiplexer/multiplexer. The divided signal lights are propagated through the optical fiber loop in a clockwise direction (also known as CW direction) and a counter-clockwise direction (also known as CCW direction) respectively, and then re-input into the optical demultiplexer/multiplexer to be multiplexed.

If no control light is input from the optical coupler at this time, the signal light that is propagated clockwise through the optical fiber loop and the signal light that is propagated counterclockwise through the optical fiber loop are multiplexed in the optical demultiplexer/multiplexer in phase. As a result, the signal light input into the NOLM is output to the same input/output terminal as the input/output terminal from which the signal light was input into the optical demultiplexer/multiplexer. The signal light output to this input/output terminal will also be referred to as loop reflection light.

On the other hand, if a control light is input from the optical coupler, the optical Kerr effect occurs in the optical fiber loop, thereby altering the refractive index. As a result, when the divided signal lights are respectively propagated clockwise and counterclockwise through the optical fiber loop, re-input into the optical demultiplexer/multiplexer, and multiplexed, the phase of the two signal lights is offset. By adjusting the length of the optical fiber loop and the intensity of the control light such that the phase shift amount equals π, the signal light input into the NOLM is output to another input/output terminal which forms a pair with the input/output terminal from which the signal light was input into the demultiplexer/multiplexer. The signal light that is output to this other input/output terminal will also be referred to as loop transmission light.

As described above, a switching operation in which a signal light serving as a controlled light is output to the same input/output terminal as the input/output terminal from which the signal light is input into the optical demultiplexer/multiplexer, or in which the signal light is output to another input/output terminal forming a pair with the input/output terminal from which the signal light is input into the optical multiplexer/demultiplexer, is realized using a control light.

Furthermore, in a NOLM the polarization directions of the signal light propagated through the optical fiber loop clockwise and the signal light propagated through the optical fiber loop counterclockwise must be matched in order to multiplex the two signal lights in the optical demultiplexer/multiplexer. A method of constituting the optical fiber loop described above using polarization-maintaining single-mode fiber is being researched as a method for achieving this (see "Ultrafast polarisation-independent all-optical switching using a polarisation diversity scheme in the nonlinear optical loop mirror", K. Uchiyama, H. Takara, S. Kawanishi, T. Morioka, and M. Saruwatari, Electronics Letters, vol. 28, No. 20, pp. 1864-1866, September 1992, for example).

The optical Kerr effect occurring in an optical fiber loop constituting an optical switch is dependent on the polarization state of both the control light and the signal light. More specifically, when a signal light and a control light propagate in parallel through an optical fiber loop, if both the signal light and control light are linearly polarized and the polarization planes thereof are parallel to each other, the magnitude of the refractive index change caused by the optical Kerr effect reaches a maximum. If, on the other hand, the polarization planes of the signal light and control light are orthogonal, the magnitude of the refractive index change caused by the optical Kerr effect falls to a minimum.

In an optical switch which uses the phenomenon of refractive index change caused by the optical Kerr effect, the fact that the amount of change in the refractive index depends on the relationship between the respective polarization directions of the signal light and control light leads to instability in the switching operation. It is therefore necessary to incorporate into the constitution of the optical switch a mechanism that is capable of realizing a stable switching operation at all times, independent of the polarization state of the signal light and control light input into the optical fiber loop. Here, a stable switching operation indicates a guarantee that when an optical pulse constituting a control light is input into the optical fiber loop, the signal light is invariably output from the optical switch as loop transmission light, and when an optical pulse constituting a control light is not input, the signal light is invariably output from the optical switch as loop reflection light. If a stable switching operation is not realized, the optical fiber loop cannot be used as an optical switch in a 3R optical repeater or the like.

In an optical switch used in a 3R optical repeater, the signal light described above corresponds to an optical clock signal extracted from a time-multiplexed optical pulse signal that is input into the 3R optical repeater. The optical clock signal is output from a mode-locked semiconductor laser or the like, for example. Hence, the clock signal can be set as linearly polarized light, and therefore the direction of the polarization plane thereof can be fixed and set in a desired direction as needed.

Meanwhile, in an optical switch used in a 3R optical repeater, the control light described above corresponds to an optical pulse signal, which is a time division multiplex signal input into the 3R optical repeater, or an optical pulse signal generated by amplifying and processing such an optical pulse signal using an optical amplifier or a wavelength filter. The optical pulse signal input into the 3R optical repeater is propagated through an optical fiber, which is a long-distance (approximately several tens of kilometers) transmission line. Optical fiber transmission lines, which are used widely in optical communication and the like, are constituted by optical fiber which is not capable of maintaining the polarization state of the optical pulse signal that is propagated therethrough. Hence, unless special means are provided, it is impossible to transmit an optical signal pulse over this transmission line while maintaining the polarization state of the optical pulse signal in a fixed state.

It is therefore necessary to provide an optical switch used in a 3R optical repeater with a characteristic whereby the switching operation is not dependent on variation in the polarization state of the input optical pulse signal. With a conventional optical switch using a NOLM, variation in the polarization state of the input optical pulse signal affects the switching operation such that a stable switching operation cannot be guaranteed.

SUMMARY OF THE INVENTION

It is therefore an object of the present invention to provide an optical switch that is capable of realizing a stable switching operation which is not affected even by variation in the polarization state of an input optical pulse signal serving as a control light. In other words, an object of the present invention is to provide an optical switch capable of realizing an operation that is stable enough for use in a 3R optical repeater or the like.

This optical switch switches a controlled light using a control light, and therefore, for ease of description, the controlled light is differentiated from the control light by being referred to as a signal light hereafter.

To achieve this object, the optical switch of the present invention comprises a loop-form optical waveguide loop circuit formed from an optical nonlinear medium, control light input means constituting phase control means for inputting a control light into the optical waveguide loop circuit, and also a wavelength demultiplexing/multiplexing circuit and a phase bias circuit.

The optical waveguide loop circuit divides the signal light so that the divided signal lights propagate in opposite directions along loop-form optical paths formed by the optical nonlinear medium, and then re-multiplexes the signal lights. The phase control means for controlling the phase of the signal lights propagating through the optical waveguide loop circuit are disposed at a point on the optical waveguide loop circuit. The phase control means comprise the control light input means for inputting a control light into the optical nonlinear medium constituting the optical waveguide loop circuit in order to alter the refractive index of the optical nonlinear medium.

More specifically, the optical waveguide loop circuit serving as a constitutional element of the optical switch of the present invention is formed from an optical path extending from an optical demultiplexer/multiplexer to the control light input means, an optical path extending from the control light input means to the wavelength demultiplexing/multiplexing circuit, and an optical path extending from the wavelength demultiplexing/multiplexing circuit and returning to the optical demultiplexer/multiplexer. The signal light serving as a controlled light is divided upon input into the optical waveguide loop circuit such that the divided signal lights are propagated through the optical waveguide loop circuit in opposite directions, whereupon the signal lights are re-multiplexed in the position in which they were divided.

The phase bias circuit is disposed at a point on the optical waveguide loop circuit, and serves to remove a phase bias component that is added to the signal light.

In the optical switch of the present invention, the phase of the signal light that propagates through the optical waveguide loop circuit can be controlled by the control light, and thus a function for switching the signal light using the control light is realized. The waveguide demultiplexing/multiplexing circuit serves to equalize the respective contributions made by the two orthogonal polarization components of the control light to the phase control amount of the signal light. The waveguide demultiplexing/multiplexing circuit comprises a wavelength demultiplexer, a polarization plane rotation portion, a multiplexer, and an optical path connecting these elements. The optical path may be formed using optical fiber.

The optical path serving as the optical nonlinear medium that forms the optical waveguide loop circuit may also be formed using optical fiber. As will be described in more detail hereafter, optical fiber has a property for producing an optical nonlinear effect whereby the refractive index is varied according to the intensity of the propagating light, and may therefore be used as the optical nonlinear medium constituting the optical waveguide loop circuit.

Using the optical demultiplexer/multiplexer, the signal light, which is the controlled light input into the optical waveguide loop circuit, can be divided into a first signal light and a second signal light which are propagated through the optical waveguide loop circuit in opposite directions and then re-multiplexed.

According to the optical switch of the present invention, the loop-form optical waveguide loop circuit formed from the optical nonlinear medium, the control light input means for inputting the control light into the optical waveguide loop circuit, and the wavelength demultiplexing/multiplexing circuit are provided, and hence the phase of the signal light propagating through the optical waveguide loop circuit can be controlled by the control light, thereby realizing a function for switching the signal light using the control light.

The linearly polarized signal light serving as a controlled light is input into a signal light input port of the optical demultiplexer/multiplexer, and divided into the first signal light and second signal light. The first signal light and second signal light are propagated through the optical waveguide loop circuit in opposite directions, and then re-multiplexed by the optical demultiplexer/multiplexer.

The control light is input into the optical waveguide loop circuit via the control light input means of the phase control means disposed at a point on the optical waveguide loop circuit. The optical Kerr effect, which is an optical nonlinear effect, is produced in the optical fiber constituting the optical paths of the optical waveguide loop circuit by the control light input into the optical waveguide loop circuit, thereby altering the refractive index in relation to the first signal light propagating through the optical fiber.

In other words, when the first and second signal lights are multiplexed in the optical demultiplexer/multiplexer after being propagated in opposite directions through the optical fiber constituting the optical paths of the optical waveguide loop circuit, as long as the control light is input into the optical fiber from the control light input means, the signal light input into the signal light input port of the optical demultiplexer/multiplexer can be output to the outside as loop transmission light in the form of a modulated signal light through an output port forming a pair with the signal light input port of the optical demultiplexer/multiplexer by adjusting the length of the optical fiber in accordance with the intensity of the control light such that the phase difference between the first signal light and second signal light reaches $\pi$. If the control light is not input, the signal light is reflected to the signal light input port of the optical demultiplexer/multiplexer as loop reflection light.

Here, if the polarization direction of the signal light input into the optical waveguide loop circuit is set in a fixed and unchanging direction, the optical switch functions as described above. In other words, if the polarization direction of the signal light input into the optical waveguide loop circuit is set in a fixed and unchanging direction, the length of the optical fiber can be set in accordance with the intensity of the control light such that when the first and second signal lights are multiplexed by the optical demultiplexer/multiplexer, the phase difference between the first signal light and second signal light reaches $\pi$. Naturally, the optimum value of the optical fiber length determined in this manner depends on the polarization direction of the signal light input into the optical waveguide loop circuit.

However, as described above, an optical fiber transmission network used in optical communication is constituted by optical fiber that does not have a function for maintaining the polarization plane direction of the light that is propagated through the transmission network in a fixed direction, and it is therefore difficult to perform control to maintain the polarization plane direction of the light (corresponding to the control light in the present invention) transmitted through the optical fiber in a fixed direction.

Hence in the optical switch of the present invention, the wavelength demultiplexing/multiplexing circuit is provided in addition to the phase control means at a point on the optical waveguide loop circuit so that a switching operation that is not dependent on the polarization direction of the control light input into the optical waveguide loop circuit can be realized. The wavelength demultiplexing/multiplexing circuit serves to equalize the respective contributions made by the two orthogonal polarization components of the control light to the phase control amount of the signal light. As will be described in detail hereafter, this function exhibited by the wavelength demultiplexing/multiplexing circuit is realized in the following manner.

As described above, the optical waveguide loop circuit is formed by an optical path extending from the optical demultiplexer/multiplexer to the control light input means, an optical path extending from the control light input means to the wavelength demultiplexing/multiplexing circuit, and an optical path extending from the wavelength demultiplexing/multiplexing circuit and returning to the optical demultiplexer/multiplexer. On the optical path extending from the control light input means to the wavelength demultiplexing/multiplexing circuit, the component of the control light that contributes to phase modulation of the first signal light is parallel to the polarization plane direction of the first signal light.

Therefore, on the optical path extending from the wavelength demultiplexing/multiplexing circuit and returning to the optical demultiplexer/multiplexer, the control light interacts with the first signal light with the polarization plane thereof rotated 90 degrees. In other words, the wavelength demultiplexing/multiplexing circuit serves to rotate the polarization plane direction of the control light 90 degrees.

Hence, one component of the control light interacts with the first signal light on the optical path extending from the control light input means to the wavelength demultiplexing/multiplexing circuit, and the remaining component of the control light interacts with the first signal light on the optical path extending from the wavelength demultiplexing/multiplexing circuit and returning to the optical demultiplexer/multiplexer. In other words, the control light component that interacts with the first signal light on the optical path extending from the control light input means to the wavelength demultiplexing/multiplexing circuit has its polarization plane rotated 90 degrees by the wavelength demultiplexing/multiplexing circuit, and therefore does not interact with the first signal light on the optical path extending from the wavelength demultiplexing/multiplexing circuit and returning to the optical demultiplexer/multiplexer. Instead, the control light component that does not interact with the first signal light on the optical path extending from the control light input means to the wavelength demultiplexing/multiplexing circuit also has its polarization plane rotated 90 degrees by the wavelength demultiplexing/multiplexing circuit, and therefore interacts with the first signal light on the optical path extending from the wavelength demultiplexing/multiplexing circuit and returning to the optical demultiplexer/multiplexer.

As described above, the sum of the phase control amount of the first signal light produced as a result of the interaction between the first signal light and control light on the optical path extending from the control light input means to the wavelength demultiplexing/multiplexing circuit, and the phase control amount of the first signal light produced as a result of the interaction between the first signal light and control light on the optical path extending from the wavelength demultiplexing/multiplexing circuit and returning to the optical demultiplexer/multiplexer, is not dependent on the polarization plane direction of the control light at the point of input into the optical waveguide loop circuit from the control light-input means.

Hence, the respective contributions to the phase control amount of the signal light made by the two orthogonal polarization components of the control light input into the optical waveguide loop circuit through the control light input means are equalized by the wavelength demultiplexing/multiplexing circuit. Thus, according to the optical switch of the present invention, even if the polarization plane direction of the control light at the point of input into the optical waveguide loop circuit through the control light input means varies, the switching operation is not affected thereby, and a stable switching operation can be realized.

According to the setting condition described above, a stable switching operation is ensured even when the polarization plane direction of the control light at the point of input into the optical waveguide loop circuit through the control light input means varies. This setting condition relates to a case in which, of the control light propagating in the same direction (CW direction) as the signal light, only the component that is parallel to the polarization direction of the signal light need be considered for its contribution to the phase shift amount of the signal light controlled by the control light. Note that a case in which only the contribution of the component that is parallel to the polarization direction of the signal light need be taken into account indicates cases in which the bit rate is sufficiently low, cases in which the duty ratio of the optical pulse is sufficiently small, and so on.

However, when the duty ratio of the control light pulse (a value obtained by dividing the pulse width of the control light pulse by the inverse of the bit rate) is large, it is occasionally necessary to take into account the contribution of a component (also referred to as "phase bias component" hereafter) that is parallel to the polarization direction of the control light from a phase bias component added to the signal light (second signal light) that advances in the opposite direction (CCW direction) to the control light.

As will be described in detail hereafter, even when the duty ratio of the control light pulse is large, by disposing the phase bias circuit at a point on the optical waveguide loop circuit, this phase bias component can be removed. Thus, an optical switch which is capable of realizing a stable switching operation independent of the polarization state of the control light even when the duty ratio of the control light pulse is large can be constructed.

BRIEF DESCRIPTION OF THE DRAWINGS

The foregoings and other objects, features and advantageous of the present invention will be better understood from the following description taken in connection with the accompanying drawings, in which.

DESCRIPTION OF THE PREFERRED EMBODIMENTS

Figure 1:
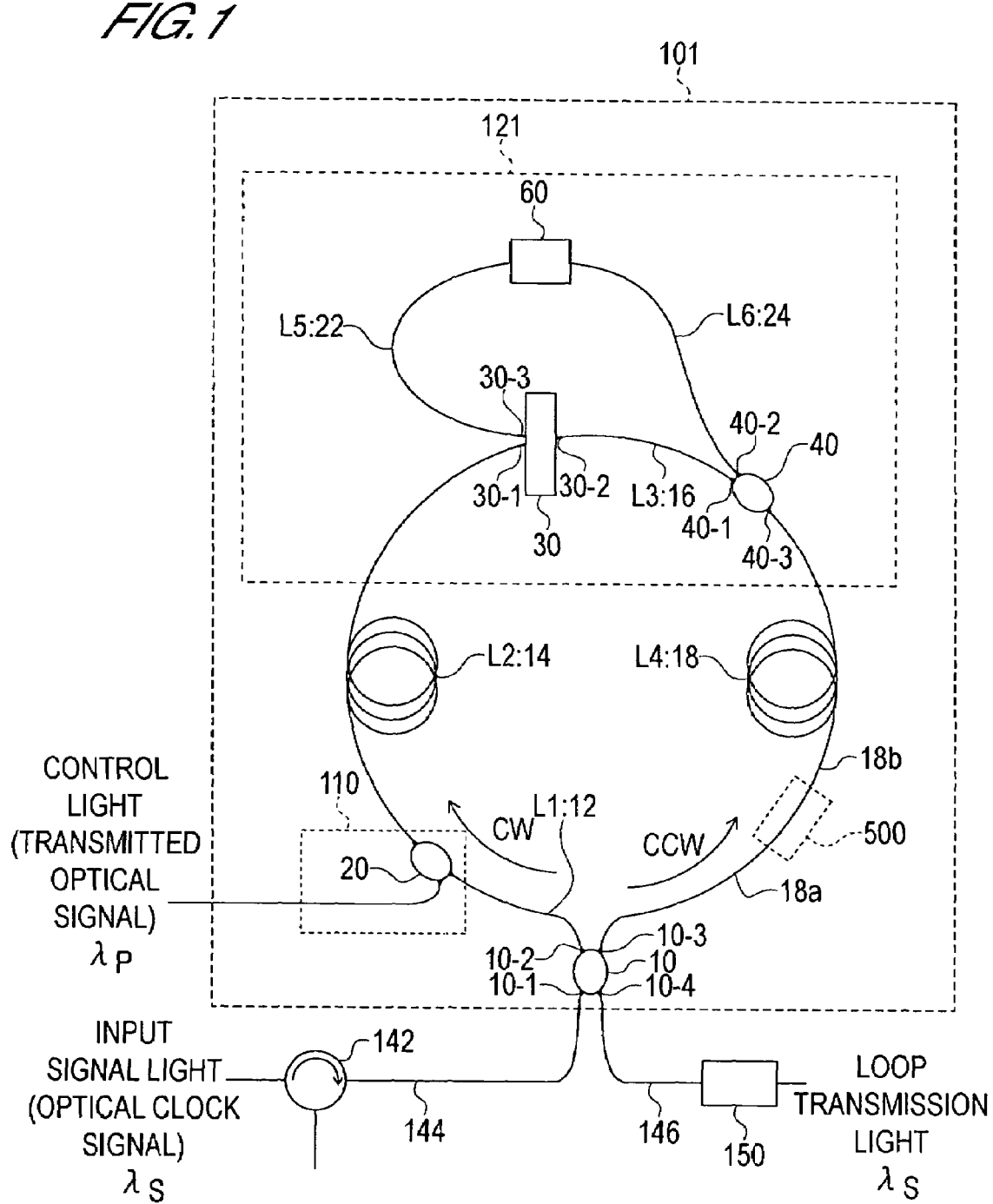
FIG. 1 is a block diagram of an optical switch according to a first embodiment.

Embodiments of the present invention will be described below with reference to the drawings. Note that each drawing illustrates a constitutional example relating to the present invention. The disposal relationships and so on between each constitutional element are merely illustrated in outline to aid understanding of the present invention, and the present invention is not limited to the illustrated examples. Further, in the following description, specific instruments, conditions, and so on are sometimes used, but these materials and conditions are merely preferred examples, and the present invention is not limited thereto. In each drawing, identical constitutional elements have been allocated identical reference numbers, and duplicate description thereof may be omitted.

First Embodiment (Structure)

The structure of a first optical switch serving as a first embodiment of the present invention will now be described with reference to FIG. 1. The first optical switch is constituted by a loop-form optical waveguide loop circuit 101 formed from an optical nonlinear medium, and control light input means 20 of phase control means 110 for inputting a control light into the optical waveguide loop circuit 101, and also comprises a wavelength demultiplexing/multiplexing circuit 121 and a phase bias circuit 500.

The optical waveguide loop circuit 101 is constituted by an optical path (also referred to as "path L1" hereafter) formed from a first polarization-maintaining single-mode fiber 12 extending from an optical demultiplexer/multiplexer 10 to the control light input means 20, an optical path (also referred to as "path L2" hereafter) formed from a second polarization-maintaining single-mode fiber 14 extending from the control light input means 20 to the wavelength demultiplexing/multiplexing circuit 121, and an optical path (also referred to as "path L4" hereafter) formed from a fourth polarization-maintaining single-mode fiber 18 extending from the wavelength demultiplexing/multiplexing circuit 121 and returning to the optical demultiplexer/multiplexer 10.

The optical fibers constituting the first optical switch preferably use polarization-maintaining single-mode fiber to ensure that the polarization planes of the control light and the signal light serving as a controlled light do not change irregularly during propagation through the optical fibers. A PANDA (polarization-maintaining AND absorption-reducing) type optical fiber is a representative example of polarization-maintaining single-mode fiber. This optical fiber achieves its polarization-maintaining characteristic by having a stress-applying portion formed in the vicinity of the core such that intense stress is applied to the core.

In PANDA optical fiber, a stress-applying portion is formed on the cladding surrounding the core through which light is guided so as to sandwich the core. For example, the cladding is formed from $SiO_2$, the core is formed from $SiO_2$ doped with $GeO_2$, and the stress-applying portion is formed from $SiO_2$ doped with $B_2O_3$. By forming the optical fiber in this manner, the effective index in relation to the light guided through the core differs between a slow axis direction set in a perpendicular plane to the light propagation direction of the PANDA optical fiber, and a fast axis direction which is orthogonal to the slow axis. In other words, the stress-applying portion, which has a higher refractive index than the refractive index of the cladding, is placed in the vicinity of the core, and therefore, the effective index in relation to light in which the vibration direction of the electric field vector of the light is parallel to the slow axis direction is higher than the effective index in relation to light in which the vibration direction of the electric field vector of the light is parallel to the fast axis direction. By means of this asymmetry in the effective index, light input into the PANDA optical fiber is propagated while maintaining its polarization plane.

In other words, with PANDA optical fiber, when the polarization plane of a linearly polarized light is input in accordance with the slow axis (or fast axis), the light is propagated through the PANDA optical fiber while maintaining its polarization state, and even at the exit terminal, it is possible to obtain a linearly polarized light whose polarization plane matches the slow axis (or fast axis).

The optical demultiplexer/multiplexer 10 may employ a directional optical coupler or the like. To form the optical switch of the present invention in particular, a directional optical coupler which is capable of switching the optical path while the polarization plane of the light is set in a fixed direction is preferably employed. A polarization-maintaining optical coupler has been developed as such a directional optical coupler in which the polarization plane is maintained (see "Polarization-maintaining WDM Fiber Coupler", Y. Ouchi, et al., Fujikura Techniques No. 102, April 2002, for example). This polarization-maintaining optical coupler is manufactured by precisely aligning the slow axis (or fast axis) of two PANDA optical fibers in parallel, and then fusing and drawing the two fibers. After confirming that the desired characteristics as a directional optical coupler have been obtained (the optical intensity dividing ratio is 1:1 and so on), drawing is terminated, and the fibers are fixed to a substrate for the purpose of reinforcement, whereupon manufacture is complete.

Phase control means 110 for controlling the phase of the signal light that is propagated through the optical waveguide loop circuit are disposed at a point on the optical waveguide loop circuit 101. The phase control means 110 comprise the control light input means 20 for inputting a control light onto the path L2 constituted by the second polarization-maintaining single-mode fiber 14, which is an optical nonlinear medium constituting the optical waveguide loop circuit.

A directional optical coupler which maintains the polarization plane may also be used as the control light input means 20. A directional optical coupler or the like that can be used as the control light input means 20 will also be referred to as an optical coupler hereafter. Needless to say, the elements that may be used as the control light input means 20 are not limited to a directional optical coupler, and various other elements may be used. The element that is used is a design consideration.

The wavelength demultiplexing/multiplexing circuit 121 is constituted by a wavelength demultiplexer 30, a polarization plane-rotation portion 60, a multiplexer 40, and polarization-maintaining single-mode fiber constituting an optical path connecting the aforementioned elements.

The constitution of the first optical switch will now be described in detail. The optical demultiplexer/multiplexer 10 allocates the four input/output ports of the directional coupler for use in the following manner. One end of an input optical fiber 144 is connected to a first port 10-1, and a signal light is input therein. One end of the first polarization-maintaining single-mode fiber 12 is connected to a second port 10-2, and the other end of the fourth polarization-maintaining single-mode fiber 18 is connected to a third port 10-3. One end of an output optical fiber 146 is connected to a fourth port 10-4, and a modulated signal light, which is a signal light component controlled by the control light and switched to loop transmission light, is output therefrom.

The optical intensity of the signal light input from the first port 10-1 of the optical demultiplexer/multiplexer 10 is divided at a ratio of 1:1 such that a first signal light and a second signal light are output to the second port 10-2 and third port 10-3 respectively. In other words, the optical intensity of the first signal light and the optical intensity of the second signal light are equal.

The one end of the first polarization-maintaining single-mode fiber 12 constituting the path L1 is connected to the second port 10-2 of the optical demultiplexer/multiplexer 10, and the other end is connected to the optical coupler serving as the control light input means 20. The optical coupler serving as the control light input means 20 will occasionally be denoted as optical coupler 20 hereafter. One end of the second polarization-maintaining single-mode fiber 14 constituting the path L2 is connected to the optical coupler 20, and the other end is connected to a first port 30-1 of the wavelength demultiplexer 30 serving as one of the constitutional elements of the wavelength demultiplexing/multiplexing circuit 121. One end of the fourth polarization-maintaining single-mode fiber 18 constituting the path L4 is connected to the multiplexer 40 serving as one of the constitutional elements of the wavelength demultiplexing/multiplexing circuit 121, and the other end is connected to the third port 10-3 of the optical demultiplexer/multiplexer 10.

The wavelength demultiplexing/multiplexing circuit 121 is constituted by the wavelength demultiplexer 30, the polarization plane rotation portion 60, and the multiplexer 40. The other end of the second polarization-maintaining single-mode fiber 14, one end of a third polarization-maintaining single-mode fiber 16, and one end of a fifth polarization-maintaining single-mode fiber 22 are connected to the wavelength demultiplexer 30. The other end of the fifth polarization-maintaining single-mode fiber 22 and one end of a sixth polarization-maintaining single-mode fiber 24 are connected to the polarization plane rotation portion 60. The other end of the third polarization-maintaining single-mode fiber 16, the other end of the sixth polarization-maintaining single-mode fiber 24, and the one end of the fourth polarization-maintaining single-mode fiber 18 are connected to the multiplexer 40. In other words, the third polarization-maintaining single-mode fiber 16 is constituted such that the one end is connected to a second port 30-2 of the wavelength demultiplexer 30 and the other end is connected to a first port 40-1 of the multiplexer 40, the fifth polarization-maintaining single-mode fiber 22 is constituted such that the one end is connected to a third port 30-3 of the wavelength demultiplexer 30 and the other end is connected to the polarization plane rotation portion 60, and the sixth polarization-maintaining single-mode fiber 24 is constituted such that the one end is connected to the polarization plane rotation portion 60 and the other end is connected to a second port 40-2 of the multiplexer 40.

Thus the wavelength demultiplexing/multiplexing circuit 121 forms a subsidiary optical waveguide loop circuit in relation to the optical waveguide loop circuit constituted by the paths L1, L2, and L4. The optical path forming this subsidiary optical waveguide loop circuit is formed from the third polarization-maintaining single-mode fiber 16 (also referred to as "path L3" hereafter) connecting the wavelength demultiplexer 30 and multiplexer 40, the fifth polarization-maintaining single-mode fiber 22 (also referred to as "path L5" hereafter) connecting the wavelength demultiplexer 30 and polarization plane rotation portion 60, and the sixth polarization-maintaining single-mode fiber 24 (also referred to as "path L6" hereafter) connecting the polarization plane rotation portion 60 and multiplexer 40.

The respective optical path lengths of the path L3, the path L5, and the path L6 are set such that the time required for the signal light to pass along the path L3 is equal to the time required for the control light to pass along the path L5, through the polarization plane rotation portion 60, and along the path L6.

The phase bias circuit 500 is disposed (at a point on) a path selected from the paths L1 through L4 constituting the optical waveguide loop circuit along which the signal light is guided. FIG. 1 illustrates a case in which the phase bias circuit 500 is disposed on the path L4. The phase bias circuit 500 comprises a first polarization plane rotation element for rotating the polarization plane of the signal light 45 degrees, a phase compensation element which compensates for phase shift between the polarization components that are orthogonal to the signal light, and a second polarization plane rotation element for rotating the polarization plane of the signal light 45 degrees. The first polarization plane rotation element, phase compensation element, and second polarization plane rotation element are arranged in series in the phase bias circuit 500 in that order. Specific constitutional examples of the phase bias circuit 500 will be described below. A plurality of constitutional examples of the phase bias circuit 500 exist, and these are differentiated in the following description as a first phase bias circuit 501, a second phase bias circuit 502, and a third phase bias circuit 503.

[First Phase Bias Circuit]

The constitution of the first phase bias circuit 501 will now be described with reference to FIGS. 1 and 2. A first Faraday rotator 902 serving as the first polarization plane rotation element, a Babinet-Soleil compensator 903 serving as the phase compensation element, and a second Faraday rotator 904 serving as the second polarization plane rotation element are arranged in succession between a polarization-maintaining single-mode fiber 901 and a polarization-maintaining single-mode fiber 905. Where necessary, an optical element such as a convex lens (not shown) is preferably inserted between the polarization-maintaining single-mode fiber 901 and the first Faraday rotator 902, the first Faraday rotator 902 and the Babinet-Soleil compensator 903, the Babinet-Soleil compensator 903 and the second Faraday rotator 904, and the second Faraday rotator 904 and the polarization-maintaining single-mode fiber 905. By inserting an optical element such as a convex lens in these positions, signal lights and control lights can be effectively input into and output from the first Faraday rotator 902, Babinet-Soleil compensator 903, and second Faraday rotator 904 with a high degree of joining efficiency.

In the optical switch shown in FIG. 1, the polarization-maintaining single-mode fibers 901 and 905 are formed by cutting the fourth polarization-maintaining single-mode fiber 18 constituting the path L4 at a point thereon. In other words, the fourth polarization-maintaining single-mode fiber 18 is cut midway, and the first Faraday rotator 902, Babinet-Soleil compensator 903, and second Faraday rotator 904 are arranged in series between the cut fourth polarization-maintaining single-mode fiber 18 in that order.

The phase bias circuit 500 may be disposed (at a point on) any one path selected from the paths L1 through L4, and therefore, when disposed on the path L1, the first polarization-maintaining single-mode fiber 12 is cut midway, when disposed on the path L2, the second polarization-maintaining single-mode fiber 14 is cut midway, and when disposed on the path L3, the third polarization-maintaining single-mode fiber 16 is cut midway, whereupon the first Faraday rotator 902, Babinet-Soleil compensator 903, and second Faraday rotator 904 are arranged in series between the corresponding cut optical fiber.

Note that the first and second Faraday rotators are used as the first and second polarization plane rotation elements, but the polarization plane rotation elements are not limited to Faraday rotators, and any element having a function for rotating a polarization plane, such as a half-wave plate, may be used. Likewise in the second and third phase bias circuits to be described below, examples are cited in which Faraday rotators are used as the first and second polarization plane rotation elements, but in these cases also, the polarization plane rotation elements are not limited to Faraday rotators.

[Second Phase Bias Circuit]

The constitution of the second phase bias circuit 502 will now be described with reference to FIGS. 1 and 3. A first Faraday rotator 1002 serving as the first polarization plane rotation element, a short polarization-maintaining single-mode fiber 1003 serving as the phase compensation element, and a second Faraday rotator 1004 serving as the second polarization plane rotation element are arranged in succession between a polarization-maintaining single-mode fiber 1001 and a polarization-maintaining single-mode fiber 1005. A temperature control heater 1006 is incorporated into the polarization-maintaining single-mode fiber 1003. Where necessary, an optical element such as a convex lens (not shown) is preferably inserted between the polarization-maintaining single-mode fiber 1001 and the first Faraday rotator 1002, the first Faraday rotator 1002 and the short polarization-maintaining single-mode fiber 1003, the short polarization-maintaining single-mode fiber 1003 and the second Faraday rotator 1004, and the second Faraday rotator 1004 and the polarization-maintaining single-mode fiber 1005. By inserting an optical element such as a convex lens in these positions, signal lights and control lights can be effectively input into and output from the first Faraday rotator 1002, short polarization-maintaining single-mode fiber 1003, and second Faraday rotator 1004 with a high degree of joining efficiency.

In the optical switch shown in FIG. 1, the polarization-maintaining single-mode fibers 1001 and 1005 are formed by cutting the fourth polarization-maintaining single-mode fiber 18 constituting the path L4 at a point thereon. In other words, the fourth polarization-maintaining single-mode fiber 18 is cut midway, and the first Faraday rotator 1002, short polarization-maintaining single-mode fiber 1003, and second Faraday rotator 1004 are arranged in series between the cut fourth polarization-maintaining single-mode fiber 18 in that order.

The phase bias circuit 500 may be disposed (at a point on) any one path selected from the paths L1 through L4, and therefore, when disposed on the path L1, the first polarization-maintaining single-mode fiber 12 is cut midway, when disposed on the path L2, the second polarization-maintaining single-mode fiber 14 is cut midway, and when disposed on the path L3, the third polarization-maintaining single-mode fiber 16 is cut midway, whereupon the first Faraday rotator 1002, short polarization-maintaining single-mode fiber 1003, and second Faraday rotator 1004 are arranged in series between the corresponding cut optical fiber.

[Third Phase Bias Circuit]

The constitution of the third phase bias circuit 503 will now be described with reference to FIGS. 1 and 4. A first Faraday rotator 1102 serving as the first polarization plane rotation element, an electro-optic element 1103 serving as the phase compensation element, and a second Faraday rotator 1104 serving as the second polarization plane rotation element are arranged in succession between a polarization-maintaining single-mode fiber 1101 and a polarization-maintaining single-mode fiber 1105. Where necessary, an optical element such as a convex lens (not shown) is preferably inserted between the polarization-maintaining single-mode fiber 1101 and the first Faraday rotator 1102, the first Faraday rotator 1102 and the electro-optic element 1103, the electro-optic element 1103 and the second Faraday rotator 1104, and the second Faraday rotator 1104 and the polarization-maintaining single-mode fiber 1105. By inserting an optical element such as a convex lens in these positions, signal lights and control lights can be effectively input into and output from the first Faraday rotator 1102, electro-optic element 1103, and second Faraday rotator 1104 with a high degree of joining efficiency.

In the optical switch shown in FIG. 1, the polarization-maintaining single-mode fibers 1101 and 1105 are formed by cutting the fourth polarization-maintaining single-mode fiber 18 constituting the path L4 at a point thereon. In other words, the fourth polarization-maintaining single-mode fiber 18 is cut midway, and the first Faraday rotator 1102, electro-optic element 1103, and second Faraday rotator 1104 are arranged in series between the cut fourth polarization-maintaining single-mode fiber 18 in that order.

The phase bias circuit 500 may be disposed (at a point on) any one path selected from the paths L1 through L4, and therefore, when disposed on the path L1, the first polarization-maintaining single-mode fiber 12 is cut midway, when disposed on the path L2, the second polarization-maintaining single-mode fiber 14 is cut midway, and when disposed on the path L3, the third polarization-maintaining single-mode fiber 16 is cut midway, whereupon the first Faraday rotator 1102, electro-optic element 1103, and second Faraday rotator 1104 are arranged in series between the corresponding cut optical fiber.

An element constituted by forming an electrode on a c+ surface and a c− surface of a c-axis cut $LiNbO_3$ (lithium niobate) crystal, generating the Pockels effect by applying a voltage between the c+ surface and c− surface, and thereby altering the refractive index of the c-axis direction, may be used as the electro-optic element 1103. In other words, the signal light and control light are input in an orthogonal direction to the c-axis of the electro-optic element 1103 formed in this manner, and by applying a voltage between the c+ surface and c− surface of the electro-optic element 1103 which uses $LiNbO_3$ by means of a DC power supply 1106, the phase difference between the orthogonal polarization components of the input signal light or the orthogonal polarization components of the control light can be controlled.

The electro-optic element 1103 is not limited to the electro-optic element using $LiNbO_3$ described above, and by constituting the optical waveguide using a method in which Ti thermal diffusion is implemented on $LiNbO_3$ or a ferroelectric optical crystal using $LiTaO_3$ or the like, an electro-optic element having similar functions to those of the waveguide-form electro-optic element described above can be formed.

In any case, the type of electro-optic element to be used is a design consideration to be determined in accordance with the application and so on of the optical switch.

(Operation)

The operating principle of the first optical switch will now be described with reference to FIG. 1. The first optical switch of the present invention comprises the loop-form optical waveguide loop circuit 101 formed in an optical form by an optical nonlinear medium, the control light input means 20 of the phase control means 110 for inputting a control light into the optical waveguide loop circuit 101, and the wavelength demultiplexing/multiplexing circuit 121, and therefore the phase of a signal light propagated through the optical waveguide loop circuit 101 can be controlled by a control light, and a function for switching the signal light, which serves as a controlled light, using the control light can be realized.

A linearly polarized signal light serving as a controlled light is input into the first port 10-1 serving as the signal light input port of the optical demultiplexer/multiplexer 10 and divided into a first signal light and a second signal light. The first signal light and second signal light are then propagated in a CW direction and a CCW direction respectively, and then multiplexed again by the optical demultiplexer/multiplexer 10. In other words, when a signal light is input into the first port 10-1, the first signal light and second signal light are output from the second port 10-2 and third port 10-3 respectively, and propagated in the CW direction and CCW direction respectively. The first signal light and second signal light are then input into the third port 10-3 and second port 10-2 respectively, whereupon the two signals are multiplexed in the optical demultiplexer/multiplexer 10.

The control light is input into the optical waveguide loop circuit 101 via the optical coupler 20 disposed at a point on the optical waveguide loop circuit 101. The control light input into the optical waveguide loop circuit 101 generates the optical Kerr effect, which is an optical nonlinear effect, in the second polarization-maintaining single-mode fiber 14 and fourth polarization-maintaining single-mode fiber 18 constituting the optical path of the optical waveguide loop circuit 101, thereby altering the refractive index in relation to the first signal light propagating through the second polarization-maintaining single-mode fiber 14 and fourth polarization-maintaining single-mode fiber 18.

As long as the control light is input into the second polarization-maintaining single-mode fiber 14 through the optical coupler 20, the signal light input into the first port 10-1 serving as the signal light input port of the optical demultiplexer/multiplexer 10 can be output to the outside as a modulated signal light, or in other words loop transmission light, through the fourth port 10-4, which serves as an output port forming a pair with the first port 10-1 serving as the signal light input port of the optical demultiplexer/multiplexer 10, by adjusting the length of the second polarization-maintaining single-mode fiber 14 and fourth polarization-maintaining single-mode fiber 18 in accordance with the intensity of the control light such that the phase difference between the first signal light and second signal light becomes $\pi$ after the first and second signal lights have been propagated in the CW direction and CCW direction respectively and then multiplexed in the optical demultiplexer/multiplexer 10. When the control light is not input, the signal light is reflected to the first port 10-1 serving as the signal light input port of the optical demultiplexer/multiplexer 10 as loop reflection light.

Here, the optical switch functions as described above as long as the polarization direction of the control light input into the optical waveguide loop circuit 101 is set in a fixed and unchanging direction. More specifically, the signal light is output from a mode-locked semiconductor laser or the like, and therefore its polarization direction can be set in a fixed direction. Accordingly, if the polarization direction of the control light input into the optical waveguide loop circuit 101 is also fixed and unchanging, the length of the second polarization-maintaining single-mode fiber 14 and fourth polarization-maintaining single-mode fiber 18 can be fixed in accordance with the intensity of the control light such that when the first and second signal lights are multiplexed by the optical demultiplexer/multiplexer 10, the phase difference between the first signal light and second signal light is $\pi$. Needless to say, the optimum value of the length of the second polarization-maintaining single-mode fiber 14 and fourth polarization-maintaining single-mode fiber 18 determined in this manner is dependent on the angle formed by the polarization planes of the signal light and control light input into the optical waveguide loop circuit 101 during propagation through the optical waveguide loop circuit 101.

However, it is usually difficult to set the polarization direction of the control light input into the optical waveguide loop circuit 101 in a fixed and unchanging direction. More specifically, when the first switch is used in a 3R optical repeater, the control light is an optical pulse signal propagated through a typical optical fiber transmission line in which characteristics such as polarization maintenance are not ensured over a length of several tens of kilometers or more from the transmitter side, and therefore the polarization plane of the control light is not set securely in a fixed direction.

Hence in the first optical switch, the wavelength demultiplexing/multiplexing circuit 121 is provided to realize a switch operation that is not dependent on the polarization direction of the control light input into the optical waveguide loop circuit 101, and therefore a stable switch operation can be realized even when the polarization direction of the control light is not fixed. The wavelength demultiplexing/multiplexing circuit 121 serves to equalize the respective contributions made by the two orthogonal polarization components of the control light to the phase control amount of the signal light.

An outline of an operation of the first optical switch was described above. An operation of the first optical switch will now be described in detail. In the block diagram of an optical switch shown in FIG. 1, the polarization direction of the light that is propagated along an optical transmission line such as an optical fiber or through an optical element such as an optical demultiplexer/multiplexer will be prescribed as follows for convenience of description. Polarization in which the vibration direction of the electric field vector of the light is perpendicular to the paper surface will be referred to as a TE (transverse-electric modes) polarized wave, and the perpendicular direction to the paper surface will be referred to as the TE direction. Further, polarization in which the vibration direction of the electric field vector of the light is parallel to the paper surface will be referred to as a TM (transverse-magnetic modes) polarized wave, and the parallel direction to the paper surface will be referred to as the TM direction.

First, the wavelength demultiplexer 30, which is a constitutional element of the wavelength demultiplexing/multiplexing circuit 121, will be described. For example, the wavelength demultiplexer 30 may be constituted by a dielectric multilayer wavelength filter formed by laminating dielectric multilayer films on a transparent substrate. A commercially available dielectric multilayer wavelength filter such as T-MUX, manufactured by Koshin Kogaku Co., Ltd. may be used.

When the wavelength of the signal light is $\lambda s$ and the wavelength of the control light is $\lambda p$, the reflection/transmission characteristic of the dielectric multilayer wavelength filter used as the wavelength demultiplexer 30 may be designed such that a signal light having a wavelength of $\lambda s$ is transmitted and a control light having a wavelength of $\lambda p$ is reflected. This dielectric multilayer wavelength filter may be designed on the basis of well-known optical theory relating to the reflection/transmission characteristics produced by dielectric multilayer films.

Figure 5:
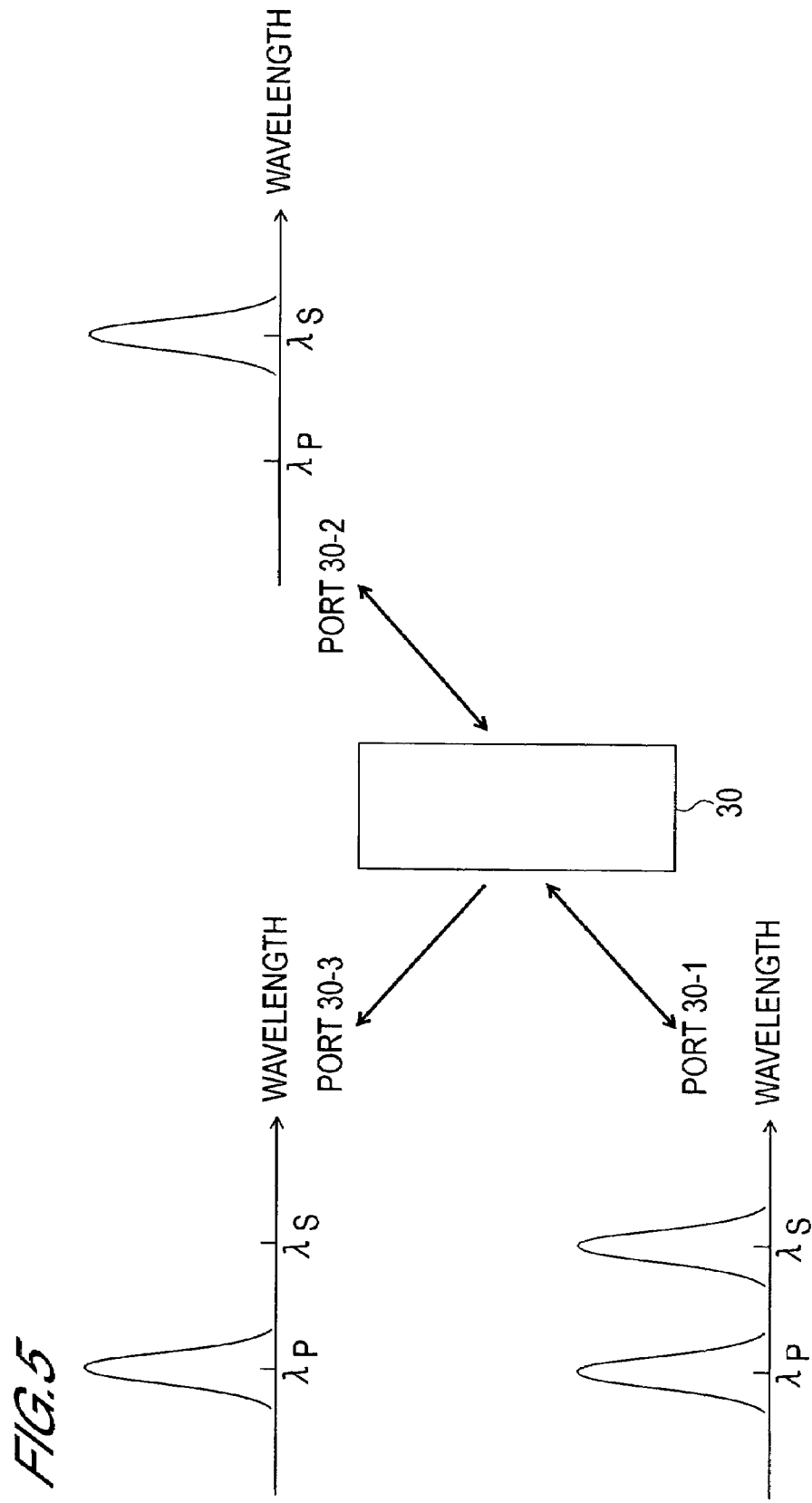
FIG. 5 is a view illustrating an operation of a wavelength demultiplexer.

An operation of the wavelength demultiplexer 30 will now be described with reference to FIG. 5. FIG. 5 shows a pattern of the wavelength demultiplexer 30 illustrating the wavelength characteristics of the light that is input and output respectively into the first port 30-1, second port 30-2, and third port 30-3 of the wavelength demultiplexer 30, with the wavelength shown on the abscissa.

A signal light having the wavelength $\lambda s$ and a control light having the wavelength $\lambda p$ are input into the first port 30-1 of the wavelength demultiplexer 30. If the control light is not input from the control light input means 20, only the signal light having the wavelength $\lambda s$ is input through the first port 30-1 of the wavelength demultiplexer 30, but when the control light is input, the light input through the first port 30-1 of the wavelength demultiplexer 30 consists of mixed light comprising the signal light having the wavelength λs and the control light having the wavelength λp.

The wavelength demultiplexer 30 transmits the signal light having the wavelength λs but reflects the control light having the wavelength λp, and hence, when the signal light having the wavelength λs and control light having the wavelength λp are input into the first port 30-1 of the wavelength demultiplexer 30, only the transmitted signal light having the wavelength λs is output from the second port 30-2, and only the reflected control light having the wavelength λp is output from the third port 30-3. When the signal light having the wavelength λs is input into the third port 30-3 of the wavelength demultiplexer 30, the wavelength demultiplexer 30 transmits the signal light having the wavelength λs, but since no connecting port is provided for this transmitted light, as will be described below, the transmitted light is not output from any of the ports of the wavelength demultiplexer 30.

A Faraday rotator may be used as the polarization plane rotation portion 60, which is another constitutional element of the wavelength demultiplexing/multiplexing circuit 121. More specifically, a Faraday rotator may be adjusted for use such that when a linearly polarized light is input, the linearly polarized light is output with the polarization plane thereof rotated 90 degrees. The polarization plane rotation portion 60 is not limited to a Faraday rotator, and may employ a half-wave plate. As long as the polarization plane rotation portion 60 has a function for rotating the polarization plane of the input linearly polarized light 90 degrees and then outputting the light, the element constituting the polarization plane rotation portion 60 is a design consideration.

Polarization-maintaining single-mode fiber that can produce the optical Kerr effect efficiently is preferably used as the polarization-maintaining single-mode fiber constituting the path L2 and the path L4. This is for the following reason. The phase shift amount φ required in the switching operation described above is obtained using the following equation (1).

$$\phi = 2\gamma PL \quad (1)$$

Here, P(W) is the power of the control light, and L(km) is the length of the polarization-maintaining single-mode fiber constituting the optical fiber loop. $\gamma(W^{-1} km^{-1})$ is a nonlinear optical constant based on the optical Kerr effect. Accordingly, the length (corresponding to L(km) in the equation (1)) of the polarization-maintaining single-mode fiber constituting the path L2 and the path L4 can be reduced as the value of the nonlinear optical constant $\gamma(W^{-1} km^{-1})$ increases. In other words, the first optical switch can be constituted in a more compact form.

To realize the optical Kerr effect efficiently, the nonlinear optical constant $\gamma(W^{-1} km^{-1})$ based on the optical Kerr effect may be increased by subjecting the core of the optical fiber to high-density $GeO_2$ doping, or the optical energy density inside the optical fiber may be increased by reducing the mode field diameter (MFD), which is the guided mode sectional area of the optical fiber. For example, although a normal optical fiber with an MFD of 8 μm has a value of γ of approximately 1 to 2 $km^{-1} W^{-1}$, an optical fiber with an MFD of 3.6 μm and a value of γ of 20 $km^{-1} W^{-1}$, i.e. a value that is larger by one digit, is also commercially available.

Furthermore, fiber formed with cavities in the cladding, known as holey fiber, and optical fiber with high optical nonlinearity, known as photonic band gap fiber, are also under development. It can therefore be predicted that in the future, such techniques will be incorporated into polarization-maintaining single-mode fiber to develop an optical fiber having high optical nonlinearity and a polarization maintaining quality.

An optical fiber designed to realize the optical Kerr effect efficiently will occasionally be referred to as nonlinear optical fiber hereafter.

Figure 6:
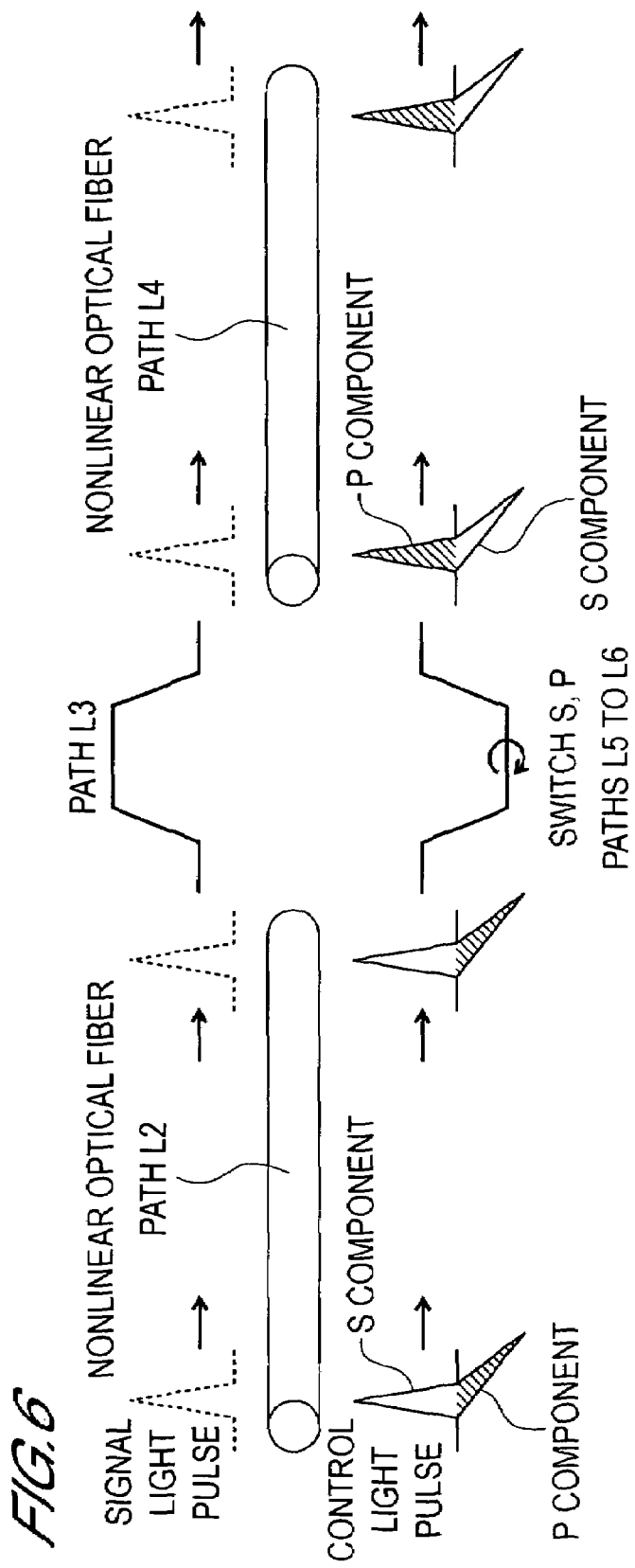
FIG. 6 is a view illustrating an operation of the optical switch according to the first embodiment.

An operation of the first optical switch will now be described in detail with reference to FIG. 6. FIG. 6 illustrates an operation of the first optical switch serving as the first embodiment of the present invention, and accordingly shows the propagation patterns of the signal light and control light propagating along the paths L2 through L6. For ease of understanding, the paths L2 through L6 are illustrated as linear abstractions in FIG. 6.

The signal light is assumed to be input as TE polarization into the second polarization-maintaining single-mode fiber 14 forming the path L2 from the output end of the control light input means 20 connected to the one end of the second polarization-maintaining single-mode fiber 14. Of course, it is also possible to operate the optical switch by inputting the signal light into the second polarization-maintaining single-mode fiber 14 as a TM wave, but since the two cases are similar, description of the latter has been omitted.

Meanwhile, since the direction of the control light polarization plane is arbitrary, the TE direction component of the control light is set as an S component (the intensity of the S component is set as $P_E$), and the TM direction component is set as a P component (the intensity of the P component is set as $P_M$). In other words, the intensity P of the control light is $P_E + P_M$. This value P is controlled to a constant magnitude by an optical amplifier or the like provided separately on the exterior of the first optical switch, and input into the control light input means 20 of the first optical switch. During propagation through the second polarization-maintaining single-mode fiber 14 constituting the path L2, the intensity P and polarization state (the polarization plane direction as a linearly polarized light) of the control light are assumed to be maintained.

The signal light pulse constituting the signal light and the control light pulse constituting the control light described above pass through the second polarization-maintaining single-mode fiber 14 constituting the path L2 in parallel, and a phase shift amount $\phi_{L2}$ generated in the signal light pulse by the mutual phase modulation effect that is produced by the optical Kerr effect realized by the control light pulse is obtained using the following equation (1'). Note that it is assumed that the P component of the control light pulse that is orthogonal to the polarization plane of the signal light pulse does not contribute, and that the control light pulse propagates through the second polarization-maintaining single-mode fiber 14 without changing its waveform. It is also assumed that positional deviation (also known as walkoff) based on a difference in the propagation speeds of the signal light pulse and control light pulse produced by group velocity dispersion in the second polarization-maintaining single-mode fiber 14 does not occur between the signal light pulse and control light pulse during their parallel propagation.

$$\phi_{L2} = 2\gamma P_E l_2 \quad (1')$$

Here, $l_2$ is the length of the second polarization-maintaining single-mode fiber 14 constituting the path L2.

The signal light pulse and control light pulse reach the other end of the second polarization-maintaining single-mode fiber 14, whereupon both pulses are input into the first port 30-1 of the wavelength demultiplexer 30. As described above, the signal light pulse is output from the second port 30-2, propagated through the third polarization-maintaining single-mode fiber 16 constituting the path L3, input into the first port 40-1 of the multiplexer 40, output to the third port 40-3, and then input into the fourth polarization-maintaining single-mode fiber 18 constituting the path L4.

Meanwhile, the control light pulse is output from the third port 30-3 of the wavelength demultiplexer 30, input into the fifth polarization-maintaining single-mode fiber 22 constituting the path L5, propagated through the fifth polarization-maintaining single-mode fiber 22, passed through the polarization plane rotation portion 60, propagated through the sixth polarization-maintaining single-mode fiber 24 constituting the path L6, and input into the multiplexer 40 from the second port 40-2 of the multiplexer 40. The control light pulse is then output from the third port 40-3 of the multiplexer 40 and input into the fourth polarization-maintaining single-mode fiber 18.

When the control light pulse passes through the polarization plane rotation portion 60, its polarization direction is rotated 90 degrees, and therefore, the P component and S component of the control light pulse when propagating through the fifth polarization-maintaining single-mode fiber 22 become the S component and P component, respectively, when propagating through the sixth polarization-maintaining single-mode fiber 24. Hence, when the signal light pulse and control light pulse are multiplexed by the multiplexer 40, input into the fourth polarization-maintaining single-mode fiber 18, and transmitted in parallel through the fourth polarization-maintaining single-mode fiber 18, the control light component that is parallel to the polarization direction (P direction) of the signal light pulse when passing in parallel through the second polarization-maintaining single-mode fiber 14 constituting the path L2 changes from the P component having the intensity $P_M$ to the P component having the intensity $P_E$ due to the 90 degrees' rotation of the polarization direction of the control light pulse.

In other words, the P component of the control light pulse has an intensity of $P_M$ when passing in parallel through the second polarization-maintaining single-mode fiber 14 constituting the path L2, but when passing in parallel through the fourth polarization-maintaining single-mode fiber 18 constituting the path L4, the intensity remains at $P_M$ and the P component becomes the S component due to the 90 degrees' rotation of the polarization plane. Meanwhile, the S component of the control light pulse has an intensity of $P_E$ when passing in parallel through the second polarization-maintaining single-mode fiber 14 constituting the path L2, but when passing in parallel through the fourth polarization-maintaining single-mode fiber 18 constituting the path L4, the intensity remains at $P_E$ and the S component becomes the P component due to the 90 degrees' rotation of the polarization plane.

Next, a phase shift amount $\phi_{L4}$ generated in the signal light pulse by the mutual phase modulation effect that is produced by the optical Kerr effect realized by the control light pulse when the signal light pulse constituting the signal light and the control light pulse constituting the control light pass in parallel through the fourth polarization-maintaining single-mode fiber 18 constituting the path L4 will be described.

Of the control light pulse input from the second port 40-2 of the multiplexer 40, the component that passes along the path L4 in parallel with the signal light pulse to produce the mutual phase modulation effect in the signal light pulse has an intensity of $P_M/2$ when output from the third port 40-3 that is half the intensity $P_M$ of the P component of the control light pulse when passing in parallel along the path L2. This is due to the multiplexing characteristic of the directional optical coupler or the like used as the multiplexer 40, and thus, when this component is input or output into/from the multiplexer 40, its intensity is halved.

During propagation along the path L2, the component of the control light pulse that generates the mutual phase modulation effect in the signal light pulse is the P component, but during propagation along the path L4 in parallel with the signal light pulse, this component is changed to the S component as a result of propagation as the P component along the path L5 via the wavelength demultiplexer 30 and transmission through the polarization plane rotation portion 60. In other words, this component is the component of the control light pulse that propagates along the path L2 as the P component, and therefore its intensity is equal to $P_M$ at the point of input into the second port 40-2 of the multiplexer 40.

Accordingly, the phase shift amount $\phi_{L4}$ generated in the signal light pulse during propagation along the path L4 is obtained from the following equation (2).

$$\phi_{L4} = 2\gamma(P_M/2)l_4 \quad (2)$$

Here, $l_4$ is the length of the fourth polarization-maintaining single-mode fiber 18 constituting the path L4.

A phase shift amount $\phi_{total}$ generated in the signal light pulse during propagation along the path L2 and the path L4 in parallel with the control light pulse is the sum of the phase shift amounts obtained in the equations (1') and (2), and is therefore obtained using the following equation (3).

$$\phi_{total} = \phi_{L2} + \phi_{L4} = 2\gamma(P_E l_2 + (P_M/2)l_4) \quad (3)$$

Here, the path L2 and the path L4 are considerably longer than the path L1, the path L3, the path L5, and the path L6, and it may therefore be assumed that the phase shift produced in the signal light pulse is generated only in the path L2 and path L4.

In other words, the phase shift amount produced in the signal light pulse on the paths L1, L3, L5, and L6 is negligible. Incidentally, the paths L2 and L4 have a length of several kilometers, whereas the paths L1, L3, L5, and L6 have a length of several tens of centimeters, and hence the length ratio is 10,000:1. As described above, the phase shift amount is commensurate with the optical path length, and hence it can be seen that the phase shift amount produced in the signal light pulse on the paths L1, L3, L5, and L6 is negligible.

Here, it is assumed that the length $l_4$ of the path L4 is set to be twice the length $l_2$ of the path L2. In other words, assuming that $L=l_2=l_4/2$, the equation (3) can be written as follows.

$$\phi_{total} = 2\gamma L(P_E + P_M) = 2\gamma LP \quad (4)$$

It can be seen from the equation (4) that the phase shift amount produced in the signal light pulse is determined according to the input intensity P $(=P_E+P_M)$ of the control light, and is not dependent on the ratio $P_E/P_M$ of $P_E$ to $P_M$. In other words, as long as the input intensity of the control light is constant, the phase shift amount produced in the signal light pulse is unchanging, regardless of the polarization state (obtained from the ratio of $P_E$ to $P_M$) of the control light.

Hence, even if the polarization state of the optical pulse signal serving as the input control light varies, the switching operation is not affected, and therefore an optical switch which is capable of realizing a stable switching operation can be obtained. In other words, an optical switch which is capable of realizing a sufficiently stable operation for use in a 3R optical repeater or the like can be provided.

Considering that the first optical switch is an interference system for generating interference between the first signal light and second signal light propagating in the CW direction and CCW direction of the optical waveguide loop circuit 101, the secondary optical waveguide loop circuit formed by the paths L3, L5, L6 is disposed in relation to the main optical waveguide loop circuit 101 formed by the paths L1, L2, L4, and it may therefore be assumed that the secondary optical waveguide loop circuit serves as the element causing instability in the switching operation of the first optical switch. However, the secondary optical waveguide loop circuit does not modulate the phase of the signal light.

More specifically, the first signal light that propagates through the optical waveguide loop circuit 101 in the CW direction is not led onto the secondary optical waveguide loop circuit by the wavelength demultiplexer 30. Further, the second signal light that is propagated through the optical waveguide loop circuit 101 in the CCW direction is propagated along the path L4 and then propagated along two subsequent paths.

On a first path of these two subsequent paths, the second signal light is input into the third port 40-3 of the multiplexer 40 after propagating along the path L4, output from the first port 40-1, propagated along the path L3, input into the wavelength demultiplexer 30 from the second port 30-2 of the wavelength demultiplexer 30, output from the first port 30-1, and thus input onto the path L2. In this case, the second signal light propagates along the path L3, but as described above, the path L3 is extremely short, and therefore the effect thereof on the phase of the second signal light is negligible.

On a second path of the two subsequent paths, the second signal light is input into the third port 40-3 of the multiplexer 40 following propagation along the path L4, output from the second port 40-2, propagated along the path L6, passed through the polarization plane rotation portion 60, propagated along the path L5, and input into the wavelength demultiplexer 30 from the third port 30-3 of the wavelength demultiplexer 30. After being input into the wavelength demultiplexer 30 from the third port 30-3 of the wavelength demultiplexer 30, the second signal light which propagates along this second path is not output from either the first port 30-1 or second port 30-2.

The wavelength of the second signal light is λs, which may be transmitted through the dielectric multilayer film or other element constituting the wavelength demultiplexer 30. Hence, the second signal light that is input into the wavelength demultiplexer 30 from the third port 30-3 of the wavelength demultiplexer 30 ought to pass through the dielectric multilayer film or other element constituting the wavelength demultiplexer 30. It therefore stands to reason that the second signal light is not output from the first port 30-1 of the wavelength demultiplexer 30. The reason why the second signal light is also not linked to the second port 30-2 on the opposite side of the dielectric multilayer film or other element to the third port 30-3 will now be described with reference to FIG. 5.

In FIG. 5, the first port 30-1 and third port 30-3 are set on the same side of the wavelength demultiplexer 30 using the dielectric multilayer film or other element, whereas the second port 30-2 is set on the opposite side thereto. Moreover, the second port 30-2 is provided collinearly with the propagation direction of a light beam input from the first port 30-1. On the other hand, no input/output port is provided collinearly with the propagation direction of a light beam input from the third port 30-3. As a result, when the second signal light having the transmission wavelength λs is input into the wavelength demultiplexer 30 from the third port 30-3 of the wavelength demultiplexer 30, the second signal light passes through the wavelength demultiplexer 30, but since the second port 30-2 is not provided collinearly with the propagation direction of a light beam input from the third port 30-3, the second signal light is not linked to the second port 30-2.

In any case, the secondary optical waveguide loop circuit does not modulate the phase of the signal light, and therefore, since the phase of the signal light is not modulated by the secondary optical waveguide loop circuit, the switching operation of the first optical switch is not obstructed.

According to the first optical switch described above, the phase shift amount produced in the signal light can be determined regardless of the polarization state of the control light as long as there is no variation in the intensity of the control light. As a result, the first optical switch of the present invention may be used as an optical switch which is capable of realizing a switching operation that is not dependent on the polarization state of the control light, as required for use in a 3R optical repeater or the like.

In relation to the mutual phase modulation produced by the optical Kerr effect that is generated by the control light pulse in the operation of the first optical switch described above, the control light pulse has a parallel polarization direction to the signal light pulse, and only the contribution of the control light pulse propagating in the same direction as, and parallel to, the signal light pulse is taken into account. However, in actuality, the optical Kerr effect is also generated when the polarization planes of the signal light and control light are orthogonal to each other. In this case, however, the nonlinear optical coefficient is smaller than that of a case in which the polarization planes of the signal light and control light are parallel to each other. Hereafter, the nonlinear optical coefficient at which the optical Kerr effect is obtained when the polarization planes of the signal light and control light are orthogonal to each other will be set as γ'.

The optical Kerr effect is produced not only when the control light pulse is propagated in the same direction as, and parallel to, the signal light pulse, but also when the signal light pulse and control light pulse are propagated in opposite directions so as to collide on the optical waveguide loop circuit. In this case, the nonlinear optical coefficient at which the optical Kerr effect is obtained is set as γ' when the polarization planes of the signal light and control light are orthogonal, and γ when the polarization planes of the two lights are parallel.

Cases in which the optical Kerr effect must be taken into consideration when the polarization planes of the signal light and control light are orthogonal to each other and when the signal light pulse and control light pulse are propagated in opposite directions so as to collide on the optical waveguide loop circuit will now be described with reference to FIGS. 7A and 7B.

Figure 7A:
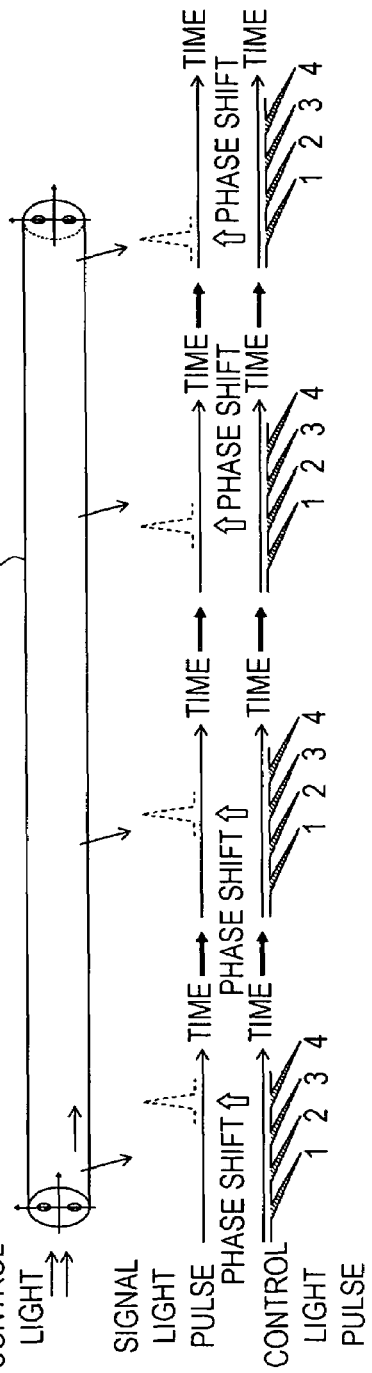
FIG. 7 is a pattern diagram showing a temporal positional relationship between a signal light pulse and a control light pulse.
Figure 7B:
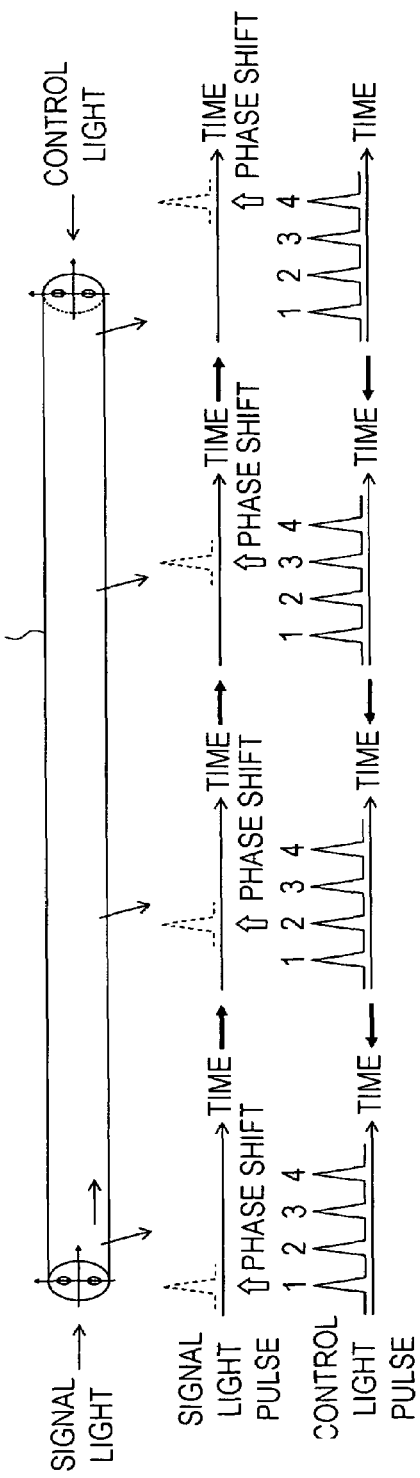

FIGS. 7A and 7B illustrate in pattern form the temporal positional relationship between the signal light pulse and control light pulse. In FIGS. 7A and 7B, the polarization-maintaining nonlinear optical fiber forming the optical waveguide loop circuit through which the signal light pulse propagates is illustrated in a linear cylindrical form, and the propagation form of the signal light pulse and control light pulse that propagate through this nonlinear optical fiber is illustrated as a pattern.

FIG. 7A shows the manner in which the signal light pulse and control light pulse propagate through the polarization-maintaining single-mode fiber in the same direction, and also illustrates a case in which the polarization planes of the signal light pulse and control light pulse are orthogonal.

The difference between the wavelength λs of the signal light and the wavelength λp of the control light is several nm, and hence, if the polarization planes of the signal light pulse and control light pulse are parallel to each other, there is substantially no difference in the phase velocity at which the signal light pulse and control light pulse propagate through the polarization-maintaining nonlinear optical fiber. However, when the polarization planes of the signal light pulse and control light pulse are orthogonal to each other, the phase velocity of propagation through the polarization-maintaining nonlinear optical fiber differs considerably due to the polarization mode dispersion of the nonlinear optical fiber. In other words, even when the signal light pulse and control light pulse have a substantially identical wavelength, if polarization mode dispersion exists in the polarization-maintaining nonlinear optical fiber through which the signal light pulse and control light pulse propagate, the effective index differs according to the angle formed by the direction of the polarization plane of the propagating light and the optical axis of the nonlinear optical fiber. Therefore, in cases where the polarization planes of the signal light pulse and control light pulse are orthogonal, the difference in phase velocity between the two cannot be ignored.

As shown in FIG. 7A, the positional relationship between the signal light pulse shown by the broken line and the control light pulse shown by the solid line deviates gradually during propagation through the nonlinear optical fiber when the respective polarization planes of the signal light pulse and control light pulse are orthogonal. FIG. 7A shows a case in which the phase velocity of the control light pulse is higher than the phase velocity of the signal light pulse. As a result, the control light pulse gradually overtakes the signal light pulse. When the phase velocity of the control light pulse is lower than the phase velocity of the signal light pulse, a similar situation is established, and hence in the following, similar descriptions thereof have been omitted.

When the delay time of the signal light pulse in relation to the control light pulse due to the phase velocity difference caused by polarization mode dispersion in the polarization-maintaining single-mode fiber is considerably longer than the inverse of the bit rate of the control light pulse, the signal light pulse sweeps the control light pulse several times. At this time, the phase shift amount produced in the signal light pulse by the optical Kerr effect is commensurate with the duty factor of the control light pulse on the temporal axis. The temporal waveform of the control light pulse is not reflected in the temporal waveform of the signal light pulse. Hence, in the following description, this type of phase shift produced in the signal light pulse by the optical Kerr effect will be referred to as phase bias, and the phase shift amount will be referred to as the phase bias component.

When the signal light pulse and control light pulse are propagated through the polarization-maintaining single-mode fiber in the same direction with the respective polarization planes thereof orthogonal to each other, the phase bias component is added to all of the signal light pulses.

Assuming that the phase bias component is $\phi_\perp$, the phase bias component is obtained using the following equation (5).

$$\phi_\perp = 2\gamma' PLd(1/M) \quad (5)$$

Here, P is the control light intensity, L is the length of the polarization-maintaining single-mode fiber, and d is the duty ratio, which is a value obtained by dividing the time span of thecontrollight pulse by the inverse of the bit rate. Further, 1/M is the ratio between the temporal axis positions in which the control light pulses do and do not exist, and serves as a mark rate indicating the emergence rate of the control light pulse on the temporal axis per unit time.

FIG. 7B shows a case in which the signal light pulse and control light pulse are propagated through the polarization-maintaining single-mode fiber in opposite directions, and the polarization planes of the signal light pulse and control light pulse are parallel. In this case, the signal light pulse collides with the control light pulse several times during propagation through the polarization-maintaining single-mode fiber, which is a nonlinear optical fiber. In other words, when the polarization-maintaining single-mode fiber is sufficiently long and the time required for the signal light pulse to propagate completely through the polarization-maintaining single-mode fiber is sufficiently greater than the inverse of the bit rate of the control light pulse, the signal light pulse collides with several control light pulses.

In the case described above, when the polarization planes of the signal light pulse and control light pulse are parallel and the signal light pulse and control light pulse propagate through the polarization-maintaining single-mode fiber in opposite directions, the phase shift amount produced in the signal light pulse by the optical Kerr effect is commensurate with the duty factor of the control light pulse on the temporal axis, similarly to the case illustrated in FIG. 7A. Also similarly to the case illustrated in FIG. 7A, the temporal waveform of the control light pulse is not reflected in the temporal waveform of the signal light pulse. In other words, the phase shift produced in the signal light pulse by the optical Kerr effect becomes a phase bias. This phase bias component $\phi''$ is obtained from the following equation (6).

$$\phi'' = 2\gamma PLd(1/M) \quad (6)$$

Note that when the polarization planes of the signal light pulse and control light pulse are orthogonal and the signal light pulse and control light pulse propagate through the polarization-maintaining single-mode fiber in opposite directions, the phase bias component in this case is determined by replacing the $\gamma$ in the equation (6) with $\gamma'$.

The effects of the phase bias component $\phi_\perp$ or $\phi''$ obtained in the equations (5) and (6) on the operation of the first optical switch will now be described.

First, when the signal light is propagated through the optical waveguide loop circuit in the same direction as the control light, only $\phi_\perp$ obtained in the equation (5) contributes to the signal light (first signal light) propagated in the CW direction. On the other hand, when the signal light is propagated through the optical waveguide loop circuit in the opposite direction to the control light, both $\phi_\perp$ and $\phi''$ obtained in the equations (5) and (6) contribute to the signal light (second signal light) propagated in the CCW direction.

The amount of the phase bias component $\phi_\perp$ contributed from the polarization plane component of the control light pulse in an orthogonal direction to the polarization plane of the signal light pulse is equal in relation to both the first signal light and second signal light, and hence, in the switching operation of the first optical switch, $\phi_\perp$ is canceled out and may be considered non-existent. In other words, only the phase bias component $\phi''$ obtained from the equation (6), which contributes to the second signal light, affects the switching operation of the first optical switch.

The phase bias component $\phi''$ which contributes to the second signal light causes the phase shift of the second signal light to be generated in the first signal light. Hence, this phase shift component $\phi''$ is added to the phase shift of the first signal light pulse produced by the control light pulse running parallel to the first signal light pulse, which is required in the switching operation. More specifically, the addition of the phase bias component $\phi''$ causes an obstruction to an operation of the first optical switch when the control light pulse and first signal light pulse are propagated in parallel through the optical waveguide loop circuit in the CW direction such that a phase difference equal to $\pi$ is generated between the first signal light pulse and second signal light pulse.

Here, the magnitude of the phase bias component $\phi''$ obtained from the equation (6) will be estimated. During standard optical communication, the mark rate 1/M is typically ½, and the duty ratio d of the control light pulse is typically approximately 0.1, and therefore, the magnitude of the phase bias component $\phi''$ in this case is $\phi''=2\gamma PLd(1/M) =\pi\times0.1\times(1/2)=0.05\pi$, where $2\gamma PL=\pi$. Here, the phase shift amount $\phi$ required for switching, which is produced in the signal light pulse by the control light pulse, is obtained from the equation (1), and hence $2\gamma PL=\pi$ is set envisaging a case in which $\phi(=2\gamma PL)$, obtained from the equation (1), equals exactly $\pi$.

During optical communication in which the mark rate $1/M=1/2$ and the duty ratio d of the control light pulse is set to approximately 0.1, the phase bias component $\phi''$ has a small magnitude of $0.05\pi$, and therefore has substantially no effect on the operation of the optical switch.

However, in optical communication using a NRZ (non return to zero) optically encoded signal light, the duty ratio d corresponds to one, and hence the magnitude of the phase bias component $\phi''$ in relation to $\phi(=2\gamma PL)=\pi$, which is the condition under which the signal light pulse is switched by the control light pulse, is $\phi''=2\gamma PLd(1/M)=\pi\times1\times(1/2)=0.5\pi$, which serves as a standard for malfunctioning of the first optical switch. Hence, when the duty ratio d has a magnitude in the vicinity of one, for example during optical communication using a NRZ optically encoded signal light, a phase bias circuit is required to remove the phase bias component $\phi''$ obtained from the equation (6).

[First Phase Bias Circuit]

An operating principle of the first phase bias circuit 501 will now be described with reference to FIGS. 1 and 2. In FIG. 2, the polarization-maintaining single-mode fibers constituting the optical waveguide loop circuit for guiding the signal light are illustrated in cylindrical form. For ease of description, the propagation direction of the signal light or control light is set as a z direction, and the orthogonal directions thereto are set as an x direction and a y direction.

The first phase bias circuit 501 is disposed (at a point on) any one path selected from the paths L1 through L4 constituting the optical waveguide loop circuit through which the signal light is guided. In FIG. 1, the phase bias circuit 500 is set on the path L4. Correspondingly, the polarization-maintaining single-mode fiber 901 is set as a fourth polarization-maintaining single-mode fiber 18a, and the polarization-maintaining single-mode fiber 905 is set as a fourth polarization-maintaining single-mode fiber 18b. Needless to say, the phase bias circuit 500 may be inserted onto any of the paths L1, L2, and L3, rather than the path L4, and the path selection is a design consideration.

Description will be provided assuming that a signal light, which is a linearly polarized light having a parallel polarization plane to the slow axis, is input from the left side of the polarization-maintaining single-mode fiber 901. More specifically, a case in which a signal light propagates through the fourth polarization-maintaining single-mode fiber 18a in the CCW direction from the fourth polarization-maintaining single-mode fiber 18a to the fourth polarization-maintaining single-mode fiber 18b, i.e. the second signal light, is envisaged.

The second signal light is output from the right side (on the paper surface of FIG. 2, likewise hereafter) of the polarization-maintaining single-mode fiber 901, whereupon the polarization plane direction thereof is rotated 45 degrees (45 degrees clockwise in FIG. 2) by the first Faraday rotator 902. The second signal light is then input into the Babinet-Soleil compensator 903. When input into the Babinet-Soleil compensator 903, the polarization plane direction of the second signal light is matched with the optical axis direction (the y axis direction in FIG. 2) of the Babinet-Soleil compensator 903. The second signal light is then input into the second Faraday rotator 904, where the polarization plane direction thereof is rotated 45 degrees (45 degrees counter-clockwise in FIG. 2). Following output from the second Faraday rotator 904, the second signal light is input into the polarization-maintaining single-mode fiber 905 (fourth polarization-maintaining single-mode fiber 18b).

When input into the polarization-maintaining single-mode fiber 905 (fourth polarization-maintaining single-mode fiber 18b), the polarization plane direction of the second signal light is parallel to the slow axis of the polarization-maintaining single-mode fiber 905, and hence the second signal light propagates through the polarization-maintaining single-mode fiber 905 as a linearly polarized light that is parallel to the slow axis. The second signal light is then output from the polarization-maintaining single-mode fiber 905.

Next, a case in which a signal light (first signal light) which is a linearly polarized light having a parallel polarization plane to the slow axis is input from the right side of the polarization-maintaining single-mode fiber 905 will be described. The first signal light is output from the left side of the polarization-maintaining single-mode fiber 905 (fourth polarization-maintaining single-mode fiber 18b), whereupon its polarization direction is rotated 45 degrees counter-clockwise by the second Faraday rotator 904. The first signal light is then input into the Babinet-Soleil compensator 903. When input into the Babinet-Soleil compensator 903, the polarization plane direction of the first signal light is matched with the optical axis direction (the x axis direction in FIG. 2) of the Babinet-Soleil compensator 903.

Figure 2:
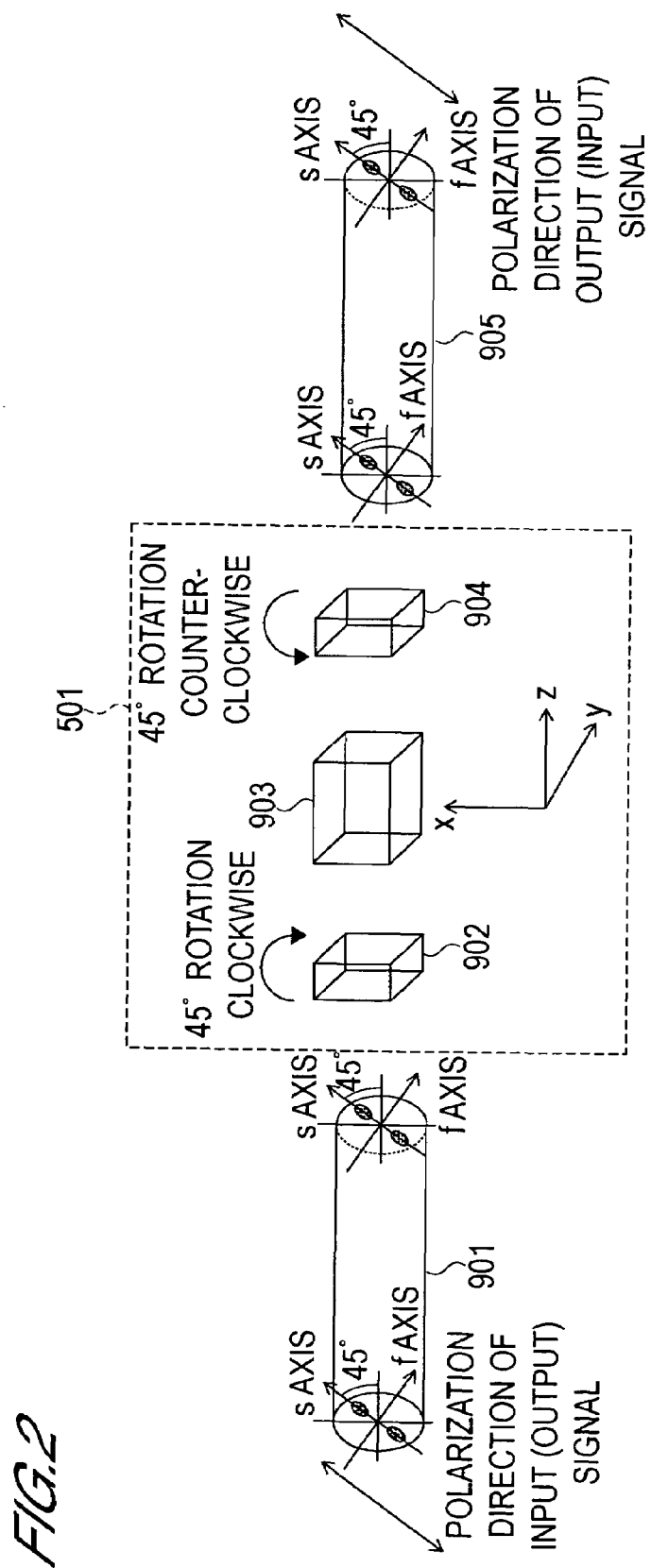
FIG. 2 is a block diagram of a first phase bias circuit.

The first signal light is then input into the first Faraday rotator 902, where the polarization plane direction thereof is rotated 45 degrees (45 degrees clockwise in FIG. 2). Following output from the first Faraday rotator 902, the first signal light is input into the polarization-maintaining single-mode fiber 901 (fourth polarization-maintaining single-mode fiber 18a).

When input into the polarization-maintaining single-mode fiber 901 (fourth polarization-maintaining single-mode fiber 18a), the polarization plane direction of the first signal light is parallel to the slow axis of the polarization-maintaining single-mode fiber 901, and hence the first signal light propagates through the polarization-maintaining single-mode fiber 901 as a linearly polarized light that is parallel to the slow axis. The first signal light is then output from the left end of the polarization-maintaining single-mode fiber 901.

Tables 1A and 1B summarize the manner in which the polarization plane direction of the first and second signal lights changes during propagation through the first phase bias circuit 501. In Tables 1A and 1B, the slow axis and fast axis are abbreviated to s axis and f axis respectively. The advancement direction of the lights are illustrated by arrows pointing rightward or leftward.

Table 1A shows a case in which the polarization planes of the first and second signal lights are parallel to the slow axis. It can be seen from Table 1A that the polarization plane directions of the first signal light and second signal light are orthogonal only in the phase compensator (Babinet-Soleil compensator 903), and parallel to each other during propagation through the other optical element parts. Hence, the phase bias component can be canceled out in relation to the first and second signal lights in the Babinet-Soleil compensator 903.

When the Babinet-Soleil compensator 903 is used, the phase bias component can be canceled out easily by adjusting the phase compensation amount of the Babinet-Soleil compensator 903 in accordance with the magnitude of the value of the phase bias component. In other words, the phase difference amount between the orthogonal polarization components, corresponding to ϕ obtained in the equation (6), can be compensated for by the Babinet-Soleil compensator 903.

It can be seen from the above description that a stable switching operation is secured even when the duty ratio of the control light pulse is large.

Note that Table 1B summarizes a case in which the polarization plane directions of the first and second signal lights input into the first phase bias circuit 501 shown in FIG. 2 are parallel to the fast axis. Similarly to the case shown in Table 1A, in which the polarization plane directions of the first and second signal lights are parallel to the slow axis, the phase bias component can be canceled out in the Babinet-Soleil compensator 903. In other words, the phase bias component can be canceled out using the first phase bias circuit whether the signal light input into the first optical switch 101 is TE polarization or TM polarization.

[Second Phase Bias Circuit]

An operating principle of the second phase bias circuit 502 will now be described with reference to FIGS. 1 and 3. In FIG. 3, the polarization-maintaining single-mode fibers constituting the optical waveguide loop circuit for guiding the signal light are illustrated in cylindrical form.

The second phase bias circuit 502 is disposed (at a point on) any one path selected from the paths L1 through L4 constituting the optical waveguide loop circuit through which the signal light is guided. In FIG. 1, the phase bias circuit 500 is set on the path L4. Correspondingly, the polarization-maintaining single-mode fiber 1001 is set as the fourth polarization-maintaining single-mode fiber 18a, and the polarization-maintaining single-mode fiber 1005 is set as the fourth polarization-maintaining single-mode fiber 18b. Needless to say, the phase bias circuit 500 may be inserted onto any of the paths L1, L2, and L3, rather than the path L4, and the path selection is a design consideration.

Description will be provided assuming that a signal light, which is a linearly polarized light having a parallel polarization plane to the slow axis, is input from the left side of the polarization-maintaining single-mode fiber 1001. More specifically, a case in which a signal light propagates through the fourth polarization-maintaining single-mode fiber 18a in the CCW direction from the fourth polarization-maintaining single-mode fiber 18a to the fourth polarization-maintaining single-mode fiber 18b, i.e. the second signal light, is envisaged.

The second signal light is output from the right side of the polarization-maintaining single-mode fiber 1001, whereupon the polarization plane direction thereof is rotated 45 degrees (45 degrees clockwise in FIG. 3) by the first Faraday rotator 1002. The second signal light is then input into the short polarization-maintaining single-mode fiber 1003. When input into the short polarization-maintaining single-mode fiber 1003, the polarization plane direction of the second signal light is matched with the optical axis direction (the slow axis direction, which is the y axis direction in FIG. 3) of the short polarization-maintaining single-mode fiber 1003. The second signal light is then input into the second Faraday rotator 1004, where the polarization plane direction thereof is rotated 45 degrees (45 degrees counter-clockwise in FIG. 3). Following output from the second Faraday rotator 1004, the second signal light is input into the polarization-maintaining single-mode fiber 1005 (fourth polarization-maintaining single-mode fiber 18b).

When input into the polarization-maintaining single-mode fiber 1005 (fourth polarization-maintaining single-mode fiber 18b), the polarization plane direction of the second signal light is parallel to the slow axis of the polarization-maintaining single-mode fiber 1005, and hence the second signal light propagates through the polarization-maintaining single-mode fiber 1005 as a linearly polarized light that is parallel to the slow axis. The second signal light is then output from the polarization-maintaining single-mode fiber 1005.

Next, a case in which a signal light (first signal light), which is a linearly polarized light having a parallel polarization plane to the slow axis, is input from the right side of the polarization-maintaining single-mode fiber 1005 will be described. The first signal light is output from the left side of the polarization-maintaining single-mode fiber 1005 (fourth polarization-maintaining single-mode fiber 18b), whereupon its polarization plane direction is rotated 45 degrees counter-clockwise by the second Faraday rotator 1004. The first signal light is then input into the short polarization-maintaining single-mode fiber 1003. When input into the short polarization-maintaining single-mode fiber 1003, the polarization plane direction of the first signal light is matched with the optical axis direction (the x axis direction in FIG. 3) of the short polarization-maintaining single-mode fiber 1003.

Figure 3:
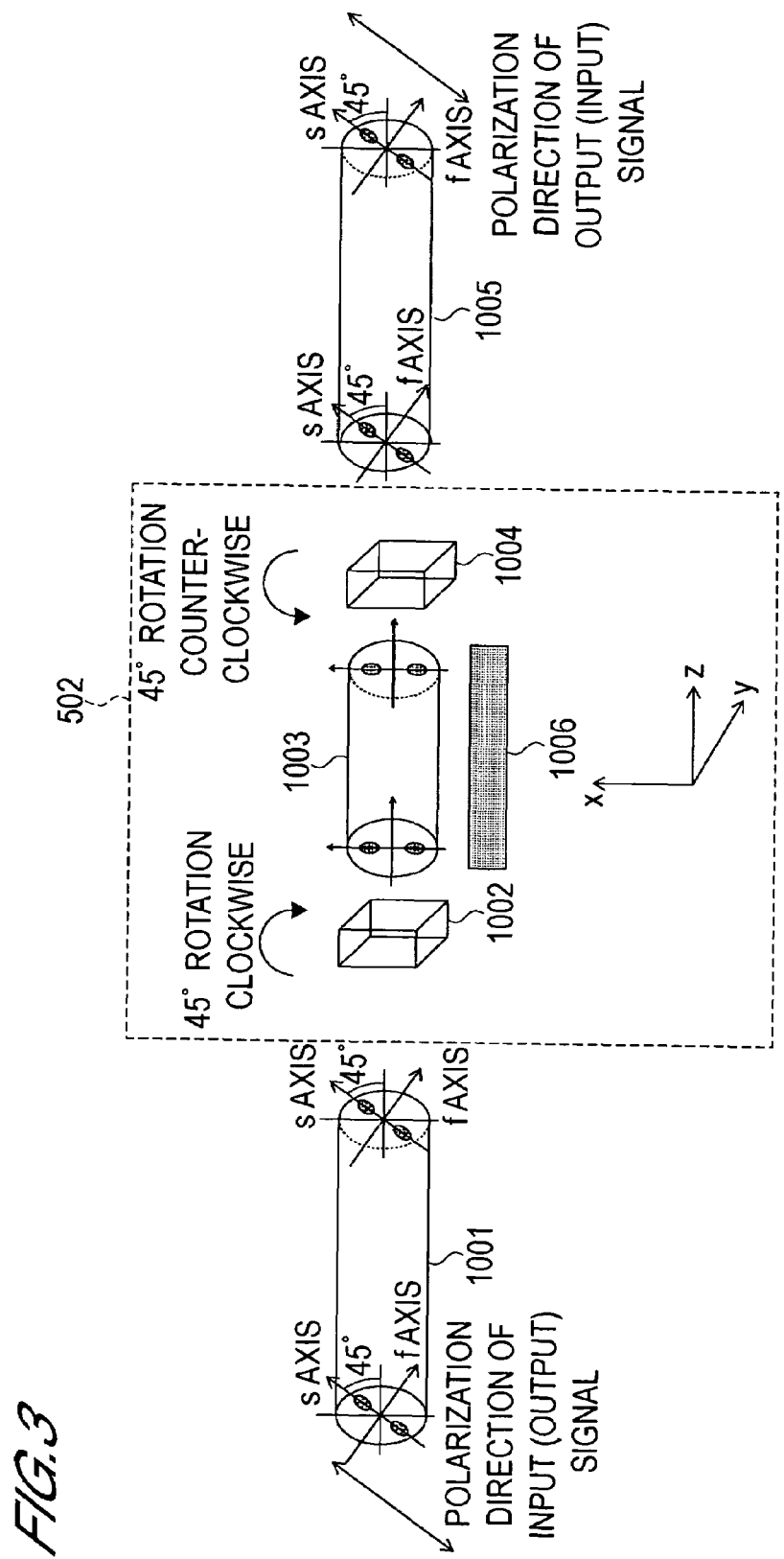
FIG. 3 is a block diagram of a second phase bias circuit.

The first signal light is then input into the first Faraday rotator 1002, where the polarization plane direction thereof is rotated 45 degrees (45 degrees clockwise in FIG. 3). Following output from the first Faraday rotator 1002, the first signal light is input into the polarization-maintaining single-mode fiber 1001 (fourth polarization-maintaining single-mode fiber 18a).

When input into the polarization-maintaining single-mode fiber 1001 (fourth polarization-maintaining single-mode fiber 18a), the polarization plane direction of the first signal light is parallel to the slow axis of the polarization-maintaining single-mode fiber 1001, and hence the first signal light propagates through the polarization-maintaining single-mode fiber 1001 as a linearly polarized light that is parallel to the slow axis. The first signal light is then output from the polarization-maintaining single-mode fiber 1001.

To determine the ways in which the polarization plane directions of the first and second signal lights change during propagation through the second phase bias circuit 502, the Babinet-Soleil compensator 903 should be replaced with the short polarization-maintaining single-mode fiber 1003 in Tables 1A and 1B, which summarize the first phase bias circuit. Similarly to the first phase bias circuit, a stable switching operation is secured even when the duty ratio of the control light pulse is large.

In the second phase bias circuit 502, the short polarization-maintaining single-mode fiber 1003, constituted such that the temperature thereof is controlled by a heater 1006, is used as a phase compensation element.

A phase bias component $\Delta\phi$ that can be canceled out using the short polarization-maintaining single-mode fiber 1003 is obtained from the following equation (7).

$$\Delta\phi = (2\pi B \Delta L)/\lambda s \quad (7)$$

Here, $\Delta L$ is the length of the short polarization-maintaining single-mode fiber 1003, and B is the difference between the effective index relating to the polarization plane component that is parallel to the slow axis and the effective index relating to the polarization plane component that is parallel to the fast axis. This will occasionally be referred to as the "mode refractive index" hereafter.

The temperature dependence of the mode refractive index B is obtained from the following equation (8).

$$B = B_0 + \Delta B \Delta T \quad (8)$$

Here, $B_0$ is the mode refractive index at room temperature (25° C.), and in the case of many commercially available PANDA optical fibers, $B_0$ equals approximately $3\times10^{-4}$ in relation to a wavelength of 1.55 μm (the wavelength λs of the signal light). Further, ΔT is the temperature variation, and ΔB is a temperature coefficient. In the case of many commercially available PANDA optical fibers, ΔB equals approximately $4\times10^{-7}$.

In the second phase bias circuit 502, the phase bias component Δϕ that can be canceled out by controlling the temperature of the short polarization-maintaining single-mode fiber 1003 using the heater 1006 is set to a required value.

Here, the short polarization-maintaining single-mode fiber 1003 and heater 1006 must satisfy the following technical requirements.

(A) Δϕ=2π must be realized within the variable temperature range of the heater 1006.
(B) Δϕ must be set with sufficient precision to stabilize the switching operation within the precision range of the set temperature that can be controlled by the heater 1006.
(C) Fluctuation of Δϕ must be small enough to ensure that the switching operation is stable within the fluctuation range of the wavelength λs of the signal light.

In the following, simulations are performed envisaging the many commercially available PANDA optical fibers having parameters such as the temperature coefficient described above, to investigate whether or not these three technological requirements can be satisfied. Here, the maximum value of the temperature variation ΔT is assumed to be 50° C. Further design conditions are that the spectral bandwidth of the signal light is 1 nm, and the width of the phase bias amount corresponding to this wavelength bandwidth is held within 0.02π (1% of the 2π required to realize the switching operation).

The phase bias component Δϕ that can be canceled out is obtained as $\Delta\phi=(2\pi B\Delta L)/\lambda s$. Further, since $\Delta B=4\times10^{-7}$ is smaller than $B_0=3\times10^{-4}$ and can therefore be ignored, $\Delta\phi=(2\pi B_0\Delta L)/\lambda s$ is obtained. Hence it is learned that to realize Δϕ=2π, approximately $\Delta L=(\lambda s)/(B_0)=(1.55\times10^{-6})/(3\times10^{-4})\approx0.52$ cm or more is sufficient. A polarization-maintaining single-mode fiber having this approximate length can be set easily.

From the equations (7) and (8), the variation in the phase bias amount per temperature variation of 1° C. and the variation in the phase bias amount per fluctuation of 1 nm in the wavelength λs of the signal light are estimated.

From the equations (7) and (8), $\Delta\phi=(2\pi(B_0+\Delta B\Delta T)\Delta L)/\lambda s$ is obtained. Further, the variation $\Delta(\Delta\phi_T)$ in the phase bias amount per temperature variation of 1° C. becomes $\Delta(\Delta\phi_T)=\delta(\Delta T)/=(2\pi\Delta B\Delta T)/\lambda s$. Meanwhile, the variation $\Delta(\Delta\phi\lambda)$ in the phase bias amount per fluctuation of 1 nm in the wavelength λs of the signal light becomes $\Delta(\Delta\phi\lambda)=\delta(\Delta\phi)/\delta\lambda s=-((2\pi(B_0+\Delta B\Delta T)\Delta L/\lambda s^2)$, and assuming that ΔBΔT is sufficiently smaller than $B_0$ to be ignored, $\Delta(\Delta\phi\lambda)\approx-((2\pi B_0\Delta L)/\lambda s^2)$ is obtained.

In other words, the variation in Δϕ when the wavelength varies by Δλ is calculated as $|\Delta(\Delta\phi\lambda)\times\Delta\lambda|=((2\pi(B_0+\Delta B\Delta T)\Delta\lambda/\lambda s^2)$. Here, if it is assumed that $|\Delta(\Delta\phi\lambda)\times\Delta\lambda|=0.02\pi$ in relation to λs=1550 nm and Δλ=1 nm, then $\Delta L=(\lambda\times^2|\Delta(\Delta\phi\lambda)\times\Delta\lambda|)/(2\pi B_0\Delta\lambda)=(1.55^2\times10^{-12}\times0.02\pi)/(2\pi\times3\times10^{-4}\times1\times10^{-9})=8.008\times10^{-2}$ (m)≈8 cm is obtained with $B_0=3\times10^{-4}$. Hence, as long as ΔL is no more than approximately 8 cm, the three technological requirements can be satisfied sufficiently.

Further, the variation in Δϕ when the temperature varies by ΔT is calculated as $|\Delta(\Delta\phi_T)|=(2\pi\Delta B\Delta L\Delta T)\Delta\lambda$, and therefore, if it is assumed that $|\Delta(\Delta\phi\lambda)\times\Delta\lambda|=0.02\pi$, then $\Delta T=(\lambda s|\Delta(\Delta\phi_T)|)/(2\pi\Delta B\Delta L)=(1.55\times10^{-6}\times0.02\pi)/(2\pi\times4\times10^{-7}\times8\times10^{-2})=0.484375°$ C.≈0.48° is obtained with λs=1550 nm, $\Delta B=4\times10^{-7}$, and ΔL=8 cm.

As described above, the length ΔL of the short polarization-maintaining single-mode fiber 1003 should be no more than 8 cm to satisfy this condition. Further, by setting a design condition according to which the allowable value of the variation Δϕ in the phase bias when the temperature fluctuates within the precision range of the temperature control performed by the heater 1006 is suppressed to no more than 0.02π, as described above, the determined precision of the temperature control is 0.48° C. as described above. This degree of temperature control can be realized easily.

From the results of the investigation described above, it can be seen that using the short PANDA type optical fiber 1003 having a length of approximately 8 cm, similar functions to those of the first phase bias circuit can be realized, and hence the second phase bias circuit can be constituted.

[Third Phase Bias Circuit]

An operating principle of the third phase bias circuit 503 will now be described with reference to FIGS. 1 and 4. In FIG. 4, the polarization-maintaining single-mode fibers constituting the optical waveguide loop circuit for guiding the signal light are illustrated in cylindrical form.

The third phase bias circuit 503 is disposed (at a point on) any one path selected from the paths L1 through L4 constituting the optical waveguide loop circuit through which the signal light is guided. In FIG. 1, the phase bias circuit 500 is set on the path L4. Correspondingly, the polarization-maintaining single-mode fiber 1101 is set as the fourth polarization-maintaining single-mode fiber 18a, and the polarization-maintaining single-mode fiber 1105 is set as the fourth polarization-maintaining single-mode fiber 18b. Needless to say, the phase bias circuit 500 may be inserted onto any of the paths L1, L2, and L3, rather than the path L4, and the path selection is a design consideration.

Description will be provided assuming that a signal light, which is a linearly polarized light having a parallel polarization plane to the slow axis, is input from the left side of the polarization-maintaining single-mode fiber 1101. More specifically, a case in which a signal light propagates through the fourth polarization-maintaining single-mode fiber 18a in the CCW direction from the fourth polarization-maintaining single-mode fiber 18a to the fourth polarization-maintaining single-mode fiber 18b, i.e. the second signal light, is envisaged.

The second signal light is output from the right side of the polarization-maintaining single-mode fiber 1101, whereupon the polarization plane direction thereof is rotated 45 degrees (45 degrees clockwise in FIG. 4) by the first Faraday rotator 1102. The second signal light is then input into the electro-optic element 1103. When input into the electro-optic element 1103, the polarization plane direction of the second signal light is matched with the c axis direction (the x axis direction in FIG. 4) of the electro-optic element 1103. The second signal light is then input into the second Faraday rotator 1104, where the polarization plane direction thereof is rotated 45 degrees (45 degrees counter-clockwise in FIG. 4). Following output from the second Faraday rotator 1104, the second signal light is input into the polarization-maintaining single-mode fiber 1105 (fourth polarization-maintaining single-mode fiber 18b).

When input into the polarization-maintaining single-mode fiber 1105 (fourth polarization-maintaining single-mode fiber 18b), the polarization plane direction of the second signal light is parallel to the slow axis of the polarization-maintaining single-mode fiber 1105, and hence the second signal light propagates through the polarization-maintaining single-mode fiber 1105 as a linearly polarized light that is parallel to the slow axis. The second signal light is then output from the polarization-maintaining single-mode fiber 1105.

Next, a case in which a signal light (first signal light) which is a linearly polarized light having a parallel polarization plane to the slow axis, is input from the right side of the polarization-maintaining single-mode fiber 1105 will be described. The first signal light is output from the left side of the polarization-maintaining single-mode fiber 1105 (fourth polarization-maintaining single-mode fiber 18*b*), whereupon its polarization direction is rotated 45 degrees counter-clockwise by the second Faraday rotator 1104. The first signal light is then input into the electro-optic element 1103. When input into the electro-optic element 1103, the polarization plane direction of the first signal light is matched with an orthogonal direction to the c axis (the y axis direction in FIG. 4) of the electro-optic element 1103.

fiber 18*a*), the polarization plane direction of the first signal light is parallel to the slow axis of the polarization-maintaining single-mode fiber 1101, and hence the first signal light propagates through the polarization-maintaining single-mode fiber 1101 as a linearly polarized light that is parallel to the slow axis. The first signal light is then output from the polarization-maintaining single-mode fiber 1101.

To determine the ways in which the polarization plane directions of the first and second signal lights change during propagation through the third phase bias circuit 503, the Babinet-Soleil compensator 903 should be replaced with the electro-optic element 1103 in Tables 1A and 1B, which summarize the first phase bias circuit. Similarly to the first phase bias circuit, a stable switching operation is secured even when the duty ratio of the control light pulse is large.

TABLE 1A

WHEN POLARIZATION PLANES OF FIRST AND SECOND SIGNAL LIGHTS ARE PARALLEL TO SLOW AXIS

| | POLARIZATION-MAINTAINING SINGLE-MODE FIBER 901 | | PHASE COMPENSATION ELEMENT 903 | | POLARIZATION-MAINTAINING SINGLE-MODE FIBER 905 |
|---|---|---|---|---|---|
| SECOND SIGNAL LIGHT (INPUT FROM LEFT SIDE OF 901) | s AXIS | → | y AXIS | → | s AXIS |
| FIRST SIGNAL LIGHT (INPUT FROM RIGHT SIDE OF 905) | s AXIS | ← | x AXIS | ← | s AXIS |
| CONTROL LIGHT COMPONENT PARALLEL TO s AXIS | s AXIS | → | y AXIS | → | s AXIS |
| CONTROL LIGHT COMPONENT PARALLEL TO f AXIS | f AXIS | → | x AXIS | → | f AXIS |

TABLE 1B

WHEN POLARIZATION PLANES OF FIRST AND SECOND SIGNAL LIGHTS ARE PARALLEL TO FAST AXIS

| | POLARIZATION-MAINTAINING SINGLE-MODE FIBER 901 | | PHASE COMPENSATION ELEMENT 903 | | POLARIZATION-MAINTAINING SINGLE-MODE FIBER 905 |
|---|---|---|---|---|---|
| SECOND SIGNAL LIGHT (INPUT FROM LEFT SIDE OF 901) | f AXIS | → | x AXIS | → | f AXIS |
| FIRST SIGNAL LIGHT (INPUT FROM RIGHT SIDE OF 905) | f AXIS | ← | y AXIS | ← | f AXIS |
| CONTROL LIGHT COMPONENT PARALLEL TO s AXIS | s AXIS | → | y AXIS | → | s AXIS |
| CONTROL LIGHT COMPONENT PARALLEL TO f AXIS | f AXIS | → | x AXIS | → | f AXIS |

Figure 4:
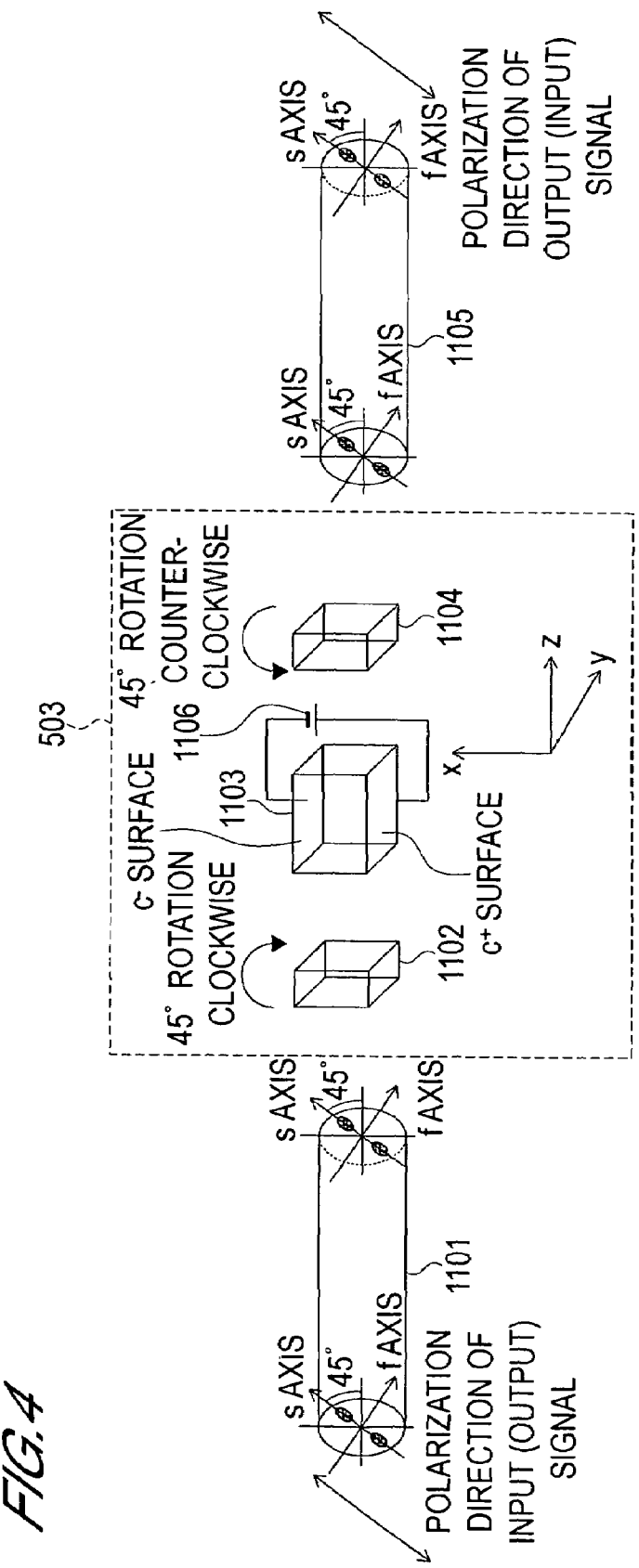
FIG. 4 is a block diagram of a third phase bias circuit.

The first signal light is then input into the first Faraday rotator 1102, where the polarization plane direction thereof is rotated 45 degrees (45 degrees clockwise in FIG. 4). Following output from the first Faraday rotator 1102, the first signal light is input into the polarization-maintaining single-mode fiber 1101 (fourth polarization-maintaining single-mode fiber 18*a*).

When input into the polarization-maintaining single-mode fiber 1101 (fourth polarization-maintaining single-mode In the third phase bias circuit 503, the electro-optic element 1103 is used as the phase compensation element. As shown in FIG. 4, the electro-optic element 1103 generates birefringence between the two optical axes, i.e. the c axis and an a axis or b axis extending in an orthogonal direction to the c axis, of the $LiNbO_3$ crystal by applying a voltage between the c+ surface and c− surface of the $LiNbO_3$ crystal using a power source 1106 to produce an electro-optic effect. In so doing, the phase bias to be canceled out is canceled out. By controlling the voltage that is applied between the c+ and c− surfaces of the LiNbO$_3$ crystal by the power source 1106, the phase bias amount can be adjusted.

The aforementioned electro-optic effect occurs at extremely high velocity, and therefore the phase bias amount to be subjected to compensation can be generated at high speed. Hence, even when the phase bias amount to be subjected to compensation changes over time as a result of phenomena such as temporal change in the time span of the control light pulse, the voltage of the power source 1106 can be controlled while monitoring the extinction ratio of the modulated signal light (the signal light that is output from the first optical switch 101 as loop transmission light) to ensure that the extinction ratio reaches a maximum. In other words, the phase bias amount to be subjected to compensation can be controlled at high speed by controlling the voltage of the power source 1106, and in so doing, a stable switching operation can be realized.

Second Embodiment (Structure)

Figure 8:
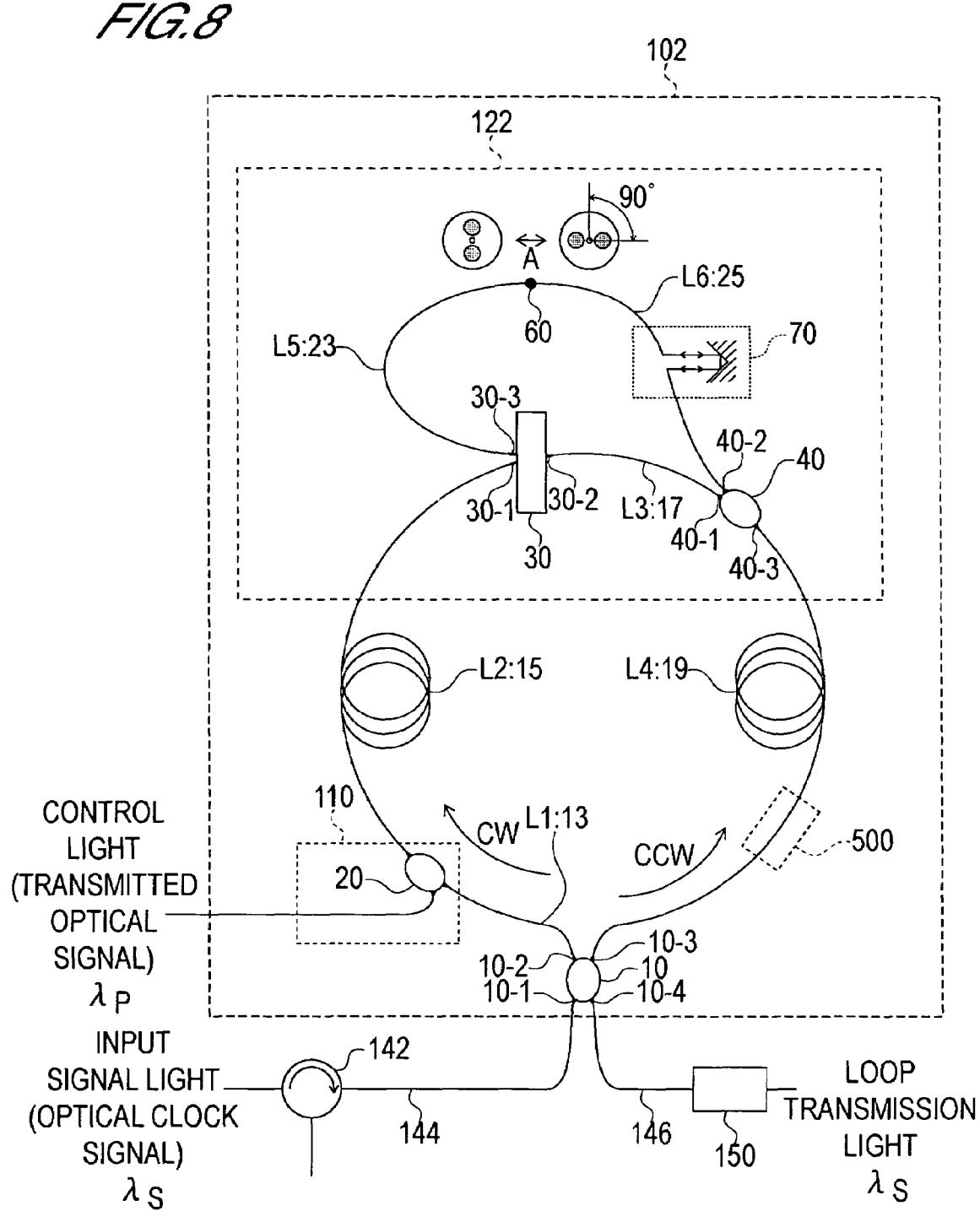
FIG. 8 is a block diagram of an optical switch according to a second embodiment.

The structure of a second optical switch serving as a second embodiment of the present invention will now be described with reference to FIG. 8. The second optical switch is constituted by a loop-form optical waveguide loop circuit 102 formed from an optical nonlinear medium, and the control light input means 20 of the phase control means 110 for inputting a control light into the optical waveguide loop circuit 102, and also comprises a wavelength demultiplexing/multiplexing circuit 122 and the phase bias circuit 500.

The constitution of the second optical switch differs from the constitution of the first optical switch described above in that an optical delay device 70 is inserted at a point on the path L6.

The optical demultiplexer/multiplexer 10 comprises the first port 10-1 for inputting a signal light, the second port 10-2 connected to one end of a first polarization-maintaining single-mode fiber 13, the third port 10-3 connected to the other end of a fourth polarization-maintaining single-mode fiber 19, and the fourth port 10-4 for outputting a modulated signal light. The dividing ratio of the optical intensity of the optical demultiplexer/multiplexer 10 is 1:1. The one end of the first polarization-maintaining single-mode fiber 13 is connected to the second port 10-2 of the optical demultiplexer/multiplexer 10, and the other end is connected to the optical coupler 20 serving as the control light input means 110. One end of a second polarization-maintaining single-mode fiber 15 is connected to the optical coupler 20, and the other end is connected to the wavelength demultiplexing/multiplexing circuit 122. One end of the fourth polarization-maintaining single-mode fiber 19 is connected to the wavelength demultiplexing/multiplexing circuit 122, and the other end is connected to the third port 10-3 of the optical demultiplexer/multiplexer 10.

The wavelength demultiplexing/multiplexing circuit 122 is constituted by the wavelength demultiplexer 30, the polarization plane rotation portion 60, the optical delay device 70, the multiplexer 40, a third polarization-maintaining single-mode fiber 17, a fifth polarization-maintaining single-mode fiber 23, and a sixth polarization-maintaining single-mode fiber 25. The other end of the second polarization-maintaining single-mode fiber 15, one end of the third polarization-maintaining single-mode fiber 17, and one end of the fifth polarization-maintaining single-mode fiber 23 are connected to the wavelength demultiplexer 30. The other end of the fifth polarization-maintaining single-mode fiber 23 and one end of the sixth polarization-maintaining single-mode fiber 25 are connected to the polarization plane rotation portion 60. The optical delay device 70 is provided at a point on the sixth polarization-maintaining single-mode fiber 25. The other end of the third polarization-maintaining single-mode fiber 17, the other end of the sixth polarization-maintaining single-mode fiber 25, and the one end of the fourth polarization-maintaining single-mode fiber 19 are connected to the multiplexer 40.

The third polarization-maintaining single-mode fiber 17 is constituted such that the one end is connected to the wavelength demultiplexer 30 and the other end is connected to the multiplexer 40. The fifth polarization-maintaining single-mode fiber 23 is constituted such that the one end is connected to the wavelength demultiplexer 30 and the other end is connected to the polarization plane rotation portion 60. The sixth polarization-maintaining single-mode fiber 25 is constituted such that the one end is connected to the polarization plane rotation portion 60, and the other end is connected to the multiplexer 40.

In commercially available polarization-maintaining single-mode fiber such as PANDA optical fiber, the effective index in relation to the guided light differs in the propagation direction of the light that propagates through the optical fiber (also referred to as the optical axis direction of the optical fiber hereafter) between an optical axis direction known as the slow axis and an optical axis direction known as the fast axis.

However, the fast axis (or slow axis) direction is not always completely unchanging in the optical axis direction of the optical fiber. Therefore, even when an input light input into the polarization-maintaining single-mode fiber is a linearly polarized wave having a polarization plane that is parallel to the fast axis (or slow axis) of the polarization-maintaining single-mode fiber, the output light that is output from the polarization-maintaining single-mode fiber comprises a polarization component that is orthogonal to the polarization direction of the input light. This component having an orthogonal polarization direction to the polarization direction of the input light is known as polarization cross talk.

It is known that in commercially available PANDA optical fiber having an average polarization-maintaining capability, this polarization cross talk increases dramatically when the length of the PANDA optical fiber increases several tens of meters or more (see "Polarization Maintaining Fiber", S. Arai et al., Furukawa Electric Information No. 109, January 2002, pp. 5-10, for example).

An optical switch using the optical Kerr effect is typically constituted with polarization-maintaining single-mode fiber of several tens of meters or more, and therefore considerable attention must be paid to polarization cross talk during design. An optical pulse propagating through the polarization-maintaining single-mode fiber constituting the optical switch comprises polarization components in both the fast axis and slow axis directions. Hence, if polarization cross talk occurs, the polarization cross talk interferes with the original polarization direction components of the signal light optical pulse such that the polarization state of the signal light optical pulse differs from a case in which polarization cross talk does not exist. The effect of this polarization cross talk on the phase of the signal light optical pulse also varies according to variation in the wavelength of the signal light optical pulse, the ambient temperature of the polarization-maintaining single-mode fiber, and so on. In other words, polarization cross talk causes variation in the operating characteristics of the optical switch, which leads to instability in the switching operation.

The polarization plane rotation portion 60 may be constituted by fusing the fifth polarization-maintaining single-mode fiber 23 and sixth polarization-maintaining single-mode fiber 25 such that the respective optical axes thereof form an angle of 90 degrees (see aforementioned "Ultrafast polarisation-independent all-optical switching using a polarisation diversity scheme in the nonlinear optical loop mirror", K. Uchiyama et al., Electronic Letters, vol. 28, No. 20, pp. 1864-1866, 1992, for example). Similarly to the first optical switch, the polarization plane rotation portion 60 is not limited to a Faraday rotator, and may employ a half-wave plate. When a half-wave plate is used, the half-wave plate must be disposed such that the polarization plane direction of the S component of the control light and the optical axis of the half-wave plate form an angle of 45 degrees.

Any element having a function for rotating the polarization plane of the input linearly polarized light 90 degrees and then outputting the light may be used as the polarization plane rotation portion 60, and the element to be used is a design consideration.

The phase bias circuit 500 is disposed (at a point on) a path selected from the paths L1 through L4 constituting the optical waveguide loop circuit along which the signal light is guided. FIG. 8 illustrates a case in which the phase bias circuit 500 is disposed on the path L4. The constitution of the phase bias circuit 500 is identical to that used in the first optical switch, and hence description thereof has been omitted.

Otherwise, the second optical switch is constituted identically to the first optical switch, and hence duplicate description has been omitted.

(Operation)

By constituting the paths L1 through L6 using polarization-maintaining single-mode fiber and constituting the optical demultiplexer/multiplexer 10, control light input means 20, and multiplexer 40 using elements which function with a maintained polarization plane, the following effects are obtained. The polarization direction of the signal light can be maintained at all times, and moreover, the optical path length on the optical waveguide loop circuit 102 for the signal light component (first signal light) that propagates in the CW direction and the signal light component (second signal light) that propagates in the CCW direction can be matched perfectly. Accordingly, when the first signal light and second signal light are multiplexed in the optical demultiplexer/multiplexer 10 in a case where no control light is input into the optical waveguide loop circuit 102, the polarization plane direction and phase of the two signal lights match, and therefore a stable switching operation is realized.

When a similar optical switch to the second optical switch is constituted using normal optical fiber in which polarization plane maintenance is not ensured for the paths L1 through L6, and elements in which polarization plane maintenance is not ensured for the optical demultiplexer/multiplexer, control light input means, and multiplexer, the following problems arise. When the first signal light and second signal light are multiplexed in the optical demultiplexer/multiplexer 10, a match between the polarization plane direction and phase thereof cannot be secured due to variation in the ambient temperature of the optical switch and fluctuation in the wavelength of the signal light, and therefore a stable switching operation is not realized.

Next, the reason for inserting the optical delay device 70 onto the path L6 will be described. As described below, by inserting the optical delay device 70, the effects of polarization mode dispersion caused by effective index mode dispersion in the polarization-maintaining single-mode fibers constituting the paths L1 through L6 can be suppressed, and hence a stable switching operation is realized.

In the second optical switch, the paths L1 through L6 are constituted by polarization-maintaining single-mode fiber, and the optical demultiplexer/multiplexer, control light input means, and multiplexer are constituted using elements which function with a maintained polarization plane. Hence, the effect of polarization mode dispersion occurring in the optical waveguide loop circuit 102 on the switching operation cannot be ignored.

The polarization mode dispersion (PMD) is obtained from the following equation (9).

$$PMD = B/c \qquad (9)$$

Here, B is the difference between the effective index of the signal light propagating through the polarization-maintaining single-mode fiber in relation to the slow axis and fast axis of the polarization-maintaining single-mode fiber. The value of B will also be referred to as the "mode birefringence" hereafter. The term c (m/s) is the propagation speed of light in a vacuum.

In PANDA optical fiber, which is used widely as a polarization-maintaining single-mode fiber, the difference between the effective index for light in which the vibration direction of the electric field vector of the light is parallel to the fast axis and the effective index for light which is parallel to the slow axis is approximately $3 \times 10^{-4}$. Hence, the polarization mode dispersion value PMD is $(3 \times 10^{-4}) \div (3 \times 10^8 \text{ m/s}) = 1 \times 10^{-12}$ s/m, which corresponds to approximately 1 ps per 1 m of the polarization-maintaining single-mode fiber.

Figure 9:
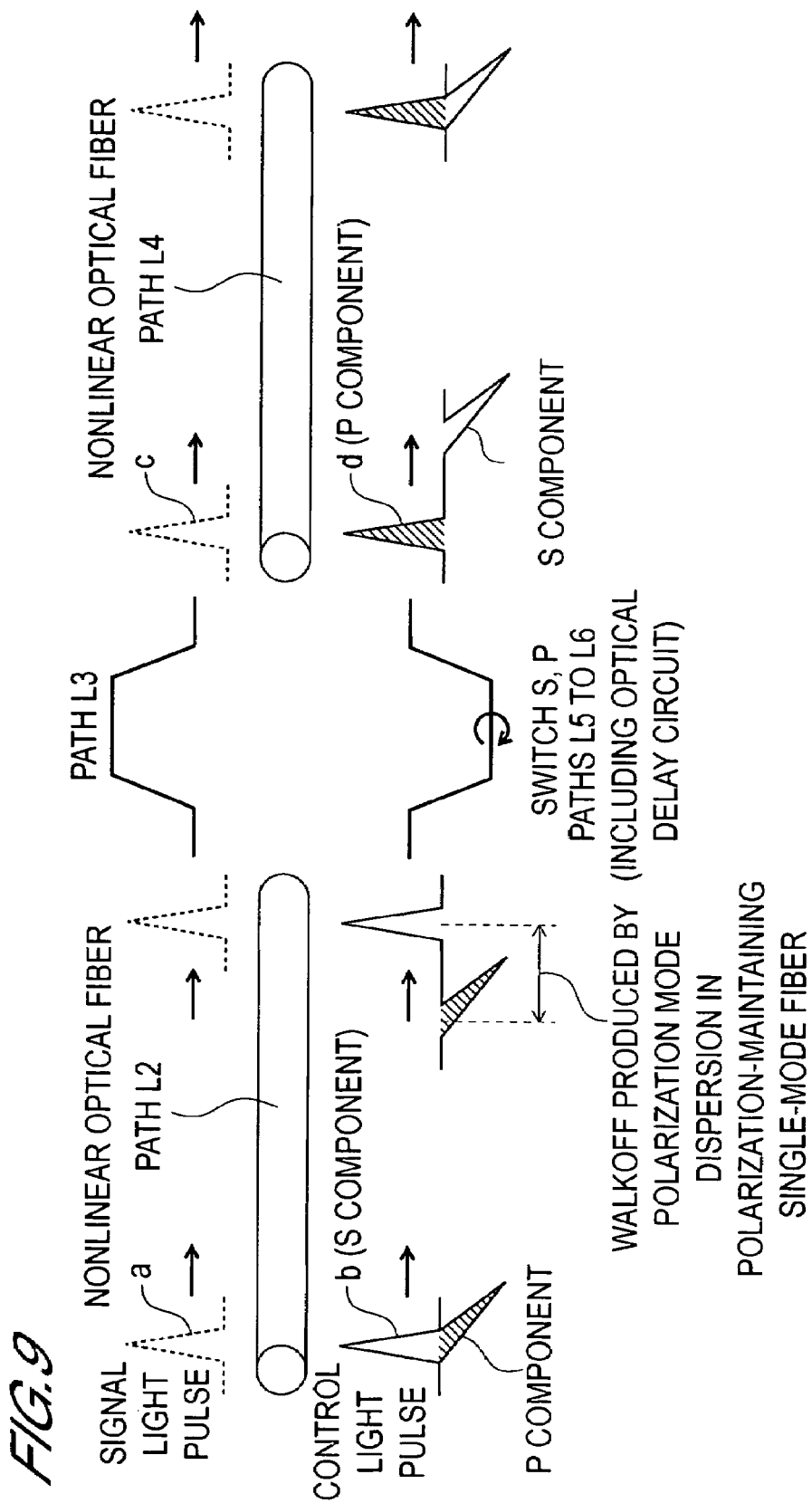
FIG. 9 is a view illustrating an operation of the optical switch according to the second embodiment.

The propagation pattern of the signal light and control light along the paths L2 to L6, taking the polarization mode dispersion into account, will now be described with reference to FIG. 9. FIG. 9 illustrates an operation of the second optical switch serving as a second embodiment of the present invention, and shows the propagation pattern of the signal light and control light along the paths L2 to L6. For ease of understanding, the paths L2 through L6 are illustrated as linear abstractions in FIG. 9.

Description will be provided assuming that the control light is input as TE polarization into the second polarization-maintaining single-mode fiber 15 forming the path L2 from the output end of the control light input means 20 connected to the one end of the second polarization-maintaining single-mode fiber 15. Of course, it is also possible to operate the optical switch by inputting the control light into the second polarization-maintaining single-mode fiber 15 as TM polarization, but since the two cases are similar, description of the latter has been omitted.

The first signal light propagates in a polarization state in which the polarization plane is parallel to the slow axis of the second polarization-maintaining single-mode fiber 15 constituting the path L2. Meanwhile, the control light propagates through the second polarization-maintaining single-mode fiber 15 constituting the path L2 in a state comprising an S component having a polarization plane that is parallel to the slow axis and a P component orthogonal to the S component, having a polarization plane that is parallel to the fast axis. These conditions are identical to those of the operation of the first optical switch described with reference to FIG. 1.

If it is assumed that walkoff, i.e. positional deviation between the signal light pulse and control light pulse during parallel propagation thereof, based on a difference in the propagation speeds of the signal light pulse and control light pulse produced by group velocity dispersion in the second polarization-maintaining single-mode fiber 15, does not occur, then the P component of the control light pulse moves ahead of the signal light pulse by an amount corresponding to the polarization mode dispersion.

To realize a stable switching operation, the following conditions must be satisfied. Firstly, the positions of the signal light pulse (shown as a in FIG. 9) and the S component of the control light pulse (shown as b in FIG. 9) on the temporal axis must match at the point of input into the one end (the connecting portion with the control light input means 20) of the second polarization-maintaining single-mode fiber 15 constituting the path L2. Secondly, the positions of the signal light pulse (shown as c in FIG. 9) and the P component of the control light pulse (shown as d in FIG. 9) on the temporal axis must match at the point of input into the one end (the connecting portion with the multiplexer 40) of the fourth polarization-maintaining single-mode fiber 19 constituting the path L4.

The first condition can be controlled by adjusting the timing with which the control light is input into the optical waveguide loop circuit 102. As for the second condition, however, the positions of the signal light pulse (shown as c in FIG. 9) and the P component of the control light pulse (shown as d in FIG. 9) on the temporal axis cannot be matched due to the effect of the polarization mode dispersion.

Hence, in the second optical switch, the optical delay device 70 is inserted at a point on the path L6. The optical delay device 70 serves to match the positions of the signal light pulse (shown by c in FIG. 9) and the P component of the control light pulse (shown by d in FIG. 9) on the temporal axis. More specifically, the optical delay device 70 inserts a delay between propagation of the signal light pulse along the path L3 and input onto the path L4, and between propagation of the control light pulse along the paths L5 and L6 and input onto the path L4, to compensate for the difference in propagation time produced by the polarization mode dispersion.

In other words, the walkoff produced by polarization mode dispersion generated when the P component and S component of the control light pulse propagate along the path L2 is canceled out by the walkoff produced by polarization mode dispersion generated during propagation along the path L4. When the control light pulse component which propagates along the path L2 as the P component passes through the polarization plane rotation portion 60 provided between the path L5 and the path L6, this component becomes the S component. Meanwhile, when the control light pulse component which propagates along the path L2 as the S component passes through the polarization plane rotation portion 60 provided between the path L5 and the path L6, this component becomes the P component.

If the walkoff produced by polarization mode dispersion generated when the P component and S component of the control light pulse propagate along the path L2 is canceled out by the walkoff produced by polarization mode dispersion generated during propagation along the path L4, the positions of the signal light pulse (shown as c in FIG. 9) and the P component of the control light pulse (shown as d in FIG. 9) on the temporal axis can be matched at the point of input into the one end (the connecting portion with the multiplexer 40) of the fourth polarization-maintaining single-mode fiber 19 constituting the path L4.

In the above description, the polarization plane direction of the signal light is parallel to the slow axis of the second polarization-maintaining single-mode fiber 15 and fourth polarization-maintaining single-mode fiber 19, and therefore the optical delay device 70 is inserted at a point on the path L6. If the polarization plane direction of the signal light were parallel to the fast axis of the second polarization-maintaining single-mode fiber 15 and fourth polarization-maintaining single-mode fiber 19, the optical delay device 70 would be inserted at a point on the path L3.

If there is no need to vary the walkoff amount for reasons such as the amount of walkoff produced by polarization mode dispersion being known and the length of the polarization-maintaining single-mode fibers being substantially constant, then the optical path length of the path L6 or the path L3 may be set to a length at which the walkoff produced by the polarization mode dispersion described above can be canceled out, and hence the optical delay device 70 need not be inserted.

However, it is extremely rare for the amount of walkoff produced by polarization mode dispersion to be known and the length of the polarization-maintaining single-mode fibers to be substantially constant. Therefore, it is usually necessary to insert the optical delay device 70, and match the positions of the signal light pulse (shown as c in FIG. 9) and the P component of the control light pulse (shown as d in FIG. 9) on the temporal axis using the optical delay device 70 such that the walkoff produced by polarization mode dispersion generated when the P component and S component of the control light pulse propagate along the path L2 is canceled out by the walkoff produced by polarization mode dispersion generated during propagation along the path L4.

The optical delay device 70 is a device which is capable of adjusting the optical path length, and hence a person skilled in the art may easily form an optical delay device using a pre-existing corner cube reflector or the like. More specifically, the optical delay device 70 may be constituted by cutting the sixth polarization-maintaining single-mode fiber 25 constituting the path L6 midway, guiding the control light output from one end of the cut surface to the corner cube reflector, and inputting the reflection light from the corner cube reflector into the other end of the cut surface of the sixth polarization-maintaining single-mode fiber 25.

The propagation direction of the control light that advances from the one end of the cut surface of the sixth polarization-maintaining single-mode fiber 25 toward the corner cube reflector, and the propagation direction of the control light that advances from the corner cube reflector toward the other end of the cut surface of the sixth polarization-maintaining single-mode fiber 25, are adjusted so as to be parallel to each other. To adjust the optical path length, the distance from the one end and the other end of the cut surface of the sixth polarization-maintaining single-mode fiber 25 to the corner cube reflector may be modified. The optical path length may be adjusted such that optical path length variation corresponding to twice the length of this distance can be produced, and such that the walkoff produced by polarization mode dispersion generated when the P component and S component of the control light pulse propagate along the path L2 can be canceled out by the walkoff produced by polarization mode dispersion generated during propagation along the path L4.

The reasons for disposing the phase bias circuit 500 on one path selected from the paths L1 through L4 constituting the optical waveguide loop circuit through which the signal light is guided, and the effects thereof, are described above, and will not be repeated here.

Third Embodiment (Structure)

Figure 10:
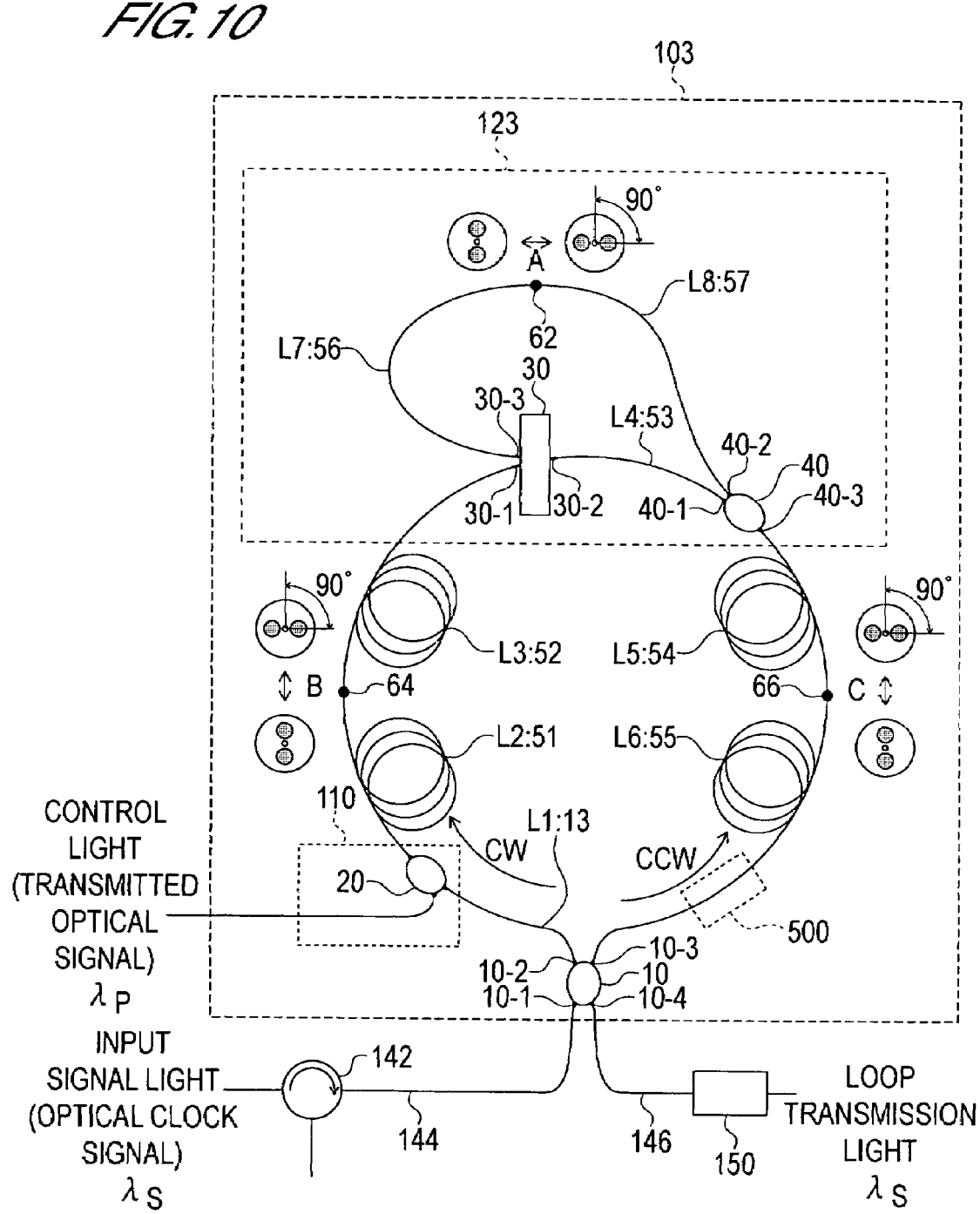
FIG. 10 is a block diagram of an optical switch according to a third embodiment.

The structure of a third optical switch serving as a third embodiment of the present invention will now be described with reference to FIG. 10. The third optical switch is constituted by a loop-form optical waveguide loop circuit 103 formed from an optical nonlinear medium, and the control light input means 20 of the phase control means 110 for inputting a control light into the optical waveguide loop circuit 103, and also comprises a wavelength demultiplexing/multiplexing circuit 123 and the phase bias circuit 500.

In the third optical switch, the optical waveguide loop circuit 103 is constituted by an optical path (also referred to as "path L1" hereafter) formed from the first polarization-maintaining single-mode fiber 13 extending from the optical demultiplexer/multiplexer 10 to the control light input means 20, an optical path (also referred to as "path L2" hereafter) formed from a second polarization-maintaining single-mode fiber 51 extending from the control light input means 20 to a second polarization plane rotation portion 64, an optical path (also referred to as "path L3" hereafter) formed from a third polarization-maintaining single-mode fiber 52 extending from the second polarization plane rotation portion 64 to the wavelength demultiplexing/multiplexing circuit 123, an optical path (also referred to as "path L5" hereafter) formed from a fifth polarization-maintaining single-mode fiber 54 extending from the wavelength demultiplexing/multiplexing circuit 123 to a third polarization plane rotation portion 66, and an optical path (also referred to as "path L6" hereafter) formed from a sixth polarization-maintaining single-mode fiber 55 extending from the third polarization plane rotation portion 66 and returning to the optical demultiplexer/multiplexer 10.

The constitution of the third optical switch differs from the constitutions of the first and second optical switches described above in the insertion of the second polarization plane rotation portion 64 and third polarization plane rotation portion 66. A first polarization plane rotation portion 62 corresponds to the polarization plane rotation portion 60 of the first and second optical switches. The second polarization plane rotation portion 64 is connected to the other end of the second polarization-maintaining single-mode fiber 51 and one end of the third polarization-maintaining single-mode fiber 52. The third polarization plane rotation portion 66 is connected to the other end of the fifth polarization-maintaining single-mode fiber 54 and one end of the sixth polarization-maintaining single-mode fiber 55.

Thus in the third optical switch, the optical waveguide loop circuit 103 is formed using polarization-maintaining single-mode fiber as an optical nonlinear medium, and comprises the optical demultiplexer/multiplexer 10, first polarization-maintaining single-mode fiber 13, second polarization-maintaining single-mode fiber 51, third polarization-maintaining single-mode fiber 52, fifth polarization-maintaining single-mode fiber 54, sixth polarization-maintaining single-mode fiber 55, second polarization plane rotation portion 64, and third polarization plane rotation portion 66.

The optical demultiplexer/multiplexer 10 comprises the first port 10-1 for inputting a signal light, the second port 10-2 connected to the one end of the first polarization-maintaining single-mode fiber 13, the third port 10-3 connected to the other end of the sixth polarization-maintaining single-mode fiber 55, and the fourth port 10-4 for outputting a modulated signal light. The dividing ratio of the optical intensity of the optical demultiplexer/multiplexer 10 is 1:1.

The one end of the first polarization-maintaining single-mode fiber 13 is connected to the second port 10-2 of the optical demultiplexer/multiplexer 10, and the other end is connected to the optical coupler 20 serving as the control light input means. One end of the second polarization-maintaining single-mode fiber 51 is connected to the optical coupler 20, and the other end is connected to the second polarization plane rotation portion 64. The one end of the third polarization-maintaining single-mode fiber 52 is connected to the second polarization plane rotation portion 64, and the other end is connected to the wavelength demultiplexing/multiplexing circuit 123. One end of the fifth polarization-maintaining single-mode fiber 54 is connected to the wavelength demultiplexing/multiplexing circuit 123, and the other end is connected to the third polarization plane rotation portion 66. The one end of the sixth polarization-maintaining single-mode fiber 55 is connected to the third polarization plane rotation portion 66, and the other end is connected to the third port 10-3 of the optical demultiplexer/multiplexer 10.

The second polarization plane rotation portion 64 is connected to the other end of the second polarization-maintaining single-mode fiber 51 and the one end of the third polarization-maintaining single-mode fiber 52. The third polarization plane rotation portion 66 is connected to the other end of the fifth polarization-maintaining single-mode fiber 54 and the one end of the sixth polarization-maintaining single-mode fiber 55.

The wavelength demultiplexing/multiplexing circuit 123 is constituted by the wavelength demultiplexer 30, the first polarization plane rotation portion 62, the multiplexer 40, a fourth polarization-maintaining single-mode fiber 53, a seventh polarization-maintaining single-mode fiber 56, and an eighth polarization-maintaining single-mode fiber 57.

In other words, the wavelength demultiplexing/multiplexing circuit 123 forms a subsidiary optical waveguide loop circuit in relation to the optical waveguide loop circuit 103 formed by the paths L1, L2, L3, L5, and L6. The optical paths forming this subsidiary optical waveguide loop circuit are the fourth polarization-maintaining single-mode fiber 53 (also referred to as "path L4" hereafter) connecting the wavelength demultiplexer 30 and multiplexer 40, the seventh polarization-maintaining single-mode fiber 56 (also referred to as "path L7" hereafter) connecting the wavelength demultiplexer 30 and first polarization plane rotation portion 62, and the eighth polarization-maintaining single-mode fiber 57 (also referred to as "path L8" hereafter) connecting the first polarization plane rotation portion 62 and multiplexer 40.

The other end of the third polarization-maintaining single-mode fiber 52, one end of the fourth polarization-maintaining single-mode fiber 53, and one end of the seventh polarization-maintaining single-mode fiber 56 are connected to the wavelength demultiplexer 30. The other end of the seventh polarization-maintaining single-mode fiber 56 and one end of the eighth polarization-maintaining single-mode fiber 57 are connected to the first polarization plane rotation portion 62. The other end of the fourth polarization-maintaining single-mode fiber 53, the other end of the eighth polarization-maintaining single-mode fiber 57, and the one end of the fifth polarization-maintaining single-mode fiber 54 are connected to the multiplexer 40.

The one end of the fourth polarization-maintaining single-mode fiber 53 is connected to the wavelength demultiplexer 30, and the other end is connected to the multiplexer 40. The one end of the seventh polarization-maintaining single-mode fiber 56 is connected to the wavelength demultiplexer 30, and the other end is connected to the first polarization plane rotation portion 62. The one end of the eighth polarization-maintaining single-mode fiber 57 is connected to the first polarization plane rotation portion 62, and the other end is connected to the multiplexer 40.

The phase bias circuit 500 is disposed (at a point on) a path selected from the paths L1 through L6 constituting the optical waveguide loop circuit along which the signal light is guided. FIG. 10 illustrates a case in which the phase bias circuit 500 is disposed on the path L6.

Otherwise, the third optical switch is constituted identically to the first and second optical switches, and hence duplicate description has been omitted.

(Operation)

The operating principle of the third optical switch is similar to those of the first and second optical switches. The third optical switch differs from the first and second optical switches in the provision of the second and third polarization plane rotation portions, and in that the optical delay device 70 of the second optical switch is not required.

The optical path length satisfies similar conditions to those of the second optical switch. In other words, assuming the lengths of the paths L2, L3, L5, L6 are $l_2, l_3, l_5, l_6$ respectively, then $l_2+l_3=(l_5+l_6)/2$ is satisfied. This relationship corresponds to the relationship between the length of the path L4 and the path L2 in the second optical switch, in which the length $l_4$ of the path L4 is set to twice the length $l_2$ of the path L2, or in other words the relationship $L=l_2=l_4/2$. The sum of the length of the paths L2 and L3 in the third optical switch corresponds to the length of the path L2 in the second optical switch, and the sum of the length of the paths L5 and L6 in the third optical switch corresponds to the length of the path L4 in the second optical switch. Hence, the stable switching operation that is realized in the first optical switch even when the polarization plane of the control light is not fixed is also realized in the third optical switch.

The required accuracy of the relationship $l_2+l_3=(l_5+l_6)/2$ established in relation to the paths L2, L3, L5, L6 is determined according to the allowable error in the difference between the phase shift amount generated on the paths L2 and L3 and the phase shift amount generated on the paths L5 and L6. In many embodiments, no defects occur as long as this error in the phase shift amount is no more than 10%. Hence, when the third optical switch is used in a 3R optical repeater, the quality of the regenerated signal light is within an allowable range for optical communication.

Further, since the second and third polarization plane rotation portions 64, 66 are inserted into the third optical switch, the optical delay device 70 of the second optical switch is not required. In principle, the second optical switch may also be constituted without using the optical delay device 70 disclosed in the description of the second embodiment, but this is only possible in a case where the polarization mode dispersion amount is fixed and unchanging, and a time delay difference can be incorporated easily into the paths L3, L5, and L6 to compensate for the polarization plane-dependent time delay amount produced by polarization mode dispersion.

However, during use of an actual optical switch, the length of the optical fiber used in the optical switch is modified in various ways according to the application subject. Hence, the polarization mode dispersion amount takes various values corresponding to each case. In addition, the optical fiber used to construct an optical switch requires a length between several hundred meters and several kilometers. The polarization mode dispersion amount generated when the optical fiber has such a length ranges between several hundred ps and several ns. The distance by which light moves through air over a corresponding time period ranges from several cm to several tens of centimeters. Thus the size of the device required to compensate for the polarization plane-dependent time delay amount produced by polarization mode dispersion increases, and hence the size of the entire optical switch increases. As a result, it becomes difficult to secure mechanical stability, and the switching operation of the optical switch may be impaired.

The third optical switch is capable of solving this problem. For this purpose, in the third optical switch, the lengths of the path L2 and the path L3 are set equally, and the second polarization plane rotation portion 64, to which the other end of the second polarization-maintaining single-mode fiber 51 forming the path L2 and the one end of the third polarization-maintaining single-mode fiber 52 forming the path L3 are connected, is provided. The second polarization plane rotation portion 64 has a function for rotating the polarization plane of light passing therethrough by 90 degrees. Similarly to the polarization plane rotation portion 60 provided in the first and second optical switches, the second polarization plane rotation portion 64 may employ a Faraday rotator. Alternatively, a half-wave plate may be used instead of a Faraday rotator.

By setting the second polarization plane rotation portion 64 between the path L2 and the path L3, the lengths of the paths L2 and L3 are set equally, and hence the polarization mode dispersion occurring on the paths L2 and L3 can be canceled out. Therefore, similarly to the second optical switch described with reference to FIG. 9, instability in the switching operation caused by similar polarization mode dispersion to that of the second optical switch can be removed by setting the length of the path L4 equally to the sum of the lengths of the paths L7 and L8. Here, the path L2 and the path L4 of the second optical switch shown in FIG. 9 correspond respectively to the path L3 and the path L5 of the third optical switch. Further, the path L2 of the second optical switch corresponds to a path constituted by the path L2 and the path L3 of the third optical switch, and the path L4 of the second optical switch corresponds to a path constituted by the path L5 and the path L6 of the third optical switch. The path of the third optical switch constituted by the paths L4, L7, and L8 corresponds to the path of the second optical switch constituted by the paths L3, L5, and L6, respectively.

Accordingly, similarly to the description of the operation of the second optical switch provided with reference to FIG. 9, if the positions of the signal light pulse (shown as a in FIG. 9) and the S component of the control light pulse (shown as b in FIG. 9) on the temporal axis match at the point of input into the one end (the connecting portion with the control light input means 20) of the second polarization-maintaining single-mode fiber 51 constituting the path L2, then the positions of the signal light pulse (shown as c in FIG. 9) and the P component of the control light pulse (shown as d in FIG. 9) on the temporal axis automatically match at the point of input into the one end (the connecting portion with the multiplexer 40) of the fifth polarization-maintaining single-mode fiber 54 constituting the path L5. Thus the effect of polarization mode dispersion is canceled out, and instability is removed from the switching operation.

Next, the reason for providing the third polarization plane rotation portion 66 will be described with reference to Tables 2A and 2B. Tables 2A and 2B summarize the state in which the signal light and control light propagate along the paths L1 to L8 forming the optical waveguide loop circuit 103. When the polarization plane of the propagating signal light or control light is parallel to the slow axis or fast axis, which are the optical axes of the polarization-maintaining single-mode fiber forming the paths L1 to L6, this is denoted as s axis and f axis respectively in Tables 2A and 2B. Further, the rightward and leftward-facing arrows between the path columns indicate the propagation direction of the signal light or control light between the connected paths. Table 2A illustrates a case in which the third polarization plane rotation portion 66 is not disposed, and Table 2B illustrates a case in which the third polarization plane rotation portion 66 is disposed.

It is assumed in this description that the signal light input into the third optical switch is a linearly polarized light having a plane of vibration in the TE direction, and that the TE direction is the slow optical axis direction of the polarization-maintaining single-mode fiber.

As shown clearly in Table 2A, when the third polarization plane rotation portion 66 is not disposed, the polarization plane directions of the first signal light (the signal light propagating in the CW direction) and the second signal light (the signal light propagating in the CCW direction) are always orthogonal to each other on the paths L1 to L6. In other words, when the polarization plane of the first signal light is parallel to the slow axis, the polarization plane of the second signal light is parallel to the fast axis, and when the polarization plane of the first signal light is parallel to the fast axis, the polarization plane of the second signal light is parallel to the slow axis.

Hence, when the first signal light and second signal light are multiplexed in the optical demultiplexer/multiplexer 10, the first and second signal lights are affected by the mode birefringence of the polarization-maintaining single-mode fibers constituting the paths L1, L2, L3, L5, and L6. This mode birefringence causes a difference in the respective effective indices in the slow axis direction and fast axis direction of the polarization-maintaining single-mode fiber, and thus the propagation distance (also referred to as the "beat length" hereafter) that is required for the difference in propagation distance of the signal light having polarization planes parallel to both the slow axis direction and fast axis direction On the other hand, when the third polarization plane rotation portion 66 is provided, as shown clearly in Table 2B, the polarization plane directions of the first signal light (the signal light propagating in the CW direction) and the second signal light (the signal light propagating in the CCW direction) are always parallel to each other on the paths L1, L2, L3, L5, and L6. Hence, a phase difference caused by mode birefringence does not occur when the first signal light and second signal light are multiplexed in the optical demultiplexer/multiplexer 10. In other words, phase difference caused by fluctuation in the environmental temperature of the third optical switch and the wavelength of the input signal light does not occur, and hence a stable switching operation is realized.

According to the third optical switch as described above, the optical delay device 70 required in the second optical switch need not be provided, and hence manufacturing costs can be reduced. The third optical switch is also advantaged in that even when the length or type of the polarization-maintaining single-mode fiber constituting the optical waveguide loop circuit 103 is modified, there is no need to modify any constitutional elements other than the polarization-maintaining single-mode fiber forming the optical path.

TABLE 2A

| | | | | PATH | | | | |
|---|---|---|---|---|---|---|---|---|
| | L1 | L2 | L3 | L4 | L7 | L8 | L5 | L6 |
| FIRST SIGNAL LIGHT | s AXIS → | s AXIS → | f AXIS → | f AXIS | — | — → | f AXIS → | f AXIS |
| SECOND SIGNAL LIGHT | f AXIS ← | f AXIS ← | s AXIS ← | s AXIS ← | — ← | — | ← s AXIS ← | s AXIS |
| S COMPONENT of CONTROL LIGHT | — | s AXIS → | f AXIS → | — | f AXIS → | s AXIS → | s AXIS → | s AXIS |
| P COMPONENT of CONTROL LIGHT | — | f AXIS → | s AXIS → | — | s AXIS → | f AXIS → | f AXIS → | f AXIS |

TABLE 2B

| | | | | PATH | | | | |
|---|---|---|---|---|---|---|---|---|
| | L1 | L2 | L3 | L4 | L7 | L8 | L5 | L6 |
| FIRST SIGNAL LIGHT | s AXIS → | f AXIS → | f AXIS → | f AXIS | — | — → | f AXIS → | s AXIS |
| SECOND SIGNAL LIGHT | s AXIS ← | f AXIS ← | f AXIS ← | f AXIS ← | — ← | — | ← f AXIS ← | s AXIS |
| S COMPONENT of CONTROL LIGHT | — | → f AXIS → | f AXIS → | — | f AXIS → | s AXIS → | s AXIS → | f AXIS |
| P COMPONENT of CONTROL LIGHT | — | → s AXIS → | s AXIS → | — | s AXIS → | f AXIS → | f AXIS → | s AXIS | to reach exactly one wavelength ($2\pi$ when converted to the phase) is approximately several mm.

In other words, if the length of the paths L1, L2, L3, L5, and L6 constituting the optical waveguide loop circuit 103 of the third optical switch is not set with an accuracy that is sufficiently shorter than this beat length, the phase relationship between the first and second optical signals varies irregularly when the optical signals are multiplexed in the optical demultiplexer/multiplexer 10 due to fluctuation in the environmental temperature of the third optical switch and the wavelength of the input signal light, and as a result, the switching operation becomes unstable. As described above, the length of the paths L2, L3, L5, and L6 ranges from several hundred meters to several kilometers, and it is therefore extremely difficult to set a margin of error for this length of no more than 1 mm.

The reasons for disposing the phase bias circuit 500 on one path selected from the paths L1 through L6 constituting the optical waveguide loop circuit through which the signal light is guided, and the effects thereof, are described above, and will not be repeated here.

However, the phase bias circuit 500 may be constituted in the following manner. That is, the second polarization plane rotation element (the second Faraday rotator, for example) may be provided such that the rotation direction of the polarization plane is opposite to that shown in FIGS. 2, 3, and 4, i.e. the polarization plane is rotated 45 degrees clockwise rather than counter-clockwise. In so doing, when the phase bias circuit 500 is disposed on the path L5 or the path L6, the third polarization plane rotation portion 66 becomes unnecessary, and when the phase bias circuit 500 is disposed on the path L2 or the path L3, the second polarization plane rotation portion 64 becomes unnecessary.

The reason why the second and third polarization plane rotation portions become unnecessary will now be described with reference to Tables 3A and 3B.

Tables 3A and 3B summarize the manner in which the polarization plane direction of the first and second signal lights changes during propagation through the first phase bias circuit when the phase bias circuit 500 is set as described above, such that the polarization plane is rotated 45 degrees clockwise by the second polarization plane rotation element (the second Faraday rotator, for example). In Tables 3A and 3B, the slow axis is abbreviated to s axis, the fast axis is abbreviated to f axis, and the rightward and leftward-facing arrows indicate the advancement direction of the light.

Table 3A shows a case in which the polarization plane of the first signal light is parallel to the fast axis and the polarization plane of the second signal light is parallel to the slow axis. It can be seen from Table 3A that the polarization plane directions of the first signal light and second signal light are orthogonal only in the phase compensation element (the Babinet-Soleil compensator 903, for example), and are parallel to each other during propagation through the remaining optical element parts. It can also be seen that when the first and second signal lights are input into and output from the polarization-maintaining single-mode fiber (the polarization-maintaining single-mode fibers 901 and 905, for example), the polarization plane directions thereof are orthogonal. More specifically, when the second signal light is input from the left end of the polarization-maintaining single-mode fiber 901 with a polarization plane that is parallel to the slow axis, the second signal light is output from the right end of the polarization-maintaining single-mode fiber 905 with a polarization plane that is parallel to the fast axis. Further, when the first signal light is input from the right end of the polarization-maintaining single-mode fiber 905 with a polarization plane that is parallel to the fast axis, the first signal light is output from the left end of the polarization-maintaining single-mode fiber 901 with a polarization plane that is parallel to the slow axis.

Hence, as described above, using the phase bias circuit 500 in which the second polarization plane rotation element (the second Faraday rotator, for example) is set to rotate the polarization plane 45 degrees clockwise, the phase bias component in the first and second signal lights can be canceled out in the phase compensation element (the Babinet-Soleil compensator 903, for example), which means that by passing the first and second signal lights through the phase bias circuit 500, the polarization plane is rotated 90 degrees in relation to the optical axis of the polarization-maintaining single-mode fiber. In other words, the second polarization plane rotation portion 64 or third polarization plane rotation portion 66, inserted with the aim of rotating the polarization plane of the first and second signal lights 90 degrees in relation to the optical axis of the polarization-maintaining single-mode fiber, becomes unnecessary. Moreover, a stable switching operation is still secured even when the duty ratio of the control light pulse is large.

Note that Table 3B illustrates a case in which the polarization plane of the first signal light is parallel to the slow axis and the polarization plane of the second signal light is parallel to the fast axis. Similarly to Table 3A, the phase bias component can be canceled out in the phase compensation element (the Babinet-Soleil compensator 903, for example), and hence, by passing the first and second signal lights through the phase bias circuit 500, the polarization plane is rotated 90 degrees in relation to the optical axis of the polarization-maintaining single-mode fiber.

TABLE 3A

WHEN POLARIZATION PLANE OF FIRST SIGNAL LIGHT IS PARALLEL TO FAST AXIS
AND POLARIZATION PLANE OF SECOND SIGNAL LIGHT IS PARALLEL TO SLOW AXIS

|  | POLARIZATION-MAINTAINING SINGLE-MODE FIBER 901 |  | PHASE COMPENSATION ELEMENT 903 |  | POLARIZATION-MAINTAINING SINGLE-MODE FIBER 905 |
|---|---|---|---|---|---|
| SECOND SIGNAL LIGHT (INPUT FROM LEFT SIDE OF 901) | s AXIS | → | y AXIS | → | f AXIS |
| FIRST SIGNAL LIGHT (INPUT FROM RIGHT SIDE OF 905) | s AXIS | ← | x AXIS | ← | f AXIS |
| CONTROL LIGHT COMPONENT PARALLEL TO s AXIS | s AXIS | → | y AXIS | → | f AXIS |
| CONTROL LIGHT COMPONENT PARALLEL TO f AXIS | f AXIS | → | x AXIS | → | s AXIS |

TABLE 3B

WHEN POLARIZATION PLANE OF FIRST SIGNAL LIGHT IS PARALLEL TO SLOW AXIS
AND POLARIZATION PLANE OF SECOND SIGNAL LIGHT IS PARALLEL TO FAST AXIS

| | POLARIZATION-MAINTAINING SINGLE-MODE FIBER 901 | | PHASE COMPENSATION ELEMENT 903 | | POLARIZATION-MAINTAINING SINGLE-MODE FIBER 905 |
|---|---|---|---|---|---|
| SECOND SIGNAL LIGHT (INPUT FROM LEFT SIDE OF 901) | f AXIS | → | x AXIS | → | s AXIS |
| FIRST SIGNAL LIGHT (INPUT FROM RIGHT SIDE OF 905) | f AXIS | ← | y AXIS | ← | s AXIS |
| CONTROL LIGHT COMPONENT PARALLEL TO s AXIS | s AXIS | → | y AXIS | → | f AXIS |
| CONTROL LIGHT COMPONENT PARALLEL TO f AXIS | f AXIS | → | x AXIS | → | s AXIS |

Fourth Embodiment (Structure)

Figure 11:
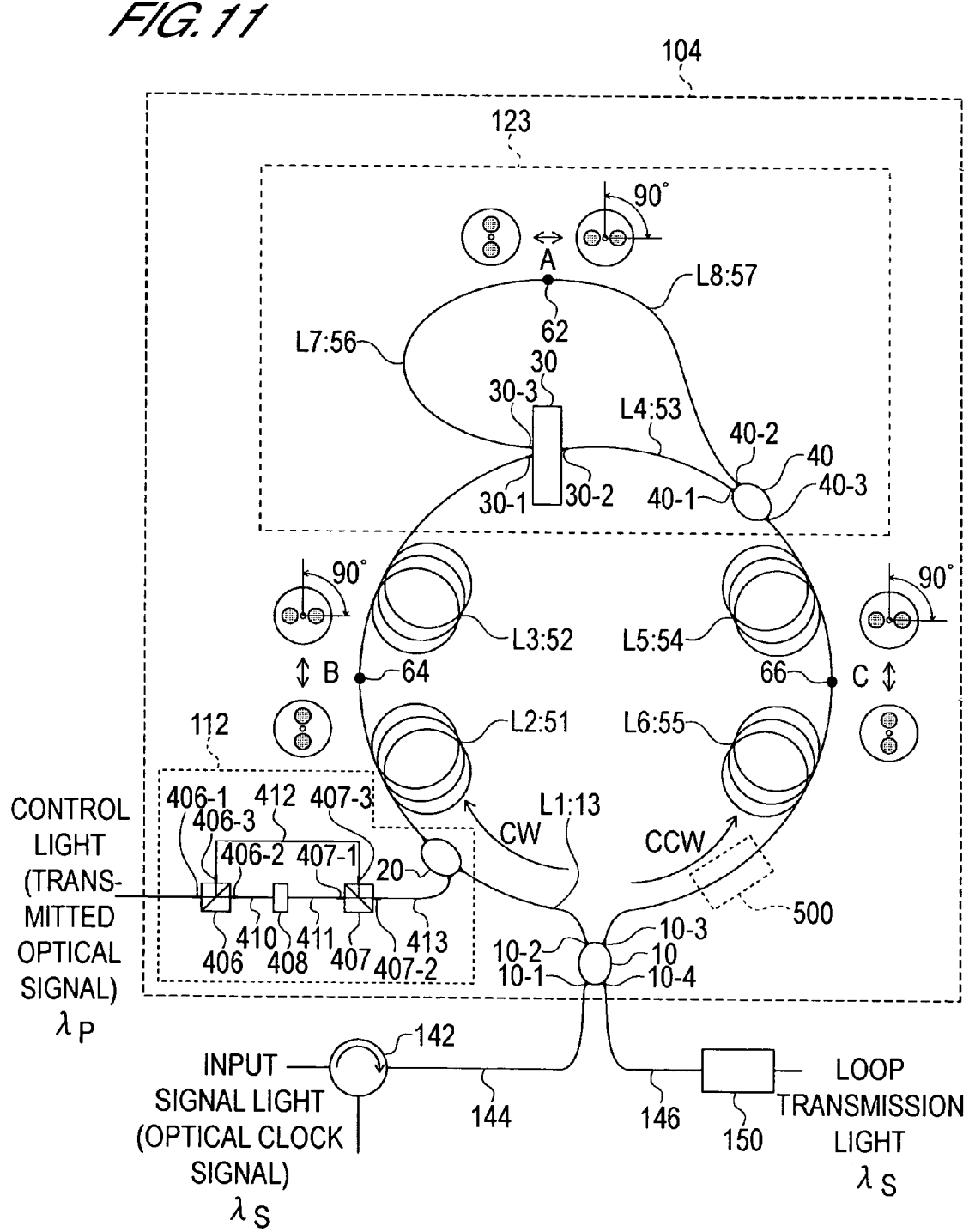
FIG. 11 is a block diagram of an optical switch according to a fourth embodiment.

The structure of a fourth optical switch serving as a fourth embodiment of the present invention will now be described with reference to FIG. 11. The fourth optical switch differs from the first through third optical switches in the constitution of the phase control means. The phase control means of the first through third optical switches comprise an optical coupler serving as control light input means, but do not comprise any other particular constitutional elements. In the fourth optical switch, on the other hand, the following constitutional elements are provided as the phase control means of the first through third optical switches so that measures can be taken against attenuation of the control light in the various optical elements and optical fibers connecting these optical elements, which constitute the optical paths of an optical waveguide loop circuit 104.

Phase control means 112 comprise a polarization splitter 406, an optical attenuator 408, a polarization combiner 407, and the optical coupler 20 serving as control light input means. The polarization splitter 406 comprises a first port 406-1 into which a control light is input, a second port 406-2 from which the S component of the control light is output, and a third port 406-3 from which the P component of the control light is output. The optical attenuator 408 reduces the optical intensity of the S component of the control light output from the polarization splitter 406, and then outputs same. The polarization combiner 407 comprises a first port 407-1 into which the S component of the control light, output from the optical attenuator 408, is input, a third port 407-3 into which the P component of the control light, output from the third port 406-3 of the polarization splitter, is input, and a second port 407-2 which combines and then outputs the S component of the control light output from the optical attenuator 408 and the P component of the control light output from the third port 406-3 of the polarization splitter 406. The optical coupler 20 serving as the control light input means inputs the control light output from the second port 407-2 of the polarization combiner 407 into the optical waveguide loop circuit from the one end of the second polarization-maintaining single-mode fiber 51 (14 in the first optical switch, and 15 in the second optical switch).

Note that the effects to be described below may also be obtained when the phase control means 112 described above of the fourth optical switch are used in the first through third optical switches. The first optical switch may be constituted without using polarization-maintaining single-mode fiber for the paths constituting the optical waveguide loop circuit 101, but in so doing, the effects of the second and third optical switches cannot be exhibited. However, when the phase control means 112 of the fourth optical switch are incorporated into the first optical switch, the resultant effects are obtained.

(Operation)

The operations of the constitutional parts used in the fourth optical switch other than the phase control means 112 are identical to those of the first through third optical switches, and hence description thereof has been omitted.

In the first through third optical switches, only the basic attenuation in the optical intensity of the control light in the multiplexer 40 is taken into account. In an actual optical switch, however, optical intensity loss occurring in the connecting parts between the optical fibers and optical components such as the multiplexer is often too great to be ignored. To construct the first through third optical switches, a plurality of optical components is connected by optical fiber. If the optical intensity of the control light attenuates due to optical loss occurring at the connecting portions in these plural locations, refractive index variation in the optical fiber, which is dependent on the optical intensity of the control light, is naturally affected, and accordingly, the switching operation of the optical switch is also affected.

The effect on the switching operation of the aforementioned control light attenuation performed by the optical attenuator 408 will now be described with reference to FIG. 11. Here, it is assumed that the input signal light is a linearly polarized light whose polarization plane is in the TE direction, and that the respective intensities of the S component (i.e. the TE component, which is parallel to the polarization plane of the signal light) and the P component, which is orthogonal to the S component, of the control light at the first port 406-1, which is the input port of the polarization splitter 406 shown in FIG. 11, are $P_E$ and $P_M$.

The control light is input from the first port 406-1 of the polarization splitter 406, whereupon the S component thereof is output from the second port 406-2, propagated through an optical fiber 410, and input into the optical attenuator 408. The S component is then attenuated by the optical attenuator 408, propagated through an optical fiber 411, input into the first port 407-1 of the polarization combiner 407, and output from the second port 407-2 serving as the output port of the polarization combiner 407. The S component is then propagated through an optical fiber 413, input into the one end of the second polarization-maintaining single-mode fiber 51 via the optical coupler 20, and propagated through the optical waveguide loop circuit 104 in the CW direction.

Meanwhile, the P component of the control light is output from the third port 406-3 of the polarization splitter 406, propagated through an optical fiber 412, input into the third port 407-3 of the polarization combiner 407, and output from the second port 407-2 of the polarization combiner 407. The P component is then propagated through the optical fiber 413, input into the one end of the second polarization-maintaining single-mode fiber 51 via the optical coupler 20, and propagated through the optical waveguide loop circuit 104 in the CW direction.

When the S component and P component of the control light are input into the one end of the second polarization-maintaining single-mode fiber 51, the respective optical intensities $P_E'$ and $P_M'$ thereof at the one end of the second polarization-maintaining single-mode fiber 51 are obtained from the following equations (10a) and (10b).

$$P_E' = P_E 10^{-(A+B_1)/10} \tag{10a}$$

$$P_M' = P_M 10^{-B_2/10} \tag{10b}$$

Here, A is the attenuation amount in the optical attenuator 408, and $B_1$ and $B_2$ are the amounts of attenuation in the S component and P component of the control light from the first port 406-1 of the polarization splitter 406 to the second port 407-2 of the polarization combiner 407. A, $B_1$, and $B_2$ are all values expressed in dB.

The intensity $P_M''$ of the P component of the control light when the control light is input from the one end of the second polarization-maintaining single-mode fiber 51, propagated along the paths L2, L3, L7, and L8 in succession to reach the multiplexer 40, and input into the one end of the fifth polarization-maintaining single-mode fiber 54, is obtained from the following equation (11).

$$P_M'' = \frac{1}{2} P_M 10^{-\frac{B_2+C+D}{10}} \tag{11}$$

Here, C is the sum of the propagation loss in the second polarization-maintaining single-mode fiber 51 (path L2) and the third polarization-maintaining single-mode fiber 52 (path L3) and D is the sum of the propagation loss in the wavelength demultiplexer 30, the seventh polarization-maintaining single-mode fiber 56 (path L7), eighth polarization-maintaining single-mode fiber 57 (path L8), and multiplexer 40. C and D are both values expressed in dB.

Similarly to the method derived from the equations (1') to (3), the total phase shift amount $\phi_{total}$ generated in the signal light (first signal light) propagating in the CW direction as a result of the mutual phase modulation effect that is produced by the optical Kerr effect realized by the control light pulse is obtained from the following equation (12).

$$\phi_{total} = 2\gamma P_E'(l_2+l_3) + 2\gamma P_M''(l_5+l_6) \tag{12}$$
$$= 2\gamma P_E 10^{-\frac{A+B_1}{10}}(l_2+l_3) + \gamma P_M 10^{-\frac{B_2+C+D}{10}}(l_5+l_6)$$

By constituting the fourth optical switch such that the following equation (13) is satisfied on the paths L2, L3, L5, and L6, the above equation (12) may be transformed into the following equation (14).

$$2(l_2+l_3)10^{-\frac{A+B_1}{10}} = (l_5+l_6)10^{-\frac{B_2+C+D}{10}} = l_{eff} \tag{13}$$

$$\phi_{total} = \gamma P_E' l_{eff} + \gamma P_M' l_{eff} = \gamma(P_E+P_M) l_{eff} \tag{14}$$

Here, $l_2, l_3, l_5, l_6$ are the optical path lengths of the paths L2, L3, L5, L6 respectively. The term $l_{eff}$ obtained in the equation (13) is the effective length of the optical path determined by A, $B_1$, $B_2$, C, and D. By determining the attenuation A in the optical attenuator 408 and the control light loss in the polarization splitter 406, polarization combiner 407, polarization-maintaining single-mode fiber forming the paths L2 and L3, wavelength demultiplexer 30, and so on, the value of $l_{eff}$ is determined.

Hence, by measuring these loss amounts when forming the fourth optical switch, the effective length $l_{eff}$ is determined, and thus the intensity $(P_E+P_M)$ of the control light required to set the value of $\phi_{total}$, obtained in the equation (12), to π can be set. Conversely, if the control light intensity is to be set as a design parameter of the fourth optical switch, then the control light intensity should be set such that the optical path lengths $l_2, l_3, l_5,$ and $l_6$ of the paths L2, L3, L5, and L6 satisfy the equation (13).

Similarly to the equation (4), it can also be seen in the equation (14) that the total phase shift amount $\phi_{total}$ produced in the first signal light is determined by the control light intensity $(P_E+P_M)$, and is not dependent on the polarization state $(P_E/P_M$, i.e. the ratio of $P_E$ and $P_M)$ of the control light.

Thus, according to the fourth optical switch, a switching operation that is not dependent on the polarization state of the control light can be realized.

Furthermore, in the fourth embodiment, the optical attenuator 408 is used, and the optical attenuator 408 is disposed at a point on a path connecting the second port 406-2 of the polarization splitter 406 and the first port 407-1 of the polarization combiner 407. However, as long as the relationship of the equation (13) is satisfied, an optical amplifier may be used in place of the optical attenuator 408, and the optical attenuator 408 or optical amplifier may be disposed at a point on a path connecting the third port 406-3 of the polarization splitter 406 and the third port 407-3 of the polarization combiner 407 rather than the position employed in the fourth embodiment.

Fifth Embodiment (Structure)

The structure of a fifth optical switch serving as a fifth embodiment of the present invention will now be described with reference to FIG. 11. In the fifth optical switch, the optical path length $l_6$ of the path L6 formed by the sixth polarization-maintaining single-mode fiber 55, the one end of which is connected to the third port 10-3 of the optical demultiplexer/multiplexer 10 and the other end of which is connected to the third polarization plane rotation portion 66, is set equally to the optical path length $l_5$ of the path L5 formed by the fifth polarization-maintaining single-mode fiber 54, the other end of which is connected to the third polarization plane rotation portion 66 and the one end of which is connected to the wavelength demultiplexing/multiplexing circuit 123.

From among the third optical switch and fourth optical switch described above, the fifth embodiment corresponds to the third optical switch provided with the phase control means 112 (to be referred to simply as "fourth optical switch" hereafter) and imposed with the aforementioned condition of $l_5=l_6$.

In many embodiments, no defects occur as long as the accuracy of the relationship $l_5=l_6$, established in relation to the paths L5 and L6, is within 10%. Hence, when the fifth optical switch is used in a 3R optical repeater, the quality of the regenerated signal light is within an allowable range for optical communication.

The third optical switch and fourth optical switch differ from each other in the constitution of the phase control means, and therefore different optical switches are produced when the condition $l_5=l_6$ is imposed on the third optical switch and fourth optical switch. Here, however, the effects of the fifth embodiment are common to both the third and fourth optical switches, and therefore both are referred to as the fifth optical switch and no distinction is made therebetween.

(Operation)

A prerequisite for use of the third optical switch and fourth optical switch described above is that the polarization state of the signal light correspond to that of a linearly polarized light having a polarization plane in the TE direction. However, the fifth optical switch may be used without defect regardless of whether the polarization plane of the signal light is in the TM direction or TE direction. To enable this, the condition $l_5=l_6$ must be satisfied.

By setting the optical path length $l_5$ of the path L5 formed by the fifth polarization-maintaining single-mode fiber 54 equally to the optical path length $l_6$ of the path L6 formed by the sixth polarization-maintaining single-mode fiber 55, the effect of the polarization mode dispersion generated in the path L5 and the path L6 can be canceled out. The reason for this is that the third polarization plane rotation portion 66 is provided between the path L5 and the path L6. As a result, the polarization planes of the signal light and control light propagating along the path L5 are rotated 90 degrees in the third polarization plane rotation portion 66, and then propagated along the path L6. Accordingly, the time required for the signal light to propagate along the path L5 as TM polarization or TE polarization is equal to the time required for the signal light to propagate along the path L6 as TE polarization or TM polarization. Thus the time required for propagation along the path L5 can be set equally to the time required for propagation along the path L6 regardless of whether the polarization plane of the signal light input from the phase control means 110 or 112 is in the TM direction or the TE direction. As a result, the time required to orbit the optical waveguide loop circuit 103 or 104 is always the same. In other words, an optical switch which is not dependent on the polarization plane direction of the signal light input from the phase control means 110 or 112 is realized.

As described above, with the fifth optical switch, a stable switching operation that is not dependent on the polarization state of the signal light and control light can be realized.

Sixth Embodiment (Structure)

Figure 12:
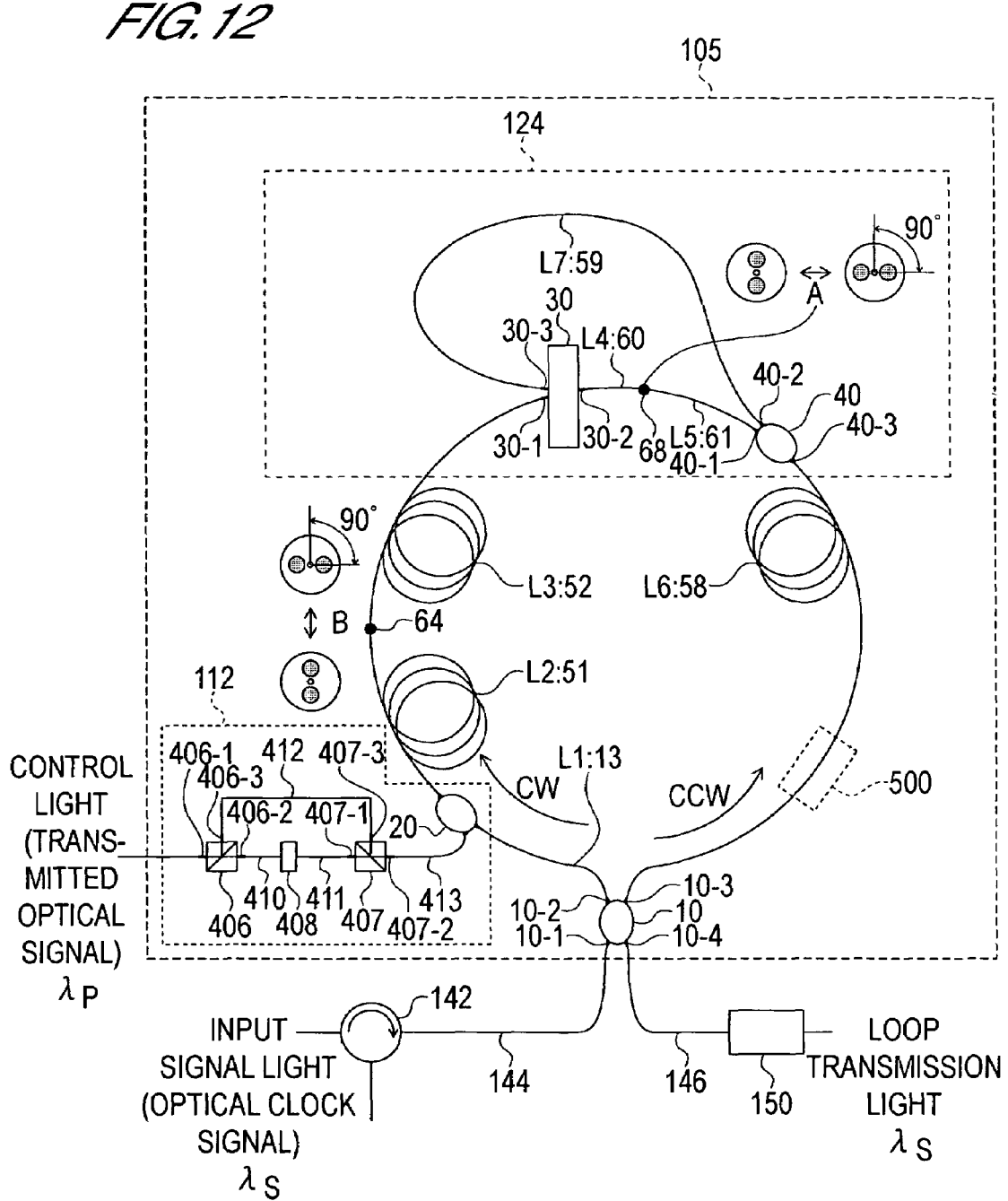
FIG. 12 is a block diagram of an optical switch according to a sixth embodiment.

The structure of a sixth optical switch serving as a sixth embodiment of the present invention will now be described with reference to FIG. 12. The sixth optical switch differs from the third and fourth optical switches in the following ways. Firstly, the optical path of the third and fourth optical switches formed on either side of the third polarization plane rotation portion 66 by the fifth polarization-maintaining single-mode fiber 54 and sixth polarization-maintaining single-mode fiber 55 is formed by a single sixth polarization-maintaining single-mode fiber 58 in the sixth optical switch. Secondly, the optical path of the third and fourth optical switches formed on either side of the first polarization plane rotation portion 62 by the seventh polarization-maintaining single-mode fiber 56 and eighth polarization-maintaining single-mode fiber 57 is formed by a single seventh polarization-maintaining single-mode fiber 59 in the sixth optical switch. Thirdly, the optical path of the third and fourth optical switches formed by the fourth polarization-maintaining single-mode fiber 53 is formed on either side of a first polarization plane rotation portion 68 by a fourth polarization-maintaining single-mode fiber 60 and a fifth polarization-maintaining single-mode fiber 61 in the sixth optical switch.

Hence, the structure of the sixth optical switch is as follows. An optical waveguide loop circuit 105 is formed by polarization-maintaining single-mode fiber serving as an optical nonlinear medium, and comprises the phase control means 110 (see FIGS. 1, 4, 6) having the control light input means 20 for inputting a control light, and a wavelength demultiplexing/multiplexing circuit 124.

The optical waveguide loop circuit 105 comprises the optical demultiplexer/multiplexer 10, the first polarization-maintaining single-mode fiber 13, the second polarization-maintaining single-mode fiber 51, the third polarization-maintaining single-mode fiber 52, the sixth polarization-maintaining single-mode fiber 58, the second polarization plane rotation portion 64, and the wavelength demultiplexing/multiplexing circuit 124.

The optical demultiplexer/multiplexer 10 comprises the first port 10-1 for inputting a signal light, the second port 10-2 connected to the one end of the first polarization-maintaining single-mode fiber 13, the third port 10-3 connected to the other end of the sixth polarization-maintaining single-mode fiber 58, and the fourth port 10-4 for outputting a modulated signal light. The dividing ratio of the optical intensity of the optical demultiplexer/multiplexer 10 is 1:1. The one end of the first polarization-maintaining single-mode fiber 13 is connected to the second port 10-2 of the optical demultiplexer/multiplexer 10, and the other end is connected to the optical coupler 20 serving as the control light input means.

The one end of the second polarization-maintaining single-mode fiber 51 is connected to the optical coupler 20, and the other end is connected to the second polarization plane rotation portion 64. The one end of the third polarization-maintaining single-mode fiber 52 is connected to the second polarization plane rotation portion 64, and the other end is connected to the wavelength demultiplexing/multiplexing circuit 124. One end of the sixth polarization-maintaining single-mode fiber 58 is connected to the wavelength demultiplexing/multiplexing circuit 124, and the other end is connected to the third port 10-3 of the optical demultiplexer/multiplexer 10. The second polarization plane rotation portion 64 is connected to the other end of the second polarization-maintaining single-mode fiber 51 and the one end of the third polarization-maintaining single-mode fiber 52.

The wavelength demultiplexing/multiplexing circuit 124 comprises the wavelength demultiplexer 30, the first polarization plane rotation portion 68, the multiplexer 40, the fourth polarization-maintaining single-mode fiber 60, the fifth polarization-maintaining single-mode fiber 61, and a seventh polarization-maintaining single-mode fiber 59.

The other end of the third polarization-maintaining single-mode fiber 52, one end of the fourth polarization-maintaining single-mode fiber 60, and one end of the seventh polarization-maintaining single-mode fiber 59 are connected to the wavelength demultiplexer 30. The other end of the fourth polarization-maintaining single-mode fiber 60 and one end of the fifth polarization-maintaining single-mode fiber 61 are connected to the first polarization plane rotation portion 68. The other end of the fifth polarization-maintaining single-mode fiber 61, the other end of the seventh polarization-maintaining single-mode fiber 59, and the one end of the sixth polarization-maintaining single-mode fiber 58 are connected to the multiplexer 40.

The fourth polarization-maintaining single-mode fiber 60 is constituted such that the one end is connected to the wavelength demultiplexer 30 and the other end is connected to the first polarization plane rotation portion 68. The fifth polarization-maintaining single-mode fiber 61 is constituted such that the one end is connected to the first polarization plane rotation portion 68 and the other end is connected to the multiplexer 40. The seventh polarization-maintaining single-mode fiber 59 is constituted such that the one end is connected to the wavelength demultiplexer 30, and the other end is connected to the multiplexer 40.

The phase control means 112 described below may be provided in place of the phase control means 110 described above. The phase control means 112 comprise the polarization splitter 406, the optical attenuator 408, the polarization combiner 407, and the optical coupler 20 serving as control light input means. The polarization splitter 406 comprises the first port 406-1 into which a control light is input, the second port 406-2 from which the S component of the control light is output, and the third port 406-3 from which the P component of the control light is output. The optical attenuator 408 reduces the optical intensity of the S component of the control light output from the polarization splitter 406, and then outputs same. The polarization combiner 407 comprises the first port 407-1 into which the S component of the control light, output from the optical attenuator 408, is input, the third port 407-3 into which the P component of the control light, output from the third port 406-3 of the polarization splitter, is input, and the second port 407-2 which combines and then outputs the S component of the control light output from the optical attenuator 408 and the P component of the control light output from the third port 406-3 of the polarization splitter 406. The optical coupler 20 serving as control light input means inputs the control light output from the second port 407-2 of the polarization combiner 407 into the optical waveguide loop circuit 105 from the one end of the second polarization-maintaining single-mode fiber 51.

The phase bias circuit 500 is inserted onto the path L6.

As described above, the sixth optical switch may be constituted using the phase control means 112 employed in the fourth optical switch as phase control means, and the effects obtained using the phase control means 112 are identical to those obtained in the fourth optical switch. Use of the phase control means 112 is not a structural feature of the sixth optical switch, and therefore the sixth embodiment corresponds to both an optical switch comprising the phase control means 110 and an optical switch comprising the improved phase control means 112. Both of these cases will be referred to as the sixth optical switch, with no distinction made therebetween.

(Operation)

According to the sixth optical switch described above, the polarization plane direction of the signal light is rotated 90 degrees in the first polarization plane rotation portion 68. In this case, the phase shift that occurs in the first signal light propagating through the optical waveguide loop circuit 105 in the CW direction depends on the contribution of the S component of the control light when the first signal light propagates through the second and third polarization-maintaining single-mode fibers 51, 52. When the first signal light propagates through the sixth polarization-maintaining single-mode fiber 58, the phase shift depends on the contribution of the P component of the control light. Hence, similarly to the first through fourth optical switches, an optical switch which functions independently of the polarization state of the control light is realized.

The operation of the sixth optical switch will now be described in detail with reference to Table 4. Table 4 summarizes the state in which the signal light and control light propagate along the paths L1 to L7 forming the optical waveguide loop circuit 105. When the polarization plane of the propagating signal light or control light is parallel to the slow axis or fast axis, which are the optical axes of the polarization-maintaining single-mode fiber forming the paths L1 to L7, this is denoted as s axis and f axis respectively in Table 4. Further, the rightward and leftward-facing arrows between the path columns indicate the propagation direction of the signal light or control light between the connected paths. It is assumed in this description that the signal light input into the sixth optical switch is a linearly polarized light having a plane of vibration in the TE direction, and that the TE direction is the slow optical axis direction of the polarization-maintaining single-mode fiber.

Similarly to the operation of the third optical switch, the first signal light propagating in the CW direction and the second signal light propagating in the CCW direction propagate along the paths L1 through L6 with parallel polarization planes. Hence, when the first signal light and second signal light are multiplexed in the optical demultiplexer/multiplexer 10, no phase difference occurs as a result of the mode birefringence in the polarization-maintaining single-mode fiber forming the paths L1 through L6. In other words, phase difference caused by fluctuation in the environmental temperature of the sixth optical switch and the wavelength of the signal lights does not occur between the first signal light and second signal light, and hence the sixth optical switch realizes a stable switching operation.

With the sixth optical switch, in addition to the effects obtained in the third or fourth optical switch, the number of polarization plane rotation portions can be reduced from three to two, thus simplifying the constitution and manufacture thereof.

The same conditions as those established in the description of the operation of the third optical switch according to the third embodiment are established in the sixth optical switch. In other words, the phase bias circuit 500 may be constituted as follows. That is, the second polarization plane rotation element (the second Faraday rotator, for example) is set such that the rotation direction of the polarization plane is opposite to that shown in FIGS. 2, 3, and 4, i.e. the polarization plane is rotated 45 degrees clockwise rather than counter-clockwise. In so doing, when the phase bias circuit 500 is disposed on the path L2 or the path L3, the second polarization plane rotation portion 64 becomes unnecessary, and when the phase bias circuit 500 is disposed on the path L4 or the path L5, the first polarization plane rotation portion 68 becomes unnecessary.

Hence, as described above, using the phase bias circuit 500 in which the second polarization plane rotation element (the second Faraday rotator, for example) is set to rotate the polarization plane 45 degrees clockwise, the phase bias component in the first and second signal lights can be canceled out in the phase compensation element (the Babinet-Soleil compensator 903, for example), and by passing the first and second signal lights through the phase bias circuit 500, the polarization plane is rotated 90 degrees in relation to the optical axis of the polarization-maintaining single-mode fiber.

TABLE 4

| | PATH | | | | | | |
|---|---|---|---|---|---|---|---|
| | L1 | L2 | L3 | L4 | L7 | L5 | L6 |
| FIRST SIGNAL LIGHT | s AXIS → | s AXIS → | f AXIS → | f AXIS → | — → | s AXIS → | s AXIS |
| SECOND SIGNAL LIGHT | s AXIS ← | s AXIS ← | f AXIS ← | f AXIS ← | — ← | s AXIS ← | s AXIS |
| S COMPONENT of CONTROL LIGHT | — | s AXIS → | f AXIS → | — → | f AXIS → | — → | f AXIS |
| P COMPONENT of CONTROL LIGHT | — | f AXIS → | s AXIS → | — → | s AXIS → | — → | s AXIS |

Seventh Embodiment (Structure)

In a seventh optical switch serving as a seventh embodiment of the present invention, the wavelength demultiplexing/multiplexing circuit of the second through sixth optical switches is improved. The structural features of the wavelength demultiplexing/multiplexing circuit disposed in the seventh optical switch will now be described with reference to FIGS. 8, 10, 11, 12, 13A, and 13B. In the wavelength demultiplexing/multiplexing circuit disposed in the seventh optical switch, the multiplexer used in the wavelength demultiplexing/multiplexing circuit disposed in the second through sixth optical switches is replaced by a wavelength demultiplexer such that two wavelength demultiplexers are used. The wavelength demultiplexing/multiplexing circuit of the seventh optical switch corresponding to the wavelength demultiplexing/multiplexing circuit of the third through fifth optical switches is constituted as follows.

Note that, as described above, in the seventh optical switch the wavelength demultiplexing/multiplexing circuit of the second through sixth optical switches is improved, but apart from the wavelength demultiplexing/multiplexing circuit, the structure of the seventh optical switch is identical to that of the second through sixth optical switches. Accordingly, the effects obtained from the structural parts other than the wavelength demultiplexing/multiplexing circuit used in the seventh embodiment are shared with the second through sixth optical switches, and therefore optical switches in which the wavelength demultiplexing/multiplexing circuit of the second through sixth optical switches is improved will be referred to hereafter as the seventh optical switch with no particular distinction made therebetween.

The wavelength demultiplexing/multiplexing circuit of the seventh optical switch, which is an improved version of the wavelength demultiplexing/multiplexing circuit in the third through fifth optical switches, is constituted by a first wavelength demultiplexer 701, the first polarization plane rotation portion 62, a second wavelength demultiplexer 702, the fourth polarization-maintaining single-mode fiber 53, the seventh polarization-maintaining single-mode fiber 56, and the eighth polarization-maintaining single-mode fiber 57.

The other end of the third polarization-maintaining single-mode fiber 52, the one end of the fourth polarization-maintaining single-mode fiber 53, and the one end of the seventh polarization-maintaining single-mode fiber 56 are connected to the first wavelength demultiplexer 701. The other end of the seventh polarization-maintaining single-mode fiber 56 and the one end of the eighth polarization-maintaining single-mode fiber 57 are connected to the first polarization plane rotation portion 62. The other end of the fourth polarization-maintaining single-mode fiber 53, the other end of the eighth polarization-maintaining single-mode fiber 57, and the other end of the fifth polarization-maintaining single-mode fiber 54 are connected to the second wavelength demultiplexer 702.

The fourth polarization-maintaining single-mode fiber 53 is constituted such that the one end is connected to the first wavelength demultiplexer 701 and the other end is connected to the second wavelength demultiplexer 702. The seventh polarization-maintaining single-mode fiber 56 is constituted such that the one end is connected to the first wavelength demultiplexer 701 and the other end is connected to the first polarization plane rotation portion 62. The eighth polarization-maintaining single-mode fiber 57 is constituted such that the one end is connected to the first polarization plane rotation portion 62, and the other end is connected to the second wavelength demultiplexer 702.

Further, the wavelength demultiplexing/multiplexing circuit of the seventh optical switch, which is an improved version of the wavelength demultiplexing/multiplexing circuit in the second optical switch, is constituted by the first wavelength demultiplexer 701, the polarization plane rotation portion 60, the optical delay device 70, the second wavelength demultiplexer 702, the third polarization-maintaining single-mode fiber 17, the fifth polarization-maintaining single-mode fiber 23, and the sixth polarization-maintaining single-mode fiber 25.

The other end of the second polarization-maintaining single-mode fiber 15, the one end of the third polarization-maintaining single-mode fiber 17, and the one end of the fifth polarization-maintaining single-mode fiber 23 are connected to the first wavelength demultiplexer 701. The other end of the fifth polarization-maintaining single-mode fiber 23 and the one end of the sixth polarization-maintaining single-mode fiber 25 are connected to the polarization plane rotation portion 60. The optical delay device 70 is provided at a point on the sixth polarization-maintaining single-mode fiber 25. The other end of the third polarization-maintaining single-mode fiber 17, the other end of the sixth polarization-maintaining single-mode fiber 25, and the one end of the fourth polarization-maintaining single-mode fiber 19 are connected to the second wavelength demultiplexer 702.

The third polarization-maintaining single-mode fiber 17 is constituted such that the one end is connected to the first wavelength demultiplexer 701 and the other end is connected to the second wavelength demultiplexer 702. The fifth polarization-maintaining single-mode fiber 23 is constituted such that the one end is connected to the first wavelength demultiplexer 701 and the other end is connected to the polarization plane rotation portion 60. The sixth polarization-maintaining single-mode fiber 25 is constituted such that the one end is connected to the polarization plane rotation portion 60, and the other end is connected to the second wavelength demultiplexer 702.

Further, the wavelength demultiplexing/multiplexing circuit of the seventh optical switch, which is an improved version of the wavelength demultiplexing/multiplexing circuit in the sixth optical switch, is constituted by the first wavelength demultiplexer 701, the first polarization plane rotation portion 68, the second wavelength demultiplexer 702, the fourth polarization-maintaining single-mode fiber 60, the fifth polarization-maintaining single-mode fiber 61, and the seventh polarization-maintaining single-mode fiber 59.

The other end of the third polarization-maintaining single-mode fiber 52, the one end of the fourth polarization-maintaining single-mode fiber 60, and the one end of the seventh polarization-maintaining single-mode fiber 59 are connected to the first wavelength demultiplexer 701. The other end of the fourth polarization-maintaining single-mode fiber 60 and the one end of the fifth polarization-maintaining single-mode fiber 61 are connected to the first polarization plane rotation portion 68. The other end of the fifth polarization-maintaining single-mode fiber 61, the other end of the seventh polarization-maintaining single-mode fiber 59, and the one end of the sixth polarization-maintaining single-mode fiber 58 are connected to the second wavelength demultiplexer 702.

The fourth polarization-maintaining single-mode fiber 60 is constituted such that the one end is connected to the first wavelength demultiplexer 701 and the other end is connected to the first polarization plane rotation portion 68. The fifth polarization-maintaining single-mode fiber 61 is constituted such that the one end is connected to the first polarization plane rotation portion 68 and the other end is connected to the second wavelength demultiplexer 702. The seventh polarization-maintaining single-mode fiber 59 is constituted such that the one end is connected to the first wavelength demultiplexer 701, and the other end is connected to the second wavelength demultiplexer 702.

(Operation)

Figure 13A:
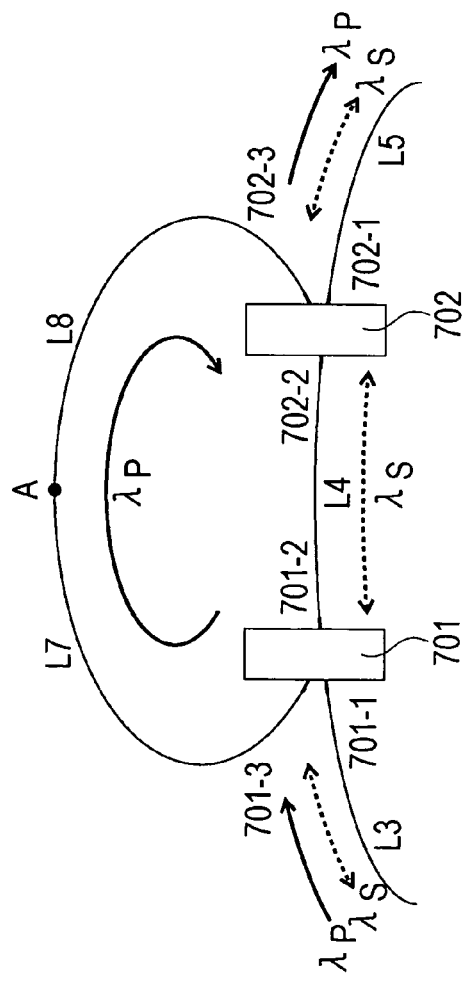
FIG. 13 is a view illustrating an operation of an optical switch according to a seventh embodiment.
Figure 13B:
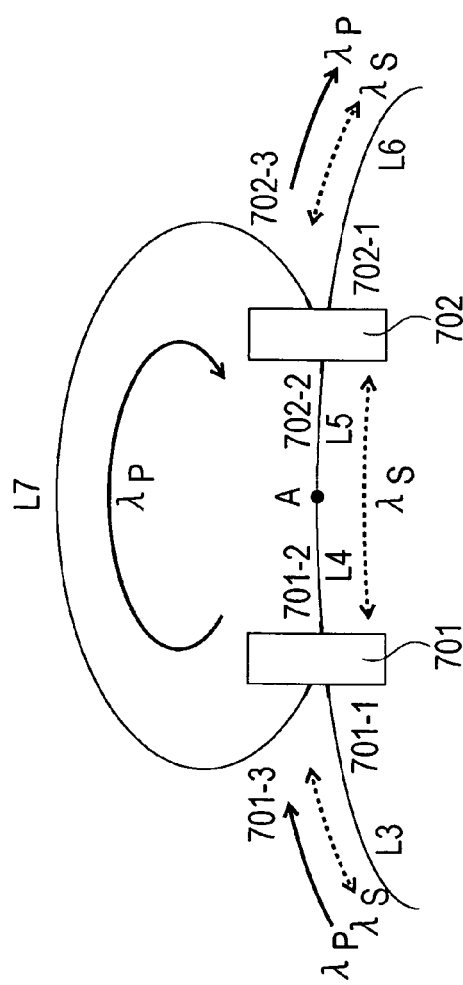

An operation of the seventh optical switch will now be described with reference to FIGS. 13A and 13B, and where appropriate, FIGS. 8, 10, 11, and 12. FIGS. 13A and 13B illustrate an operation of the seventh optical switch serving as the seventh embodiment of the present invention, and show in outline the wavelength demultiplexing/multiplexing circuit and the propagation pattern of the signal light and control light propagating along the optical paths forming the wavelength demultiplexing/multiplexing circuit. In FIGS. 13A and 13B, the propagation path of the control light is shown by a solid line, and the propagation path of the signal light is shown by a broken line.

FIG. 13A illustrates an operation relating to the wavelength demultiplexing/multiplexing circuit of the seventh optical switch, which is an improved version of the wavelength demultiplexing/multiplexing circuit in the third through fifth optical switches. FIG. 13B illustrates an operation relating to the wavelength demultiplexing/multiplexing circuit of the seventh optical switch, which is an improved version of the wavelength demultiplexing/multiplexing circuit in the sixth optical switch. As regards an operation relating to the wavelength demultiplexing/multiplexing circuit of the seventh optical switch, which is an improved version of the wavelength demultiplexing/multiplexing circuit in the second optical switch, the following description applies when the paths L3, L4, L5, L7, and L8 in FIG. 13A are read as the paths L2, L3, L4, L5, and L6 respectively.

An operation relating to the wavelength demultiplexing/multiplexing circuit of the seventh optical switch, which is an improved version of the wavelength demultiplexing/multiplexing circuit in the third through fifth optical switches, will now be described with reference to FIGS. 13A and 11. The propagation component of the first signal light output from the path L3 and propagating in the CW direction propagates through a first port 701-1 of the first wavelength demultiplexer 701, a second port 701-2 thereof, the path L4, a second port 702-2 of the second wavelength demultiplexer 702, and a first port 702-1 thereof in succession, and is then input onto the path L5. Meanwhile, the propagation component of the second signal light output from the path L5 and propagating in the CCW direction propagates through the first port 702-1 of the second wavelength demultiplexer 702, the second port 702-2 thereof, the path L4, the second port 701-2 of the first wavelength demultiplexer 701, and the first port 701-1 thereof in succession, and is then input onto the path L3.

The control light propagating in the CW direction is output from the path L3 and then propagated through the first port 701-1 of the first wavelength demultiplexer 701, a third port 701-3 thereof, and the path L7. Then, when the control light passes through the first polarization plane rotation portion 62 disposed in a position indicated by a point A, the S component and P component are switched, whereupon the control light is input onto the path L8. The control light then propagates through the path L8, a third port 702-3 of the second wavelength demultiplexer 702, and the first port 702-1 thereof, and is then input onto the path L5.

The path L4 is a propagation path of the signal light, whereas the path L7 and the path L8 are propagation paths of the control light. The path L3 and the path L5 are propagation paths of both the signal light and control light.

As described above, both the signal light and control light propagate through the wavelength demultiplexing/multiplexing circuit, and hence, for the same reasons as those described in relation to the role of the polarization plane rotation portion 60 in the description of the operation of the second optical switch and so on, the seventh optical switch is capable of realizing a switching operation that is not dependent on the polarization state of the control light.

An operation relating to the wavelength demultiplexing/multiplexing circuit of the seventh optical switch, which is an improved version of the wavelength demultiplexing/multiplexing circuit in the sixth optical switch, will now be described with reference to FIGS. 13B and 12. In this case, the wavelength demultiplexing/multiplexing circuit differs from the wavelength demultiplexing/multiplexing circuit shown in FIG. 13A in that the first polarization plane rotation portion 68 is provided between the path L4 and the path L5, as shown by the point A in FIG. 13B. Here, when the signal light passes through the first polarization plane rotation portion 68 disposed in the position shown by the point A, the S component and P component thereof are switched. Hence, for the same reasons as those described in relation to the role of the polarization plane rotation portion 60 in the description of the operation of the sixth optical switch and so on, the seventh optical switch is capable of realizing a switching operation that is not dependent on the polarization state of the signal light.

As described above, in the wavelength demultiplexing/multiplexing circuit disposed in the seventh optical switch, the multiplexer used in the wavelength demultiplexing/multiplexing circuit disposed in the second through sixth optical switches is replaced by the second wavelength demultiplexer, and by using the first and second wavelength demultiplexers, the wavelength demultiplexing/multiplexing circuit can be constituted without the multiplexer. Hence, the intensity of the signal light and control light does not decrease by ½, as occurs when passing through the multiplexer. Accordingly, the control light intensity required for the switching operation need only be half of that required in the second through sixth optical switches. As a result, the length of the path required to generate the optical nonlinear effect can be reduced, and the overall size of the optical switch can be reduced correspondingly.

Eighth Embodiment (Structure)

Similarly to the seventh optical switch, an eighth optical switch serving as an eighth embodiment of the present invention comprises an improved version of the wavelength demultiplexing/multiplexing circuit of the second through sixth optical switches. The structural features of the wavelength demultiplexing/multiplexing circuit disposed in the eighth optical switch will now be described with reference to FIGS. 8, 10, 11, 12, 14A, and 14B.

In the wavelength demultiplexing/multiplexing circuit disposed in the eighth optical switch, the multiplexer and wavelength demultiplexer used in the wavelength demultiplexing/multiplexing circuit disposed in the second through sixth optical switches are replaced by a single wavelength demultiplexing plate. The wavelength demultiplexing/multiplexing circuit of the eighth optical switch corresponding to the wavelength demultiplexing/multiplexing circuit of the third through fifth optical switches is constituted as follows.

Note that, similarly to the seventh optical switch described above, in the eighth optical switch, the wavelength demultiplexing/multiplexing circuit of the second through sixth optical switches is improved, but apart from the wavelength demultiplexing/multiplexing circuit, the structure of the eighth optical switch is identical to that of the second through sixth optical switches. Accordingly, the effects obtained from the structural parts other than the wavelength demultiplexing/multiplexing circuit used in the eighth embodiment are shared with the second through sixth optical switches, and therefore optical switches in which the wavelength demultiplexing/multiplexing circuit of the second through sixth optical switches is improved will be referred to hereafter as the eighth optical switch with no particular distinction made therebetween.

The wavelength demultiplexing/multiplexing circuit of the eighth optical switch, which is an improved version of the wavelength demultiplexing/multiplexing circuit in the third through fifth optical switches, is constituted by a wavelength demultiplexing plate 801, a polarization plane rotator 807, a first reflecting mirror 805, and a second reflecting mirror 803.

When the control light output from the third polarization-maintaining single-mode fiber 52 is input into the wavelength demultiplexing plate 801, the control light is reflected toward the first reflecting mirror 805, and when the control light reflected by the first reflecting mirror 805 is re-input into the wavelength demultiplexing plate 801, the control light is reflected toward the one end of the fifth polarization-maintaining single-mode fiber 54. When the signal light output from the third polarization-maintaining single-mode fiber 52 is input into the wavelength demultiplexing plate 801, the signal light is transmitted through the wavelength demultiplexing plate 801 and output toward the second reflecting mirror 803, and when the signal light reflected by the second reflecting mirror 803 is re-input into the wavelength demultiplexing plate 801, the signal light is transmitted through the wavelength demultiplexing plate 801 and output toward the one end of the fifth polarization-maintaining single-mode fiber 54. The polarization plane rotator 807 may employ a half-wave plate or the like, and is disposed in a position enabling the control light output from the third polarization-maintaining single-mode fiber 52 to pass therethrough on its way to the one end of the fifth polarization-maintaining single-mode fiber 54. The first reflecting mirror 805 serves to reflect the control light, and the second reflecting mirror 803 serves to reflect the signal light.

Further, the wavelength demultiplexing/multiplexing circuit of the eighth optical switch, which is an improved version of the wavelength demultiplexing/multiplexing circuit in the second optical switch, is constituted by the wavelength demultiplexing plate 801, the polarization plane rotator 807, the first reflecting mirror 805, and the second reflecting mirror 803.

When the control light output from the second polarization-maintaining single-mode fiber 15 is input into the wavelength demultiplexing plate 801, the control light is reflected toward the first reflecting mirror 805, and when the control light reflected by the first reflecting mirror 805 is re-input into the wavelength demultiplexing plate 801, the control light is reflected toward the one end of the fourth polarization-maintaining single-mode fiber 19. When the signal light output from the second polarization-maintaining single-mode fiber 15 is input into the wavelength demultiplexing plate 801, the signal light is transmitted through the wavelength demultiplexing plate 801 and output toward the second reflecting mirror 803, and when the signal light reflected by the second reflecting mirror 803 is re-input into the wavelength demultiplexing plate 801, the signal light is transmitted through the wavelength demultiplexing plate 801 and output toward the one end of the fourth polarization-maintaining single-mode fiber 19. The polarization plane rotator 807 is disposed in a position enabling the control light output from the second polarization-maintaining single-mode fiber 15 to pass therethrough on its way to the one end of the fourth polarization-maintaining single-mode fiber 19. The first reflecting mirror 805 serves to reflect the control light, and the second reflecting mirror 803 serves to reflect the signal light.

Further, the wavelength demultiplexing/multiplexing circuit of the eighth optical switch, which is an improved version of the wavelength demultiplexing/multiplexing circuit in the sixth optical switch, is constituted by the wavelength demultiplexing plate 801, a polarization plane rotator 806, a first reflecting mirror 802, and a second reflecting mirror 804.

When the control light output from the third polarization-maintaining single-mode fiber 52 is input into the wavelength demultiplexing plate 801, the control light is reflected toward the first reflecting mirror 802, and when the control light reflected by the first reflecting mirror 802 is re-input into the wavelength demultiplexing plate 801, the control light is reflected toward the one end of the sixth polarization-maintaining single-mode fiber 58. When the signal light output from the third polarization-maintaining single-mode fiber 52 is input into the wavelength demultiplexing plate 801, the signal light is transmitted through the wavelength demultiplexing plate 801 and output toward the second reflecting mirror 804, and when the signal light reflected by the second reflecting mirror is re-input into the wavelength demultiplexing plate 801, the signal light is transmitted through the wavelength demultiplexing plate 801 and output toward the one end of the sixth polarization-maintaining single-mode fiber 58. The polarization plane rotator 806 is disposed in a position enabling the signal light output from the third polarization-maintaining single-mode fiber 52 to pass therethrough on its way to the one end of the sixth polarization-maintaining single-mode fiber 58. The first reflecting mirror 802 serves to reflect the control light, and the second reflecting mirror 804 serves to reflect the signal light.

(Operation)

Figure 14A:
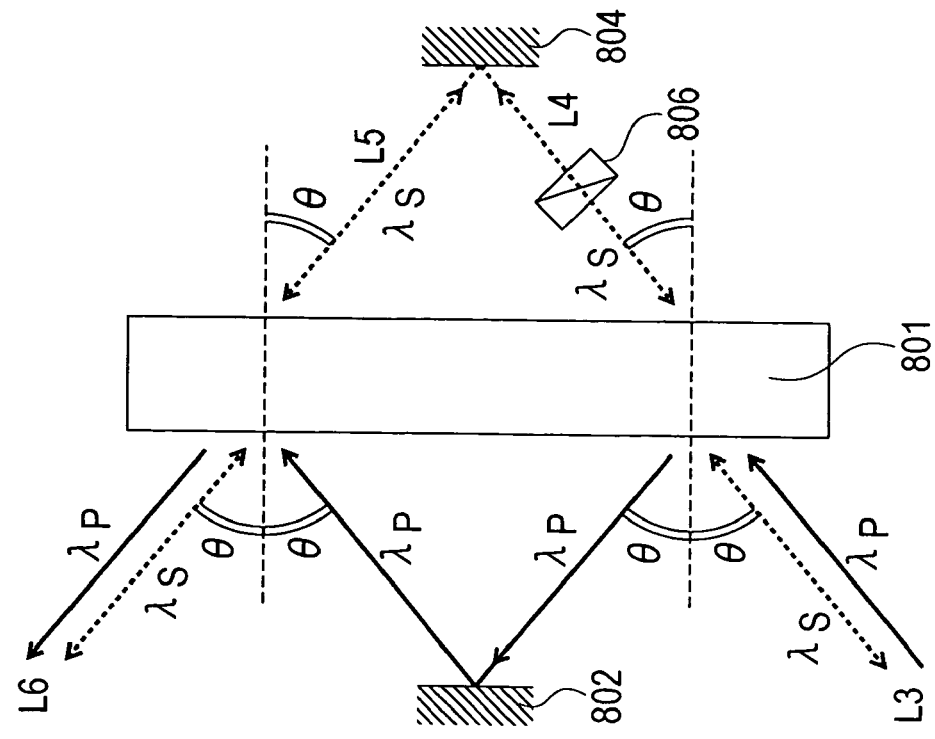
FIG. 14 is a view illustrating an operation of an optical switch according to an eighth embodiment.
Figure 14B:
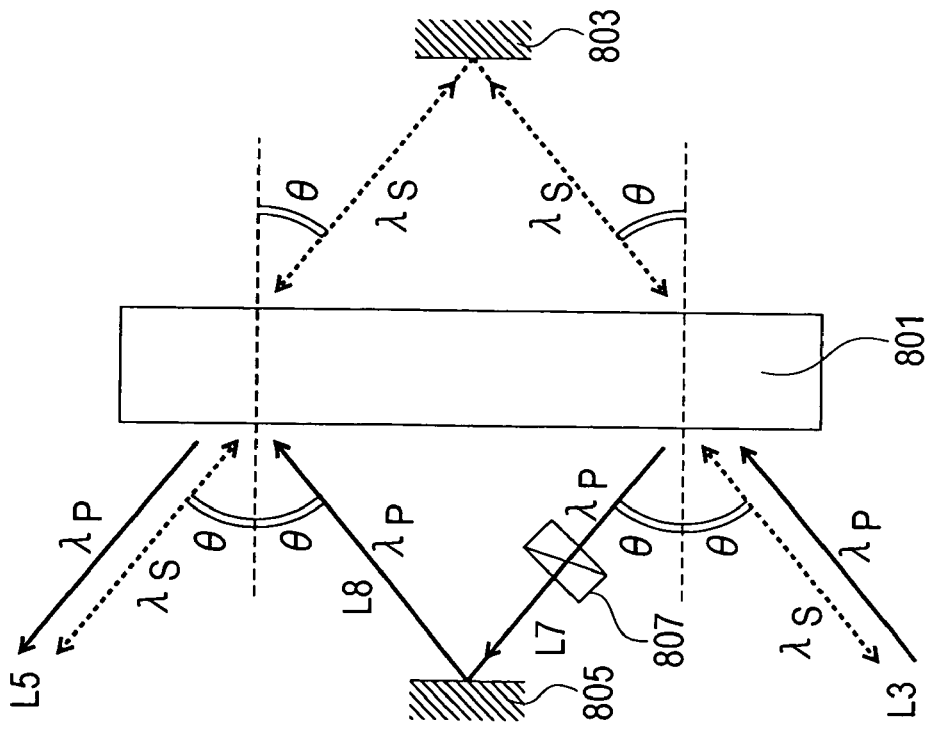

An operation of the eighth optical switch will now be described with reference to FIGS. 14A and 14B, and where appropriate, FIGS. 8, 10, 11, and 12. FIGS. 14A and 14B illustrate an operation of the eighth optical switch, and show in outline the wavelength demultiplexing/multiplexing circuit and the propagation pattern of the signal light and control light propagating along the optical paths forming the wavelength demultiplexing/multiplexing circuit. In FIGS. 14A and 14B, the propagation path of the control light (the route along which the control light propagates spatially) is shown by a solid line, and the propagation path of the signal light (the route along which the signal light propagates spatially) is shown by a broken line.

FIG. 14A illustrates an operation relating to the wavelength demultiplexing/multiplexing circuit of the eighth optical switch, which is an improved version of the wavelength demultiplexing/multiplexing circuit in the third through fifth optical switches. FIG. 14B illustrates an operation relating to the wavelength demultiplexing/multiplexing circuit of the eighth optical switch, which is an improved version of the wavelength demultiplexing/multiplexing circuit in the sixth optical switch.

As regards an operation relating to the wavelength demultiplexing/multiplexing circuit of the eighth optical switch, which is an improved version of the wavelength demultiplexing/multiplexing circuit in the second optical switch, the following description applies when the paths L3, L5, L7, and L8 in FIG. 14A are read as the paths L2, L4, L5, and L6, respectively.

The wavelength demultiplexing plate 801 may employ a wavelength filter known as a dielectric multilayer filter formed by laminating dielectric multilayer films on a transparent substrate. The wavelength demultiplexing plate 801 employs a dielectric multilayer filter which transmits the signal light having the wavelength λs and reflects the control light having the wavelength λp. When the signal light having the wavelength λs enters the surface of the wavelength demultiplexing plate 801 on which the dielectric multilayer film is formed at an entrance angle θ, it is transmitted through the dielectric multilayer film and output from the opposite surface of the transparent substrate to that on which the dielectric multilayer film is formed at the angle θ on the other side of the normal vector. Meanwhile, when the control light having the wavelength λp enters the surface of the wavelength demultiplexing plate 801 on which the dielectric multilayer film is formed at the entrance angle θ, it is output in accordance with the reflection principle in the reflection direction at the angle θ on the other side of the normal vector of the surface on which the dielectric multilayer film is formed.

An operation relating to the wavelength demultiplexing/multiplexing circuit of the eighth optical switch, which is an improved version of the wavelength demultiplexing/multiplexing circuit in the third through fifth optical switches, will now be described with reference to FIGS. 14A and 11.

The propagation component of the first signal light having the wavelength λs, which is output from the path L3 and propagates in the CW direction, enters the wavelength demultiplexing plate 801 at the entrance angle θ, passes through the dielectric multilayer film, passes through the opposite surface of the transparent substrate to that on which the dielectric multilayer film is formed, and is output at the angle θ on the other side of the normal vector. The first signal light output at the angle θ is then reflected by the second reflecting mirror 803 so as to re-enter the wavelength demultiplexing plate 801 at the entrance angle θ, passes through the wavelength demultiplexing plate 801, and is input onto the path L5. Meanwhile, the propagation component of the second signal light output from the path L5 and propagating in the CCW direction enters the wavelength demultiplexing plate 801 at the entrance angle θ, passes through the dielectric multilayer film, passes through the opposite surface of the transparent substrate to that on which the dielectric multilayer film is formed, and is output at the angle θ on the other side of the normal vector. The second signal light output at the angle θ is then reflected by the second reflecting mirror 803 so as to re-enter the wavelength demultiplexing plate 801 at the entrance angle θ, passes through the wavelength demultiplexing plate 801, and is input onto the path L3.

The control light having the wavelength λp, which propagates in the CW direction, is output from the path L3, enters the wavelength demultiplexing plate 801 at the entrance angle θ, is reflected by the dielectric multilayer film, passes through the polarization plane rotator 807, and impinges on the first reflecting mirror 805 at the entrance angle θ. Having impinged on the first reflecting mirror 805 at the entrance angle θ, the control light is reflected by the first reflecting mirror 805 so as to re-enter the wavelength demultiplexing plate 801 at the entrance angle θ, whereupon the control light is reflected by the dielectric multilayer film and input onto the path L5. The polarization plane rotator 807 may employ a half-wave plate. When the control light passes through the polarization plane rotator 807, the polarization plane direction thereof is rotated 90 degrees.

As described above, both the signal light and control light propagate through the wavelength demultiplexing/multiplexing circuit, and hence, for the same reasons as those described in relation to the role of the polarization plane rotation portion 60 in the description of the operation of the second optical switch and so on, the eighth optical switch is capable of realizing a switching operation that is not dependent on the polarization state of the control light.

An operation relating to the wavelength demultiplexing/multiplexing circuit of the eighth optical switch, which is an improved version of the wavelength demultiplexing/multiplexing circuit in the sixth optical switch, will now be described with reference to FIGS. 14B and 12.

The propagation component of the first signal light having the wavelength λs, which is output from the path L3 and propagates in the CW direction, enters the wavelength demultiplexing plate 801 at the entrance angle θ, passes through the dielectric multilayer film, passes through the opposite surface of the transparent substrate to that on which the dielectric multilayer film is formed, and is output at the angle θ on the other side of the normal vector. The first signal light output at the angle θ then passes through the polarization plane rotator 806, is reflected by the second reflecting mirror 804 so as to re-enter the wavelength demultiplexing plate 801 at the entrance angle θ, passes through the wavelength demultiplexing plate 801, and is input onto the path L6. Meanwhile, the propagation component of the second signal light output from the path L6 and propagating in the CCW direction enters the wavelength demultiplexing plate 801 at the entrance angle θ, passes through the dielectric multilayer film, passes through the opposite surface of the transparent substrate to that on which the dielectric multilayer film is formed, and is output at the angle θ on the other side of the normal vector. The second signal light output at the angle θ is then reflected by the second reflecting mirror 804, passes through the polarization plane rotator 806 so as to re-enter the wavelength demultiplexing plate 801 at the entrance angle θ, passes through the wavelength demultiplexing plate 801, and is input onto the path L3. A half-wave plate may be used as the polarization plane rotator 806. When the signal light passes through the polarization plane rotator 806, the S component and P component of the signal light are switched.

The control light having the wavelength λp, which propagates in the CW direction, is output from the path L3, enters the wavelength demultiplexing plate 801 at the entrance angle θ, is reflected by the dielectric multilayer film, and impinges on the first reflecting mirror 802 at the entrance angle θ. Having impinged on the first reflecting mirror 802 at the entrance angle θ, the control light is reflected by the first reflecting mirror 802 so as to re-enter the wavelength demultiplexing plate 801 at the entrance angle θ, whereupon the control light is reflected by the dielectric multilayer film and input onto the path L6.

For the same reasons as those described in relation to the role of the first polarization plane rotation portion 68 in the description of the operation of the sixth optical switch and so on, the eighth optical switch is capable of realizing a switching operation that is not dependent on the polarization state of the signal light.

As described above, in the wavelength demultiplexing/multiplexing circuit disposed in the eighth optical switch, the multiplexer and wavelength demultiplexer used in the wavelength demultiplexing/multiplexing circuit disposed in the second through sixth optical switches is replaced by the single wavelength demultiplexing plate, and therefore the intensity of the signal light and control light do not decrease by ½, as occurs when passing through the multiplexer. Accordingly, the control light intensity required for the switching operation need only be half of that required in the second through sixth optical switches. Furthermore, the seventh optical switch requires two elements, namely the first and second wavelength demultiplexers, to perform wavelength demultiplexing, whereas the eighth optical switch requires only the single wavelength demultiplexing plate 801. Since wavelength demultiplexing is performed with only a single element, the number of constitutional components is reduced accordingly, and thus the constitution of the optical switch is simplified and the size of the optical switch is reduced. Another advantage of reducing the number of elements performing wavelength demultiplexing by one is that the attenuation rate of the signal light and control light when passing through this element can be reduced by half.

In the first and second switches, the phase bias circuit 500 is disposed (at a point on) a path selected from the paths L1 through L4 constituting the optical waveguide loop circuit along which the signal light is guided. In the third through sixth switches, the phase bias circuit 500 is disposed (at a point on) a path selected from the paths L1 through L6 constituting the optical waveguide loop circuit along which the signal light is guided. In the seventh and eighth switches, the phase bias circuit 500 is disposed in the same location as that in which the phase bias circuit 500 is disposed in the optical switch, from among the first through sixth optical switches, on which the seventh or eighth optical switch is based.

In the first through eighth embodiments, an optical band-pass filter 150 in which the center of the transmission wavelength is set to λs and the wavelength λp can be blocked is preferably connected to the other end of the output optical filter 146, the one end of which is connected to the fourth port 10-4 of the optical demultiplexer/multiplexer 10. As well as the modulated signal light, the control light is also output from the fourth port 10-4 of the optical demultiplexer/multiplexer 10, and therefore the optical band-pass filter 150 is disposed to block the control light and output only the modulated signal light. Optical switches are usually used with the aim of extracting only a modulated signal light as output light.

Further, an optical circulator 142 is preferably connected to the other end of the input optical fiber 144, the one end of which is connected to the first port 10-1 of the optical demultiplexer/multiplexer 10. In so doing, the input signal light is input into the input optical fiber 144 through the optical circulator 142, and input into the optical waveguide loop circuit from the first port 10-1 of the optical demultiplexer/multiplexer 10. Loop reflection light reflected from the optical waveguide loop circuit is then guided through the input optical fiber 144, input into the optical circulator 142, and output from an output port of the optical circulator 142 that is separate from the input port into which the input signal light is input. Thus the loop reflection light is not returned to the transmission line along which the input signal light propagates.

If the optical circulator 142 is not disposed on the input optical fiber 144, loop reflection light output to the first port 10-1 of the optical demultiplexer/multiplexer 10 travels back along the transmission line from which it came, and is thus returned to the transmission side. In typical time division multiplex optical communication, it is undesirable for a part of a transmission signal to be transmitted back from the reception side to the transmission side, and therefore, using the optical circulator 142, the loop reflection light output to the first port 10-1 of the optical demultiplexer/multiplexer 10 can be output toward a different transmission line to the transmission line along which the signal light was originally propagated.

What is claimed is:

1. An optical switch comprising:

an optical waveguide loop circuit for dividing a signal light, propagating the divided signal lights in opposite directions along a loop-form light path formed from an optical nonlinear medium, and then re-multiplexing the divided signal lights;

control light input means disposed at a point on said optical waveguide loop circuit for inputting a control light into said optical nonlinear medium to alter the refractive index of said optical nonlinear medium, thereby serving as phase control means for controlling the phase of the signal light propagating through said optical waveguide loop circuit;

a wavelength demultiplexing/multiplexing circuit provided at a point on said optical waveguide loop circuit for equalizing the respective contributions made by two orthogonal polarization components of said control light to the phase control amount of said signal light through said refractive index alteration of said optical nonlinear medium; and a phase bias circuit disposed at a point on said optical waveguide loop circuit for removing a phase bias component added to said signal light, wherein said phase bias circuit is disposed at a point on a polarization-maintaining single-mode fiber constituting said optical waveguide loop circuit through which said signal light is guided, wherein said phase bias circuit comprises a first polarization plane rotation element for rotating a polarization plane of said signal light 45 degrees, a phase compensation element for correcting a phase shift between polarization components orthogonal to said signal light, and a second polarization plane rotation element for rotating a polarization plane of said signal light 45 degrees, and wherein said first polarization plane rotation element, said phase compensation element, and said second polarization plane rotation element are arranged in series in that order.

2. The optical switch according to claim 1, wherein said first and second polarization plane rotation elements are Faraday rotators, and said phase compensation element is a Babinet-Soleil compensator.

3. The optical switch according to claim 1, wherein said first and second polarization plane rotation elements are Faraday rotators, and said phase compensation element is a temperature-controlled polarization-maintaining single-mode fiber.

4. The optical switch according to claim 1, wherein said first and second polarization plane rotation elements are Faraday rotators, and said phase compensation element is an electro-optic element.

5. The optical switch according to claim 1,
wherein said optical waveguide loop circuit is formed using polarization-maintaining single-mode fiber as said optical nonlinear medium,
wherein said optical waveguide loop circuit comprises:
an optical demultiplexer/multiplexer having an optical intensity dividing ratio of 1 to 1 and comprising a first port for inputting a signal light, a second port to which one end of a first polarization-maintaining single-mode fiber is connected, a third port to which the other end of a sixth polarization-maintaining single-mode fiber is connected, and a fourth port for outputting a modulated signal light;
said first polarization-maintaining single-mode fiber, said one end of which is connected to said second port of said optical demultiplexer/multiplexer, and having another end which is connected to an optical coupler serving as said control light input means;
a second polarization-maintaining single-mode fiber, one end of which is connected to said optical coupler and the other end of which is connected to a second polarization plane rotation portion;
a third polarization-maintaining single-mode fiber, one end of which is connected to said second polarization plane rotation portion and the other end of which is connected to said wavelength demultiplexing/multiplexing circuit;
said sixth polarization-maintaining single-mode fiber, one end of which is connected to said wavelength demultiplexing/multiplexing circuit, and having another end which is connected to said third port of said optical demultiplexer/multiplexer; and
said second polarization plane rotation portion to which said other end of said second polarization-maintaining single-mode fiber and said one end of said third polarization-maintaining single-mode fiber are connected,
wherein said wavelength demultiplexing/multiplexing circuit comprises:
a wavelength demultiplexer to which said other end of said third polarization-maintaining single-mode fiber, one end of a fourth polarization-maintaining single-mode fiber, and one end of a seventh polarization-maintaining single-mode fiber are connected;
a first polarization plane rotation portion to which the other end of said fourth polarization-maintaining single-mode fiber and one end of a fifth polarization-maintaining single-mode fiber are connected;
a multiplexer to which the other end of said fifth polarization-maintaining single-mode fiber, the other end of said seventh polarization-maintaining single-mode fiber, and said one end of said sixth polarization-maintaining single-mode fiber are connected;
said fourth polarization-maintaining single-mode fiber, said one end of which is connected to said wavelength demultiplexer, and having another end which is connected to said first polarization plane rotation portion;
said fifth polarization-maintaining single-mode fiber, said one end of which is connected to said first polarization plane rotation portion, and having another end which is connected to said multiplexer; and
said seventh polarization-maintaining single-mode fiber, said one end of which is connected to said wavelength demultiplexer, and having another end which is connected to said multiplexer, and
wherein said phase bias circuit is disposed at a point on one polarization-maintaining single-mode fiber spaced apart from said first through sixth polarization-maintaining single-mode fibers.

6. The optical switch according to claim 5, wherein said phase control means comprises:
a polarization splitter having a first port for inputting a control light, a second port for outputting an S component of said control light, and a third port for outputting a P component of said control light;
an optical attenuator for outputting said S component of said control light, output from said polarization splitter, with a reduced optical intensity;
a polarization combiner having a first port for inputting said S component of said control light output from said optical attenuator, a third port for inputting said P component of said control light output from said third port of said polarization splitter, and a second port for combining, and then outputting, said S component of said control light output from said optical attenuator and said P component of said control light output from said third port of said polarization splitter; and
control light input means for inputting said control light output from said second port of said polarization combiner into said optical waveguide loop circuit, and
wherein said phase bias circuit is disposed at a point on one polarization-maintaining single-mode fiber spaced apart from said first through sixth polarization-maintaining single-mode fibers.

7. The optical switch according to claim 5, wherein said wavelength demultiplexing/multiplexing circuit comprises:
a first wavelength demultiplexer to which said other end of said third polarization-maintaining single-mode fiber, one end of a fourth polarization-maintaining single-mode fiber, and one end of a seventh polarization-maintaining single-mode fiber are connected;
a first polarization plane rotation portion to which the other end of said fourth polarization-maintaining single-mode fiber and one end of a fifth polarization-maintaining single-mode fiber are connected;
a second wavelength demultiplexer to which the other end of said fifth polarization-maintaining single-mode fiber, the other end of said seventh polarization-maintaining single-mode fiber, and said one end of said sixth polarization-maintaining single-mode fiber are connected;
said fourth polarization-maintaining single-mode fiber, said one end of which is connected to said first wavelength demultiplexer, and having another end which is connected to said first polarization plane rotation portion;

said fifth polarization-maintaining single-mode fiber, said one end of which is connected to said first polarization plane rotation portion, and having another end which is connected to said second wavelength demultiplexer; and said seventh polarization-maintaining single-mode fiber, said one end of which is connected to said first wavelength demultiplexer, and having another end which is connected to said second wavelength demultiplexer.

8. The optical switch according to claim 5, wherein said wavelength demultiplexing/multiplexing circuit comprises:
a wavelength demultiplexing plate which, when input with said control light output from said third polarization-maintaining single-mode fiber, reflects said control light toward a first reflecting mirror, and when input again with said control light reflected by said first reflecting mirror, reflects said control light toward said one end of said sixth polarization-maintaining single-mode fiber, and when input with said signal light output from said third polarization-maintaining single-mode fiber, transmits said signal light and outputs said signal light toward a second reflecting mirror, and when input again with said signal light reflected by said second reflecting mirror, transmits said signal light and outputs said signal light toward said one end of said sixth polarization-maintaining single-mode fiber;
a polarization plane rotator disposed in a position enabling said signal light to pass therethrough as said signal light, output from said third polarization-maintaining single-mode fiber, travels to said one end of said sixth polarization-maintaining single-mode fiber;
said first reflecting mirror for reflecting said control light; and
said second reflecting mirror for reflecting said signal light.

9. The optical switch according to claim 1, wherein an optical band-pass filter is connected to said fourth port of said optical demultiplexer/multiplexer via an output optical fiber.

10. The optical switch according to claim 1, wherein an optical circulator is connected to said first port of said optical demultiplexer/multiplexer via an input optical fiber.

11. An optical switch comprising:
an optical waveguide loop circuit for dividing a signal light, propagating the divided signal lights in opposite directions along a loop-form light path formed from an optical nonlinear medium, and then re-multiplexing the divided signal lights;
control light input means disposed at a point on said optical waveguide loop circuit for inputting a control light into said optical nonlinear medium to alter the refractive index of said optical nonlinear medium, thereby serving as phase control means for controlling the phase of the signal light propagating through said optical waveguide loop circuit;
a wavelength demultiplexing/multiplexing circuit provided at a point on said optical waveguide loop circuit for equalizing the respective contributions made by two orthogonal polarization components of said control light to the phase control amount of said signal light through said refractive index alteration of said optical nonlinear medium; and
a phase bias circuit disposed at a point on said optical waveguide loop circuit for removing a phase bias component added to said signal light,
wherein said optical waveguide loop circuit is formed using polarization-maintaining single-mode fiber as said optical nonlinear medium, wherein said optical waveguide loop circuit comprises:
an optical demultiplexer/multiplexer having an optical intensity dividing ratio of 1 to 1 and comprising a first port for inputting a signal light, a second port to which one end of a first polarization-maintaining single-mode fiber is connected, a third port to which the other end of a fourth polarization-maintaining single-mode fiber is connected, and a fourth port for outputting a modulated signal light;
said first polarization-maintaining single-mode fiber, said one end of which is connected to said second port of said optical demultiplexer/multiplexer, and having another end which is connected to an optical coupler serving as said control light input means;
a second polarization-maintaining single-mode fiber, one end of which is connected to said optical coupler and the other end of which is connected to said wavelength demultiplexing/multiplexing circuit; and
said fourth polarization-maintaining single-mode fiber, one end of which is connected to said wavelength demultiplexing/multiplexing circuit, and having another end which is connected to said third port of said optical demultiplexer/multiplexer,
wherein said wavelength demultiplexing/multiplexing circuit comprises:
a wavelength demultiplexer to which said other end of said second polarization-maintaining single-mode fiber, one end of a third polarization-maintaining single-mode fiber, and one end of a fifth polarization-maintaining single-mode fiber are connected;
a polarization plane rotation portion to which the other end of said fifth polarization-maintaining single-mode fiber and one end of a sixth polarization-maintaining single-mode fiber are connected;
a multiplexer to which the other end of said third polarization-maintaining single-mode fiber, the other end of said sixth polarization-maintaining single-mode fiber, and said one end of said fourth polarization-maintaining single-mode fiber are connected;
said third polarization-maintaining single-mode fiber, said one end of which is connected to said wavelength demultiplexer and said other end of which is connected to said multiplexer;
said fifth polarization-maintaining single-mode fiber, said one end of which is connected to said wavelength demultiplexer, and having another end which is connected to said polarization plane rotation portion; and
said sixth polarization-maintaining single-mode fiber, said one end of which is connected to said polarization plane rotation portion, and having another end which is connected to said multiplexer, and
wherein said phase bias circuit is disposed at a point on one polarization-maintaining single-mode fiber spaced apart from said first through fourth polarization-maintaining single-mode fibers.

12. The optical switch according to claim 11, wherein said phase control means comprises:
a polarization splitter having a first port for inputting a control light, a second port for outputting an S component of said control light, and a third port for outputting a P component of said control light;
an optical attenuator for outputting said S component of said control light, output from said polarization splitter, with a reduced optical intensity;
a polarization combiner having a first port for inputting said S component of said control light output from said optical attenuator, a third port for inputting said P component of said control light output from said third port of said polarization splitter, and a second port for combining, and then outputting, said S component of said control light output from said optical attenuator and said P component of said control light output from said third port of said polarization splitter; and control light input means for inputting said control light output from said second port of said polarization combiner into said optical waveguide loop circuit.

13. An optical switch comprising:

an optical waveguide loop circuit for dividing a signal light, propagating the divided signal lights in opposite directions along a loop-form light path formed from an optical nonlinear medium, and then re-multiplexing the divided signal lights;

control light input means disposed at a point on said optical waveguide loop circuit for inputting a control light into said optical nonlinear medium to alter the refractive index of said optical nonlinear medium, thereby serving as phase control means for controlling the phase of the signal light propagating through said optical waveguide loop circuit;

a wavelength demultiplexing/multiplexing circuit provided at a point on said optical waveguide loop circuit for equalizing the respective contributions made by two orthogonal polarization components of said control light to the phase control amount of said signal light through said refractive index alteration of said optical nonlinear medium; and a phase bias circuit disposed at a point on said optical waveguide loop circuit for removing a phase bias component added to said signal light, wherein said optical waveguide loop circuit is formed using polarization-maintaining single-mode fiber as said optical nonlinear medium, wherein said optical waveguide loop circuit comprises:

an optical demultiplexer/multiplexer having an optical intensity dividing ratio of 1 to 1 and comprising a first port for inputting a signal light, a second port to which one end of a first polarization-maintaining single-mode fiber is connected, a third port to which the other end of a fourth polarization-maintaining single-mode fiber is connected, and a fourth port for outputting a modulated signal light;

said first polarization-maintaining single-mode fiber, said one end of which is connected to said second port of said optical demultiplexer/multiplexer, and having another end which is connected to an optical coupler serving as said control light input means;

a second polarization-maintaining single-mode fiber, one end of which is connected to said optical coupler and the other end of which is connected to said wavelength demultiplexing/multiplexing circuit; and said fourth polarization-maintaining single-mode fiber, one end of which is connected to said wavelength demultiplexing/multiplexing circuit, and having another end which is connected to said third port of said optical demultiplexer/multiplexer, wherein said wavelength demultiplexing/multiplexing circuit comprises:

a wavelength demultiplexer to which said other end of said second polarization-maintaining single-mode fiber, one end of a third polarization-maintaining single-mode fiber, and one end of a fifth polarization-maintaining single-mode fiber are connected;

a polarization plane rotation portion to which the other end of said fifth polarization-maintaining single-mode fiber and one end of a sixth polarization-maintaining single-mode fiber are connected;

an optical delay device provided at a point on said sixth polarization-maintaining single-mode fiber;

a multiplexer to which the other end of said third polarization-maintaining single-mode fiber, the other end of said sixth polarization-maintaining single-mode fiber, and said one end of said fourth polarization-maintaining single-mode fiber are connected;

said third polarization-maintaining single-mode fiber, said one end of which is connected to said wavelength demultiplexer, and having another end which is connected to said multiplexer;

said fifth polarization-maintaining single-mode fiber, said one end of which is connected to said wavelength demultiplexer, and having another end which is connected to said polarization plane rotation portion; and said sixth polarization-maintaining single-mode fiber, said one end of which is connected to said polarization plane rotation portion, and having another end which is connected to said multiplexer, and wherein said phase bias circuit is disposed at a point on one polarization-maintaining single-mode fiber spaced apart from said first through fourth polarization-maintaining single-mode fibers.

14. The optical switch according to claim 13, wherein said phase control means comprises:

a polarization splitter having a first port for inputting a control light, a second port for outputting an S component of said control light, and a third port for outputting a P component of said control light;

an optical attenuator for outputting said S component of said control light, output from said polarization splitter, with a reduced optical intensity;

a polarization combiner having a first port for inputting said S component of said control light output from said optical attenuator, a third port for inputting said P component of said control light output from said third port of said polarization splitter, and a second port for combining, and then outputting, said S component of said control light output from said optical attenuator and said P component of said control light output from said third port of said polarization splitter; and control light input means for inputting said control light output from said second port of said polarization combiner into said optical waveguide loop circuit.

15. The optical switch according to claim 13, wherein said wavelength demultiplexing/multiplexing circuit comprises:

a first wavelength demultiplexer to which said other end of said second polarization-maintaining single-mode fiber, one end of a third polarization-maintaining single-mode fiber, and one end of a fifth polarization-maintaining single-mode fiber are connected;

a polarization plane rotation portion to which the other end of said fifth polarization-maintaining single-mode fiber and one end of a sixth polarization-maintaining single-mode fiber are connected;

an optical delay device provided at a point on said sixth polarization-maintaining single-mode fiber;

a second wavelength demultiplexer to which the other end of said third polarization-maintaining single-mode fiber, the other end of said sixth polarization-maintaining single-mode fiber, and said one end of said fourth polarization-maintaining single-mode fiber are connected;

said third polarization-maintaining single-mode fiber, said one end of which is connected to said first wavelength demultiplexer, and having another end which is connected to said second wavelength demultiplexer;

said fifth polarization-maintaining single-mode fiber, said one end of which is connected to said first wavelength demultiplexer, and having another end which is connected to said polarization plane rotation portion; and said sixth polarization-maintaining single-mode fiber, said one end of which is connected to said polarization plane rotation portion, and having another end which is connected to said second wavelength demultiplexer.

16. The optical switch according to claim 13, wherein said wavelength demultiplexing/multiplexing circuit comprises:

a wavelength demultiplexing plate which, when input with said control light output from said second polarization-maintaining single-mode fiber, reflects said control light toward a first reflecting mirror, and when input again with said control light reflected by said first reflecting mirror, reflects said control light toward said one end of said fourth polarization-maintaining single-mode fiber, and when input with said signal light output from said second polarization-maintaining single-mode fiber, transmits said signal light and outputs said signal light toward a second reflecting mirror, and when input again with said signal light reflected by said second reflecting mirror, transmits said signal light and outputs said signal light toward said one end of said fourth polarization-maintaining single-mode fiber;

a polarization plane rotator disposed in a position enabling said control light to pass therethrough as said control light, output from said second polarization-maintaining single-mode fiber, travels to said one end of said fourth polarization-maintaining single-mode fiber;

said first reflecting mirror for reflecting said control light; and said second reflecting mirror for reflecting said signal light.

17. An optical switch comprising:

an optical waveguide loop circuit for dividing a signal light, propagating the divided signal lights in opposite directions along a loop-form light path formed from an optical nonlinear medium, and then re-multiplexing the divided signal lights;

control light input means disposed at a point on said optical waveguide loop circuit for inputting a control light into said optical nonlinear medium to alter the refractive index of said optical nonlinear medium, thereby serving as phase control means for controlling the phase of the signal light propagating through said optical waveguide loop circuit;

a wavelength demultiplexing/multiplexing circuit provided at a point on said optical waveguide loop circuit for equalizing the respective contributions made by two orthogonal polarization components of said control light to the phase control amount of said signal light through said refractive index alteration of said optical nonlinear medium; and a phase bias circuit disposed at a point on said optical waveguide loop circuit for removing a phase bias component added to said signal light, wherein said optical waveguide loop circuit is formed using polarization-maintaining single-mode fiber as said optical nonlinear medium, wherein said optical waveguide loop circuit comprises:

an optical demultiplexer/multiplexer having an optical intensity dividing ratio of 1 to 1 and comprising a first port for inputting a signal light, a second port to which one end of a first polarization-maintaining single-mode fiber is connected, a third port to which the other end of a sixth polarization-maintaining single-mode fiber is connected, and a fourth port for outputting a modulated signal light;

said first polarization-maintaining single-mode fiber, said one end of which is connected to said second port of said optical demultiplexer/multiplexer, and having another end which is connected to an optical coupler serving as said control light input means;

a second polarization-maintaining single-mode fiber, one end of which is connected to said optical coupler and the other end of which is connected to a second polarization plane rotation portion;

a third polarization-maintaining single-mode fiber, one end of which is connected to said second polarization plane rotation portion and the other end of which is connected to said wavelength demultiplexing/multiplexing circuit;

a fifth polarization-maintaining single-mode fiber, one end of which is connected to said wavelength demultiplexing/multiplexing circuit and the other end of which is connected to a third polarization plane rotation portion;

said sixth polarization-maintaining single-mode fiber, one end of which is connected to said third polarization plane rotation portion, and having another end which is connected to said third port of said optical demultiplexer/multiplexer;

said second polarization plane rotation portion to which said other end of said second polarization-maintaining single-mode fiber and said one end of said third polarization-maintaining single-mode fiber are connected; and said third polarization plane rotation portion to which said other end of said fifth polarization-maintaining single-mode fiber and said one end of said sixth polarization-maintaining single-mode fiber are connected, wherein said wavelength demultiplexing/multiplexing circuit comprises:

a wavelength demultiplexer to which said other end of said third polarization-maintaining single-mode fiber, one end of a fourth polarization-maintaining single-mode fiber, and one end of a seventh polarization-maintaining single-mode fiber are connected;

a first polarization plane rotation portion to which the other end of said seventh polarization-maintaining single-mode fiber and one end of an eighth polarization-maintaining single-mode fiber are connected;

a multiplexer to which the other end of said fourth polarization-maintaining single-mode fiber, the other end of said eighth polarization-maintaining single-mode fiber, and said one end of said fifth polarization-maintaining single-mode fiber are connected;

said fourth polarization-maintaining single-mode fiber, said one end of which is connected to said wavelength demultiplexer, and having another end which is connected to said multiplexer;

said seventh polarization-maintaining single-mode fiber, said one end of which is connected to said wavelength demultiplexer, and having another end which is connected to said first polarization plane rotation portion; and said eighth polarization-maintaining single-mode fiber, said one end of which is connected to said first polarization plane rotation portion, and having another end which is connected to said multiplexer, and wherein said phase bias circuit is disposed at a point on one polarization-maintaining single-mode fiber spaced apart from said first through sixth polarization-maintaining single-mode fibers.

18. The optical switch according to claim 17, wherein said phase control means comprises:
a polarization splitter having a first port for inputting a control light, a second port for outputting an S component of said control light, and a third port for outputting a P component of said control light;
an optical attenuator for outputting said S component of said control light, output from said polarization splitter, with a reduced optical intensity;
a polarization combiner having a first port for inputting said S component of said control light output from said optical attenuator, a third port for inputting said P component of said control light output from said third port of said polarization splitter, and a second port for combining, and then outputting, said S component of said control light output from said optical attenuator and said P component of said control light output from said third port of said polarization splitter; and
control light input means for inputting said control light output from said second port of said polarization combiner into said optical waveguide loop circuit.

19. The optical switch according to claim 18, wherein an optical path length formed by said sixth polarization-maintaining single-mode fiber, said one end of which is connected to said third polarization plane rotation portion and said other end of which is connected to said third port of said optical demultiplexer/multiplexer, and an optical path length formed by said fifth polarization-maintaining single-mode fiber, said one end of which is connected to said wavelength demultiplexing/multiplexing circuit and said other end of which is connected to said third polarization plane rotation portion, are set equally.

20. The optical switch according to claim 17, wherein an optical path length formed by said sixth polarization-maintaining single-mode fiber, said one end of which is connected to said third polarization plane rotation portion and said other end of which is connected to said third port of said optical demultiplexer/multiplexer, and an optical path length formed by said fifth polarization-maintaining single-mode fiber, said one end of which is connected to said wavelength demultiplexing/multiplexing circuit and said other end of which is connected to said third polarization plane rotation portion, are set equally.

21. The optical switch according to claim 17, wherein said wavelength demultiplexing/multiplexing circuit comprises:
a first wavelength demultiplexer to which said other end of said third polarization-maintaining single-mode fiber, one end of a fourth polarization-maintaining single-mode fiber, and one end of a seventh polarization-maintaining single-mode fiber are connected;
a first polarization plane rotation portion to which the other end of said seventh polarization-maintaining single-mode fiber and one end of an eighth polarization-maintaining single-mode fiber are connected;
a second wavelength demultiplexer to which the other end of said fourth polarization-maintaining single-mode fiber, the other end of said eighth polarization-maintaining single-mode fiber, and said one end of said fifth polarization-maintaining single-mode fiber are connected;
said fourth polarization-maintaining single-mode fiber, said one end of which is connected to said first wavelength demultiplexer, and having another end which is connected to said second wavelength demultiplexer;
said seventh polarization-maintaining single-mode fiber, said one end of which is connected to said first wavelength demultiplexer, and having another end which is connected to said first polarization plane rotation portion; and
said eighth polarization-maintaining single-mode fiber, said one end of which is connected to said first polarization plane rotation portion, and having another end which is connected to said second wavelength demultiplexer.

22. The optical switch according to claim 17, wherein said wavelength demultiplexing/multiplexing circuit comprises:
a wavelength demultiplexing plate which, when input with said control light output from said third polarization-maintaining single-mode fiber, reflects said control light toward a first reflecting mirror, and when input again with said control light reflected by said first reflecting mirror, reflects said control light toward said one end of said fifth polarization-maintaining single-mode fiber, and when input with said signal light output from said third polarization-maintaining single-mode fiber, transmits said signal light and outputs said signal light toward a second reflecting mirror, and when input again with said signal light reflected by said second reflecting mirror, transmits said signal light and outputs said signal light toward said one end of said fifth polarization-maintaining single-mode fiber;
a polarization plane rotator disposed in a position enabling said control light to pass therethrough as said control light, output from said third polarization-maintaining single-mode fiber, travels to said one end of said fifth polarization-maintaining single-mode fiber;
said first reflecting mirror for reflecting said control light; and
said second reflecting mirror for reflecting said signal light.

* * * * *